United States Patent [19]

Ono

[11] Patent Number: 4,646,302
[45] Date of Patent: Feb. 24, 1987

[54] TAPE RECORDER WITH A HEAD POSITION CONTROL

[75] Inventor: Takuro Ono, Yokohama, Japan

[73] Assignee: Tokyo Shibaura Denki Kabushiki Kaisha, Kawasaki, Japan

[21] Appl. No.: 489,948

[22] Filed: Apr. 29, 1983

[30] Foreign Application Priority Data

Apr. 30, 1982 [JP] Japan ................................. 57-72747
Apr. 30, 1982 [JP] Japan ................................. 57-72748
Sep. 16, 1982 [JP] Japan ................................ 57-161225

[51] Int. Cl.$^4$ ...................... G11B 5/54; G11B 15/10; G11B 15/48; G11B 5/008
[52] U.S. Cl. ..................................... 360/137; 360/62; 360/74.1; 360/96.3; 360/105
[58] Field of Search ................. 360/105, 61, 62, 74.1, 360/73, 71, 93, 90, 96.4, 96.3, 96.2, 96.1, 137; 318/293

[56] References Cited

U.S. PATENT DOCUMENTS

| | | |
|---|---|---|
| 3,614,342 | 10/1971 | Siebert ........................ 179/100.2 C |
| 3,810,237 | 5/1974 | Nozawa .............................. 274/4 D |
| 4,272,792 | 6/1981 | Nakamichi et al. .................. 360/69 |
| 4,360,846 | 11/1982 | Asai et al. ............................ 360/137 |
| 4,386,381 | 5/1983 | Itai ..................................... 360/74.2 |
| 4,404,607 | 9/1983 | Itai ....................................... 360/105 |
| 4,425,591 | 1/1984 | Ito et al. ............................... 360/88 |
| 4,452,409 | 6/1984 | Takai .................................... 242/204 |
| 4,488,186 | 12/1984 | Terui ..................................... 360/71 |

FOREIGN PATENT DOCUMENTS

| | | | |
|---|---|---|---|
| 55-4715 | 1/1980 | Japan .................................. 360/61 |
| 56-153549 | 11/1981 | Japan .................................. 360/61 |
| 57-198562 | 12/1982 | Japan ............................... 360/74.1 |
| 2062934 | 5/1981 | United Kingdom .............. 360/74.1 |

Primary Examiner—Stuart N. Hecker
Assistant Examiner—Benjamin E. Urcia
Attorney, Agent, or Firm—Cushman, Darby & Cushman

[57] ABSTRACT

A motor of a motor drive mechanism is driven by a logic control circuit and a motor driving circuit when an operating member for tape feed is operated. A shift control mechanism receiving a forward or reverse rotatory force from the motor controls a pinch roller included in a tape drive mechanism for a specified condition by means of a playback slider, and also controls a head to a predetermined position by means of a head slider. Thus, the motor drive mechanism can establish a forward or reverse tape feed mode in a tape recorder.

3 Claims, 55 Drawing Figures

TAPE RECORDER WITH A HEAD POSITION CONTROL

BACKGROUND OF THE INVENTION

This invention relates to an improvement of a tape recorder with a motor drive assisting mechanism.

Recently tape recorders with a so-called motor drive assisting mechanism have been developed in which a head slider, as a head position control member, can be moved to a predetermined position by means of an exclusive assisting motor.

These tape recorders may employ so-called soft-touch operation and may be combined with an auto-reverse mechanism or other mechanism.

Tape recorders of this type must be designed so that the sliding of the head is securely controlled in various operation modes and so that the heads are accurately located in positions corresponding to the operation modes.

However, conventional motor drive assisting mechanisms cannot always fully satisfy these requirements, and are subject to various drawbacks. For example, the head position controlled by the head slider cannot be readily detected or adjusted. Therefore, cue and review operations, in particular, may not be performed smoothly and accurately.

It is to be understood that setting the head position includes establishment of the operation modes and shifting the tape recorder from an operating mode to a stop mode. In setting the head position for the stop mode, however, it is necessary that the head slider be ready to be returned smoothly and securely. To counter voltage drop, it is also necessary to prevent reduction of the effective torque margin of the assisting motor.

A forward-reverse selector for changing the tape feeding direction is used for the motor drive assisting mechanism for the auto-reverse mechanism. As shown in FIG. 1, the forward/reverse selector is generally provided with left and right plungers 11 and 12 for forward/reverse shift control. Left and right playback sliders 14 and 15 are supported on a main chassis 13 so as to be slidable in the direction of arrows A and B. One end portions of left and right transmission levers 16 and 17 engage those of the left and right playback sliders 14 and 15, respectively. The transmission levers 16 and 17 are rockably mounted at the middle portion thereof on the main chassis 13. The other end portions of the transmission levers 16 and 17 are supported by core portions 111 and 121 of the left and right plungers 11 and 12, respectively.

If the right plunger 12 is energized, for example, its core portion 121 is attracted so that the right transmission lever 17 is rocked in the clockwise direction of FIG. 1. At this time, the right playback slider 15 engaging the one end portion of the right transmission lever 17 slides in the direction of arrow A against the urging force of a return spring 18. As the right playback slider 15 slides in this manner, the head slider 19 also slides in the direction of arrow A against the urging force of a return spring 20. Thereupon, a recording/playback head 21 mounted on the head slider 19 abuts against a tape surface, and a right pinch lever 22 is rocked together with the motion of the right playback slider 15. Thus, a right pinch roller 23 presses a tape against a capstan 24 for forward playback operation. If the left plunger 16 is energized, on the other hand, the left playback slider 14 is slid in the direction of arrow A by the left transmission layer 16. As the left playback slider 14 slides in this manner, the head slider 19 also slides in the direction of arrow A. Thereupon, the recording/playback head 21 abuts against the tape depending on the tape feeding direction. Thus, a left pinch roller 26 on a left pinch lever 25 presses the tape against a capstan 27 for reverse playback operation.

Constructed in this manner, the forward/reverse selector used in the motor drive assisting mechanism for the auto-reverse mechanism is expensive, due to the use of the two plungers, and requires a high capacity power source. Therefore, this forward/reverse selector is unsuitable for a small, portable tape recorder, and its additional power consumption increases the operating cost of the apparatus.

Moreover, some of the forward/reverse selectors used in tape recorders are normally associated with a head shift mechanism. As these forward/reverse selectors change the tape feeding direction, the head shift mechanism is actuated to shift a recording/playback head and other head(s) in accordance with the tape feeding direction.

Associated with the head shift mechanism, however, these conventional forward/reverse selectors are complicated in construction and expensive to manufacture.

SUMMARY OF THE INVENTION

An object of this invention is to provide a tape recorder having a motor assisting mechanism which is as simple in construction as possible and can operate satisfactorily, and, more specifically, is improved in power consumption and in cost so as to be well adapted for a small-sized apparatus.

Another object of the invention is to provide a tape recorder in which a motor drive assisting mechanism can satisfactorily perform auto-reverse, cue, and review operations.

Still another object of the invention is to provide a tape recorder so improved that the head position can be securely detected and controlled with ease by means of a motor drive assisting mechanism.

DETAILED DESCRIPTION OF THE PREFERRED EMBODIMENTS

A fundamental embodiment of the tape recorder of this invention will first be described in detail with reference to the accompanying drawings of FIGS. 2 to 22.

Figure 1:
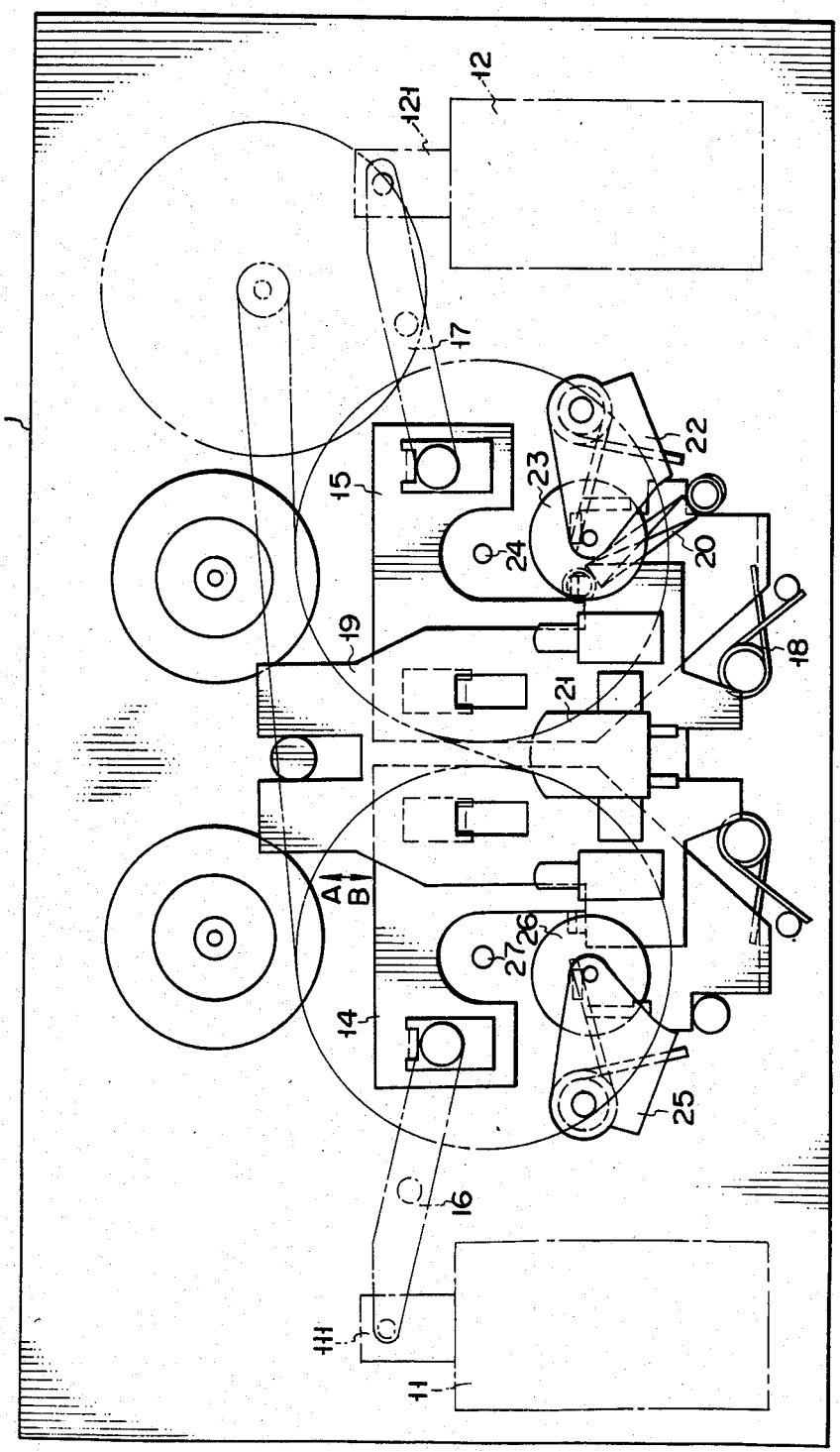
FIG. 1 is a diagram for illustrating the construction of a forward/reverse selector used in a prior art tape recorder.
Figure 2:
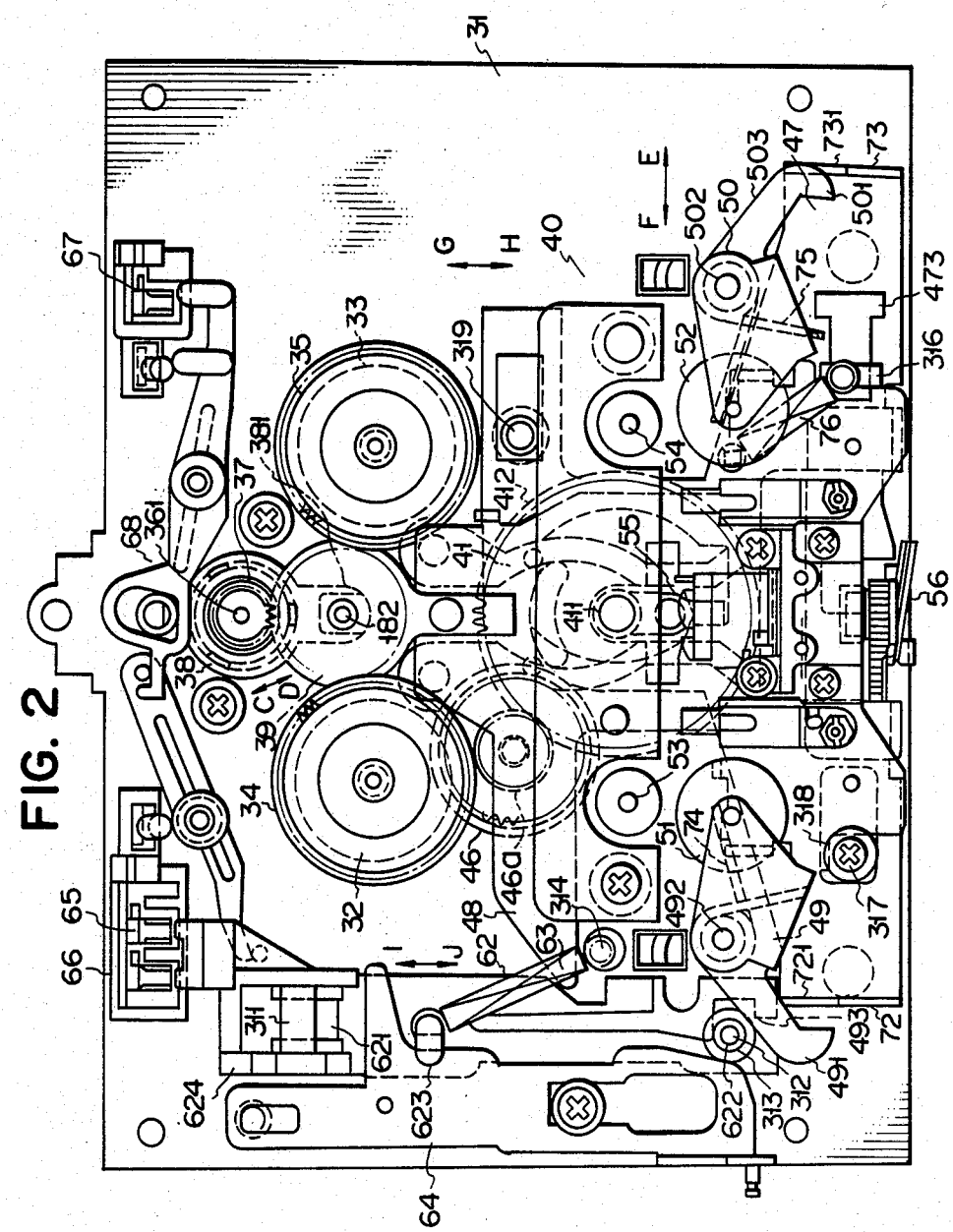
FIGS. 2 to 22 are diagrams for illustrating the construction and operation of a fundamental embodiment of the tape recorder of this invention.
Figure 3:
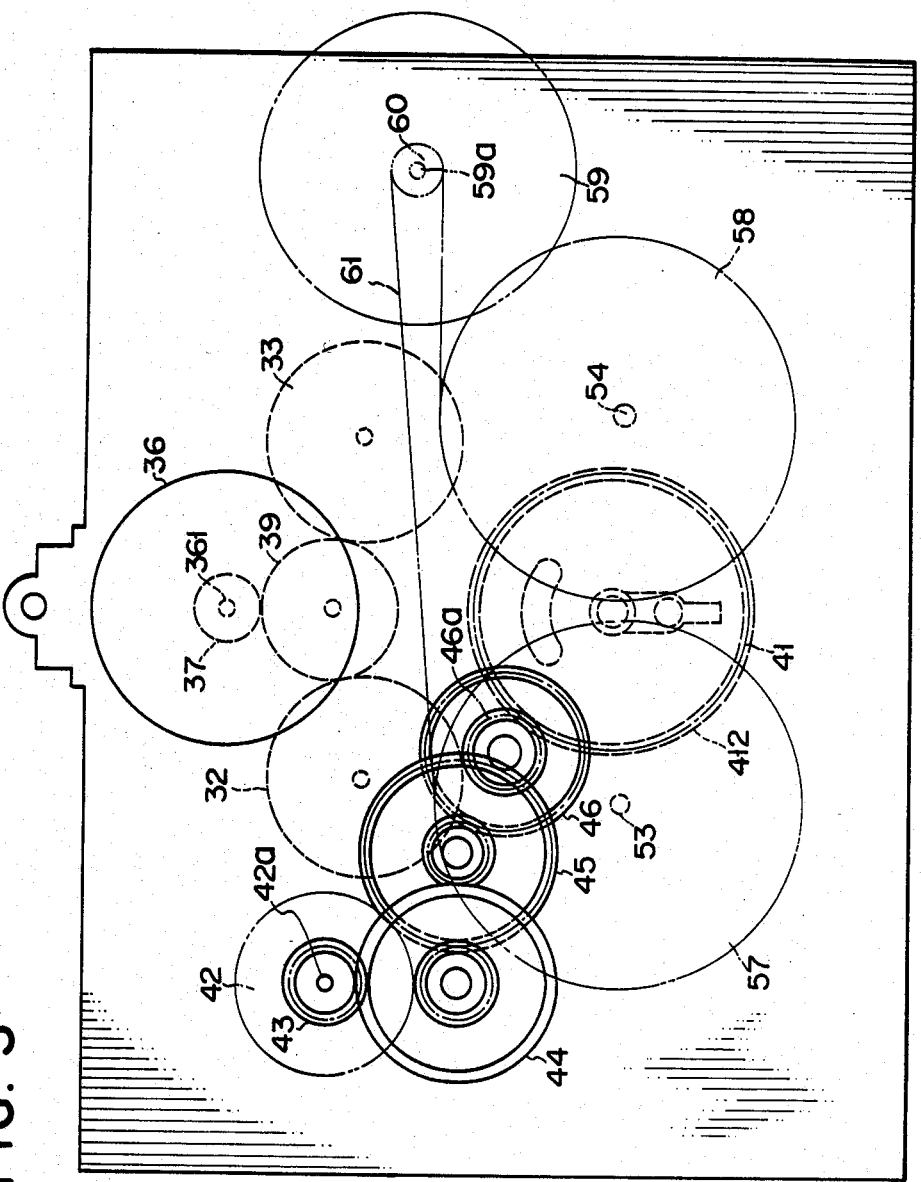

FIGS. 2 and 3 are obverse- and reverse-side plane views, respectively, showing general arrangements of the tape recorder according to the invention. In FIG. 2, a pair of reel holders 32 and 33 are individually and rotatably supported on the substantially central portions of the obverse side of a substantially rectangular main chassis 31. Large gears 34 and 35 are integrally formed on the reel holders 32 and 33, respectively, so as to be coaxial therewith.

On the reverse side of the main chassis 31, a reel motor 36 (FIG. 3) for tape feeding is provided over a straight line connecting the axis of rotation of the reel holders 32 and 33 on the perpendicular bisector of that line. A rotating shaft 361 of the reel motor 36 projects on the obverse side of the main chassis 31, and the central portion of a gear 37 is fitted on the projected end portion of the shaft 361. A substantially ring-shaped friction member 38 surrounds the gear 37 on the obverse side of the main chassis 31. A projecting portion 381 is integrally formed on the friction member 38, facing between the reel holders 32 and 33. The friction member 38 and the gear 37 interlock by means of a proper frictional force. Thus, the friction member 38 is urged in the direction of arrow C or D depending on the rotating direction of the gear 37. A rotating shaft 182 is set in the projecting portion 381 of the friction member 38 to rotatably support thereon a gear 39 which is normally in mesh with the gear 37.

When the gear 37 is rotated in the counterclockwise direction of FIG. 2 by the reel motor 36, the friction member 38 is urged in the direction of arrow D. Thereupon, the gear 39 supported by the projecting portion 181 engages the gear 35 of the reel holder 33 to rotate the reel holder 33 counterclockwise. When the gear 37 is rotated clockwise by the reel motor 36, the gear 39 supported by the projecting portion 181 engages the gear 34 of the reel holder 32 to rotate the reel holder 32 clockwise. Thus, a tape (not shown) can be fed in the forward and reverse directions. The reel motor 36 is controlled by a reel motor driving circuit (to be mentioned later) so that the rotating speed and direction of the reel motor 36 change in accordance with the operation of an operating member (not shown) for normal-speed tape feed (recording and forward/reverse playback) or an operating member (not shown) for high-speed tape feed (fast forward and rewinding). When the operating member for normal- or high-speed tape feed or an operating member (not shown) for tape stop (including pause) is actuated, a logic control circuit (mentioned later) is operated to establish a rotation or stop mode of the reel motor 36 corresponding to the operating member actuated.

On the main chassis 31, a forward/reverse selector 40 as an auto-reverse mechanism including a motor drive assisting mechanism (mentioned later) is disposed below the reel holders 32 and 33, as in FIG. 2. A discoid driving part, e.g., a main gear cam 41 (mentioned later), of the forward/reverse selector 40 is rotatably mounted on a rotating shaft 411 set in the main chassis 31. A tooth portion 412 is formed on the periphery of the main gear cam 41.

As shown in FIG. 3, an exclusive drive source, e.g., an assisting motor 42, is disposed on the reverse side of the main chassis 31. A gear 43 is rotatably mounted on a rotating shaft 42a of the assisting motor 42, and reduction gears 44, 45 and 46 are successively in mesh with the gear 43. A small gear 46a attached to the farthest reduction gear 46 from the gear 43 projects on the obverse side of the main chassis 31 to be in mesh with the tooth portion 412 of the main gear cam 41. When the gear 43 is rotated by the assisting motor 42, therefore, the rotation of the gear 43 is transmitted through the reduction gears 44, 45 and 46 to the main gear cam 41 to rotate the same. The rotating direction or stop (motor lock) mode of the assisting motor 42 is controlled by the logic control circuit, an assisting motor control circuit, and an assisting motor driving circuit (mentioned later) in accordance with the operation of the operating member for normal-speed tape feed or combined operation of the operating members for normal- and high-speed tape feed.

Successively arranged over the upper surface of the main gear cam 41 are a playback slider 47 (described in detail later) slidable in the directions of arrows E and F, and a head slider 48 as a head position control member slidable in the directions of arrow G and H. When the main gear cam 41 is rotated in the aforesaid manner, the playback slider 47 is slid selectively in the direction of arrow E or F according to the rotating direction of the main gear cam 41, thereby driving the tape in the forward or reverse direction and sliding the head slider 48 in the direction of arrow G. At this time, left and right pinch levers 49 and 50 (described in detail later) individually engaging both end portions of the head slider 48 are selectively rocked to engage left and right pinch rollers 51 and 52 rotatably supported on the pinch levers 49 and 50 with left and right capstans 53 and 54 through the medium of the tape. Also, a recording/playback head 55 mounted on the head slider 48 is brought into contact with a specified surface of the tape to establish a forward or reverse playback (recording) mode. The recording/playback head 55 is so moved as to abut against its corresponding track of the tape as the tape travels with an accurate azimuth to enable playback (recording) operation for forward and reverse tape feeding directions. A head rotating mechanism 56 for this purpose will be mentioned later. The left and right capstans 53 and 54 serve as the respective rotating shafts of left and right flywheels 57 and 58 shown in FIG. 3, rotatably extending from the reverse side of the main chassis 31 to the obverse side without backlash.

On the reverse side of the main chassis 31, as shown in FIG. 3, a main motor 59 is disposed at the right of the left and right capstans 53 and 54. A pulley 60 is mounted on the rotating shaft of the main motor 59. A belt 61 is stretched between the pulley 60 and the left and right flywheels 57 and 58. Thus, the rotation of the main motor 59 is transmitted to the flywheels 57 and 58 by means of the belt 61 to normally rotate the flywheels 57 and 58 in the clockwise or counterclockwise direction of FIG. 3.

On the obverse side of the main chassis 31, an ejector member 62 is supported at the left side portion so as to be slidable in the directions of arrows I and J in FIG. 3. The ejector member 62 is substantially in the shape of a bar extending from the upper end portion of the main chassis 31 to the lower end portion thereof. A sliding portion 311 formed on the main chassis 31 is fitted in a through hole 612 at one end portion of the ejector member 62, while a shaft 312 formed on the main chassis 31 is loosely fitted in a through hole 622 at the other end portion of the ejector member 62. Then, the ejector member 62 is pressed down by a pressing ring 313 to be slidably supported. Further, the ejector member 62 is urged in the direction of arrow J by a spring 63 stretched between a bent retaining strip 623 at the substantially central portion of the ejector member 62 and an engaging shaft 314 formed on the main chassis 31.

A lock portion 624 is formed at one end portion of the ejector member 62. When a cassette cover (not shown), which is normally urged to be open, is closed, part of the cassette cover is locked to be kept in the closed state by the lock portion 624. When an operating member (not shown) for ejection is operated, the ejector member 62 is slid in the direction of arrow I against the urging force of the spring 63 by means of an ejector slider 64. Thereupon, the lock portion 624 of the ejector member 62 is disengaged from the cassette cover to let the cover swing open.

On the main chassis 31, moreover, an erasure prevention mechanism 68 is provided at the upper side portion of FIG. 2, including a cassette detecting switch 65 and forward- and reverse-direction erasure prevention switches 66 and 67.

Figure 4:
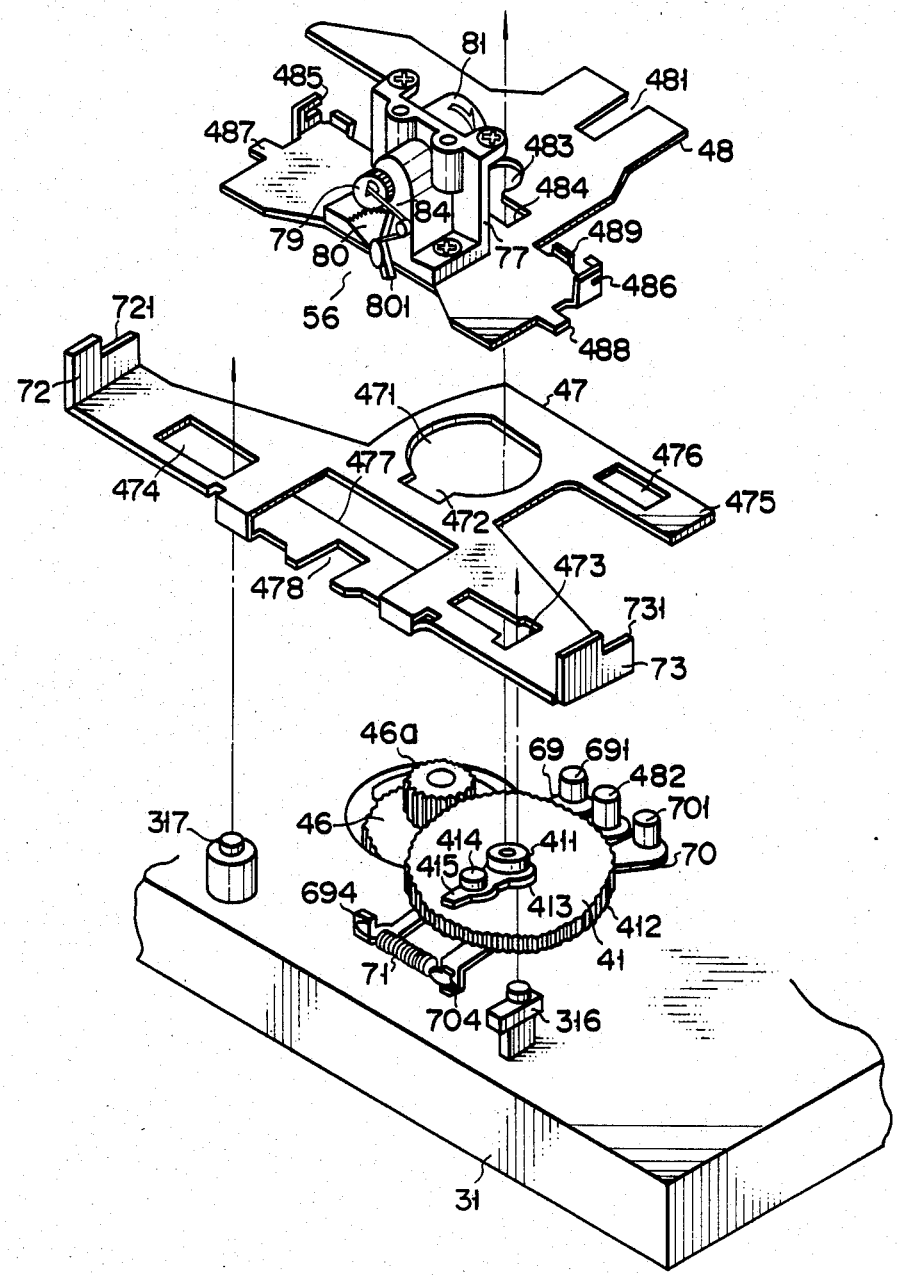
Figure 5:
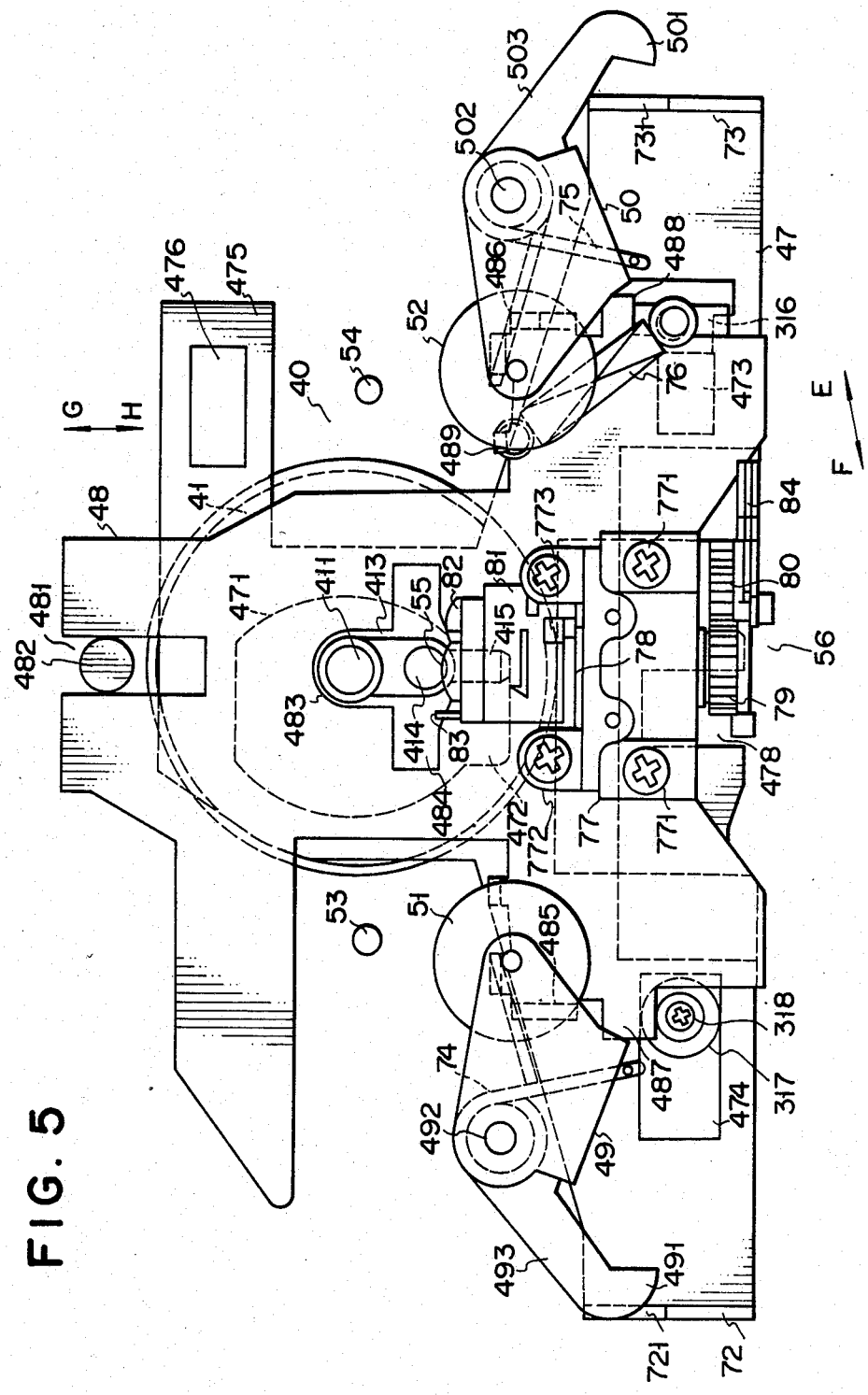
Figure 6:
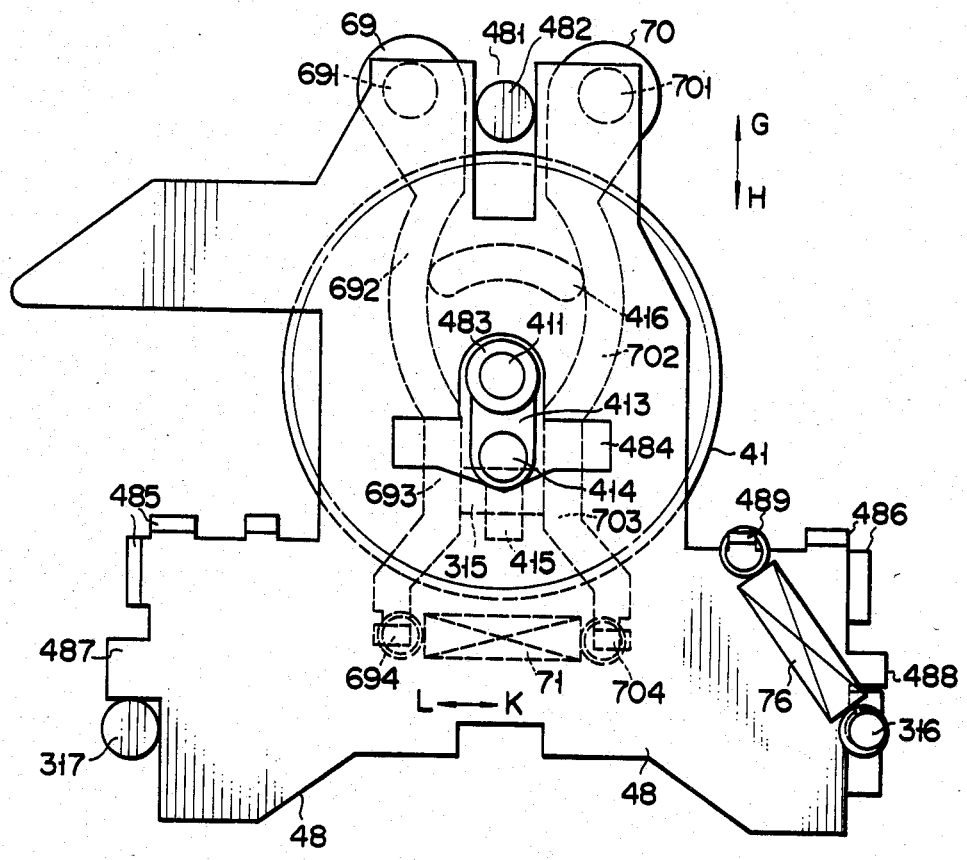
Figure 7:
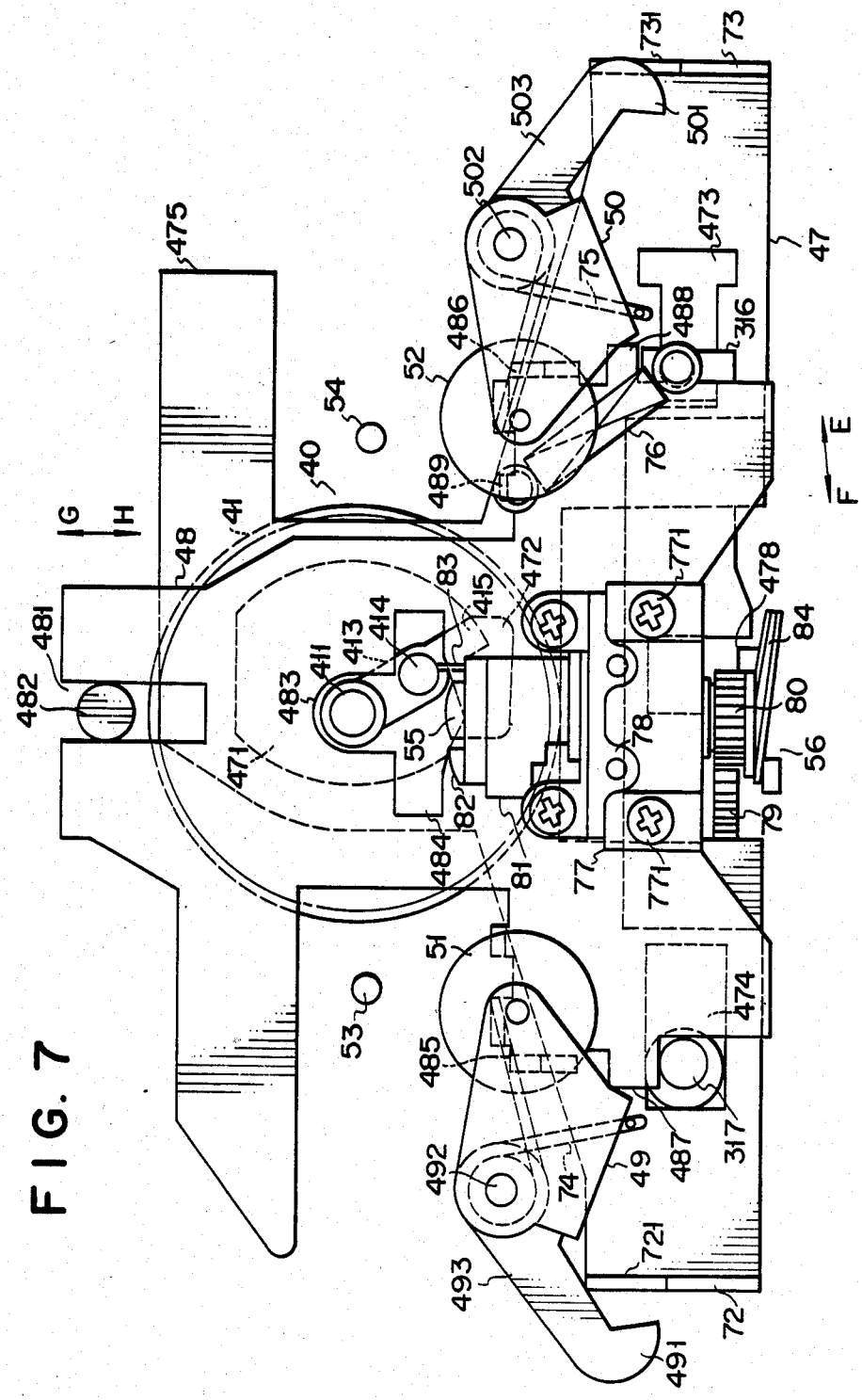

The forward/reverse selector 40 including the motor drive assisting mechanism will now be described. On the main chassis 31, as shown in FIGS. 4, 5 and 6, the rotatable main gear cam 41 is supported in mesh with the small gear 46a of the reduction gear 46. On the lower surface side of the main gear cam 41, a curved engaging projection 416 is formed at the upper portion of the rotating shaft 411 as in FIG. 6. A pair of return members, e.g., return levers 69 and 70, face each other with the engaging projection 416 between them. The return levers 69 and 70 are rockably supported at one end portion by rocking shafts 691 and 701, respectively, set in the main chassis 31. Curved portions 692 and 702 are formed at the middle portions of the return levers 69 and 70, respectively, facing the engaging projection 416. Also, the return levers 69 and 70 are provided with retaining portions 693 and 703, respectively, which adjoin the curved portions 692 and 702 at the points facing the rotating shaft 411 of the main gear cam 41. The retaining portions 693 and 703 face each other with a retaining projection 315 on the main chassis 31 between them. Hook portions 694 and 704 are formed at the other end portions of the return levers 69 and 70, respectively. A return spring 71 is stretched between the hook portions 694 and 704. The operation of the return mechanism thus constructed will be described later.

A projecting portion 413 protrudes downward (in FIG. 6) from the rotating shaft 411 on the upper surface side of the main gear cam 41. A protrusion 414 is formed substantially in the center of the projecting portion 413.

The substantially inverted-T-shaped playback slider 47 (in FIG. 5) is disposed on the upper surface side of the main gear cam 41 so as to be slidable in the directions of arrows E and F. A curved through hole 471 is formed in the central end portion of the playback slider 47. A gain portion 472 is formed at one end portion of the through hole 471. The projecting portion 413 of the main gear cam 41 is fitted in the through hole 471 so that a projected end portion 415 of the projecting portion 413 faces the gain portion 472 of the through hole 471.

A substantially T-shaped through hole 473 is formed at one end portion of the playback slider 47. The sliding portion 316 having a substantially T-shaped lateral face and set in the main chassis 31 is fitted in the through hole 473. A through hole 474 is formed at the other end portion of the playback slider 47. A shaft 317 set in the main chassis 31 is loosely fitted in the through hole 474, and pressed down by a screw 318. An extending portion 475 protrudes from the central end portion of the playback slider 47 to the right of FIG. 5. A shaft 319 (see FIG. 2) set in the main chassis 31 is passed through a through hole 476 formed in the extending portion 475. Thus, the playback slider 47 is so supported as to be slidable in the directions of arrows E and F.

A recessed portion 477 is formed substantially in the center of the lower edge portion of the playback slider 47, and a fitting portion 478 is cut in the recessed portion 477. Part of the head rotating mechanism 56 (described in detail later) is to engage the fitting portion 478.

Bent portions 73 and 72 are formed at the end and the other end portions, respectively, of the playback slider 47. The bent portions 72 and 73 are provided with retaining portion 721 and 731, respectively. The retaining portion 721 or 731 selectively retains a bent portion 491 or 501 (see FIG. 2) of its corresponding one of the left and right pinch levers 49 and 50 (described in detail later) as the playback slider 47 slides in the direction of arrow E or F.

The substantially inverted-T-shaped head slider 48 is disposed on the upper surface side of the playback slider 47 so as to be slidable in the directions of arrow G and H. A recess 481 is formed at the extreme end portion of the central end portion of the head slider 48. A shaft 482 set in the main chassis 31 between the shafts 691 and 701 thereof is passed through the recess 481 so that the head slider 48 is guided in its sliding in the directions of arrows G and H. The head slider 48 is allowed to slide in the direction of arrow G until the bottom portion of the recess 481 abuts against the shaft 482.

A through hole 483 is formed in the central end portion of the head slider 48 so as to correspond to the rotating shaft 411 of the main gear cam 41. An oblong rocking hole 484 is formed in the lower end portion of the through hole 483 as in FIG. 5 so as to correspond to the rocking orbit of the protrusion 414 of the main gear cam 41. The rotating shaft 411 and the protrusion 414 of the main gear cam 41 are passed through the hole 483 and the rocking hole 484, respectively.

Thus, as the main gear cam 41 rotates, the projected end portion 415 of the projecting portion 413 of the main gear cam 41 slides the playback slider 47 to a predetermined position. Thereafter, when the main gear cam 41 further rotates so that its protrusion 414 engages part of the rocking hole 484, the head slider 48 is located in a predetermined position thereof.

The head slider 48 is also provided with bent retaining portions 485 and 486 which are bent substantially at right angles and arranged in two end corners of the head slider 48. The left and right pinch rollers 51 and 52 are rotatably supported by one end portions of the left and right pinch levers 49 and 50 each having a substantially U-shaped profile. The other end portions of the pinch levers 49 and 50 are rockably mounted on rocking shafts 492 and 502, respectively, set in the main chassis 31. Also, projecting portions 493 and 503 are formed at the other end portions of the pinch levers 49 and 50, respectively, so as to correspond to the bent portions 72 and 73 of the playback slider 47. The bent portions 491 and 501 are formed on the projecting portions 493 and 503, respectively. Torsion springs 74 and 75 are wound around the rocking shafts 492 and 502 of the pinch levers 49 and 50, respectively. One end portions of the torsion springs 74 and 75 engage the back portions of the pinch levers 49 and 50, respectively. The other end portions of the torsion springs 74 and 75 engage the bent retaining portions 485 and 486, respectively, of the head slider 48. As the head slider 48 slides in the direction of arrow G, the left and right pinch levers 49 and 50 are rocked in the counterclockwise and clockwise directions, respectively, in FIG. 5. At the same time, the bent portion 491 or 501 of the projecting portion 493 or 503 of one of the pinch levers 49 or 50 is selectively caught and prevented from rocking by its corresponding bent retaining portion 721 or 731 as the playback slider 47 slides in the direction of arrow E or F. The other of the pinch levers 49 and 50 is rocked so that its corresponding pinch roller 51 or 52 abuts against the left or right capstan 53 or 54 corresponding thereto.

Also, the head slider 48 has a retaining portion 487 at one end corresponding to the shaft 317 of the main chassis 31 and a retaining portion 488 at the other end corresponding to the sliding portion 316 of the main chassis 31. Thus, the head slider 48 is allowed to slide in the direction of arrow H until the retaining portions 487 and 488 abut against the shaft 317 and the sliding portion 316, respectively, of the main chassis 31. Hereupon, the head slider 48 is urged in the direction of arrow H by a spring 76 stretched between a retaining strip 489 at the other end of the head slider 48 and the sliding portion 316 of the main chassis 31.

A head mounting structure 77 of the head rotating mechanism 56 is attached to the substantially central portion of the head slider 48 by means of screws 771. The head mounting structure 77 integrally supports a head support plate 78 and a gear 79, and rotatably supports the base portion of a substantially fan-shaped sector gear 80 in mesh with the gear 79. A substantially cylindrical head support 81 is attached to the head support plate 78. The recording/playback head 55 and an erasing head 82 for the cassette tape recorder are arranged side by side on the head support 81.

As the head mounting structure 77 is attached to the head slider 48, the contact surfaces of the recording/playback head 55 and the erasing head 82 face the reel holders 32 and 33. A driven portion 801 extends from the base portion of the sector gear 80. The bent end portion of the drive portion 801 is fitted in the fitting portion 478 of the playback slider 47. Even if the head slider 48 slid in the direction of arrow G or H, the driven portion 801 is always fitted in the fitting portion 478 without slipping out therefrom. Thus, in switching the tape feeding direction, the sector gear 80 is rocked around its base portion as the playback slider 47 is slid in the direction of arrow E or F.

If the sector gear 80 is rocked in the counterclockwise direction of FIG. 4, the gear 79 meshed with the sector gear 80 is rotated clockwise. As the gear 79 rotates in this manner, the head support plate 78 and the head support 81 rotate in the same direction. Then, the recording/playback head 55 and the erasing head 82 are rotated just 180 degrees. Thus, track change (head shift) is achieved at the switching of the tape feeding direction. If the sector gear 80 is rocked clockwise, on the other hand, the gear 79, the head support plate 78, and the support 81 are rotated counterclockwise to return the heads 55 and 82 to their original positions.

A pair of retaining portions (not shown) are formed on the head support plate 78. Corresponding to these retaining portions, a pair of screws 772 and 773 are attached to the head mounting structure 77. The head support plate 78 is allowed to rotate until one of its retaining portions abuts against the corresponding screw 772 or 773 of the head mounting structure 77. Accordingly, azimuth adjustment of the recording/playback head 55 and the erasing head 82 can be achieved by adjusting the fitting depth of the screws 772 and 773. The heads 55 and 82 are connected to an electric circuit of a recording/playback system (not shown) by means of connecting wires (not shown).

A pair of arrows for indicating the tape feeding direction are marked on the peripheral side surface of the head support 81, and a tape guide portion 83 for supporting both side edge portions of the tape is formed at one side portion of the head support 81.

A torsion spring 84 is wound around part of the head mounting structure 77. One end portion of the torsion spring 84 is retained by the center portion of the gear 79, while the other end is received by the base portion of the sector gear 80. Thus due to the urging force of the torsion spring 84, the head support 78 is stably held in two positions for the forward and reverse tape feeding modes.

Figure 8:
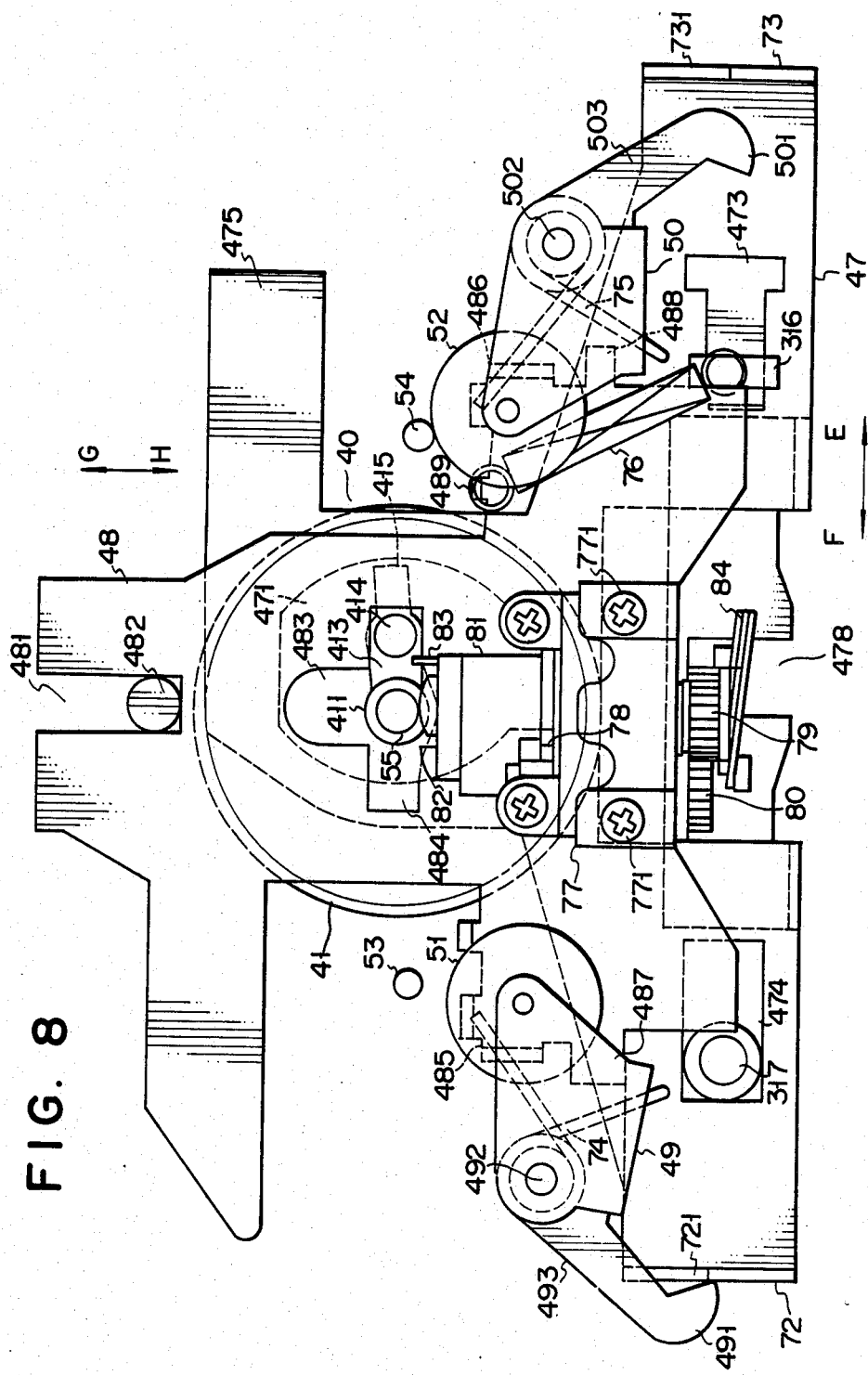

There will now be described in detail the operations of the forward/reverse selector 40 as the auto-reverse mechanism including the motor drive assisting mechanism and the return mechanism. First, in the stop mode shown in FIG. 5, the operating member for normal-speed tape feed (forward playback) is operated in the aforementioned manner to rotate the main gear cam 41 clockwise. As the main gear cam 41 rotates in this manner, the projected end portion 415 of the projecting portion 413 engages the right side portion of the gain portion 472 of the playback slider 47 to slide the slider 47 as far as possible in the direction of arrow E. As the playback slider 47 slides in this manner, the recording/playback head 55 and the erasing head 82 are rotated in accordance with the tape feeding direction by the head rotating mechanism 56. Thereupon, the protrusion 414 of the projecting portion 413 of the main gear cam 41 engages the right side portion (in FIG. 7) of the rocking hole 484 of the head slider 48. When the main gear cam 41 further rotates, the projected end portion 415 of the projecting portion 413 comes into sliding contact with the curved edge of the through hole 471, as shown in FIG. 8. Although this does not cause the playback slider 47 to be urged in the direction of arrow E, the head slider 48 is urged in the direction of arrow G by the protrusion 414 of the projecting portion 413 to be slid to the predetermined position thereof. At this time, the left and right pinch levers 49 and 50 engaging the bent retaining portions 485 and 486 of the head slider 48 through the medium of the torsion springs 74 and 75 are urged clockwise and counterclockwise, respectively. Since the playback slider 47 is located farthest in the direction of arrow E, the left pinch lever 49 is caught by the retaining portion 721 at the one end portion of the playback slider 47, thereby being prevented from rocking. On the other hand, the right pinch lever 50 is rocked clockwise without being caught by the retaining portion 731 at the other end portion of the playback slider 47. Thus, the right pinch roller 52 is brought into contact with the right capstan 54 in the aforementioned manner. Hereupon, the current supply to the assisting motor 42 for rotating the main gear cam 41 is minimized to provide a motor lock state, and forward playback operation is performed.

Figure 9:
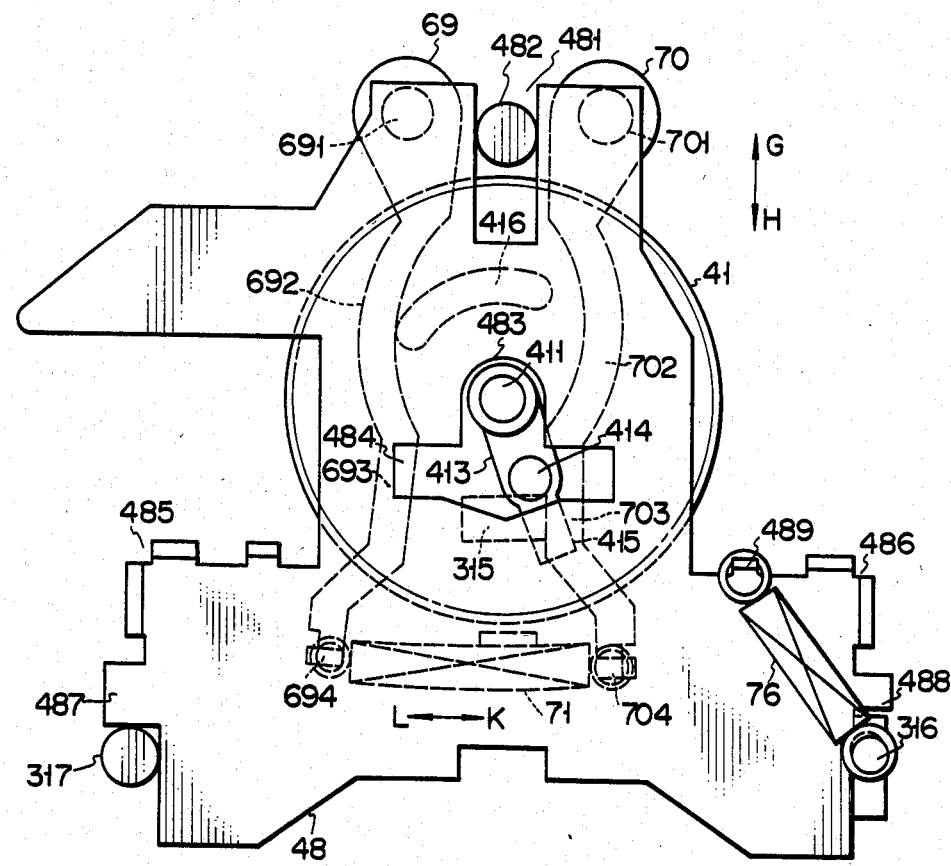
Figure 10:
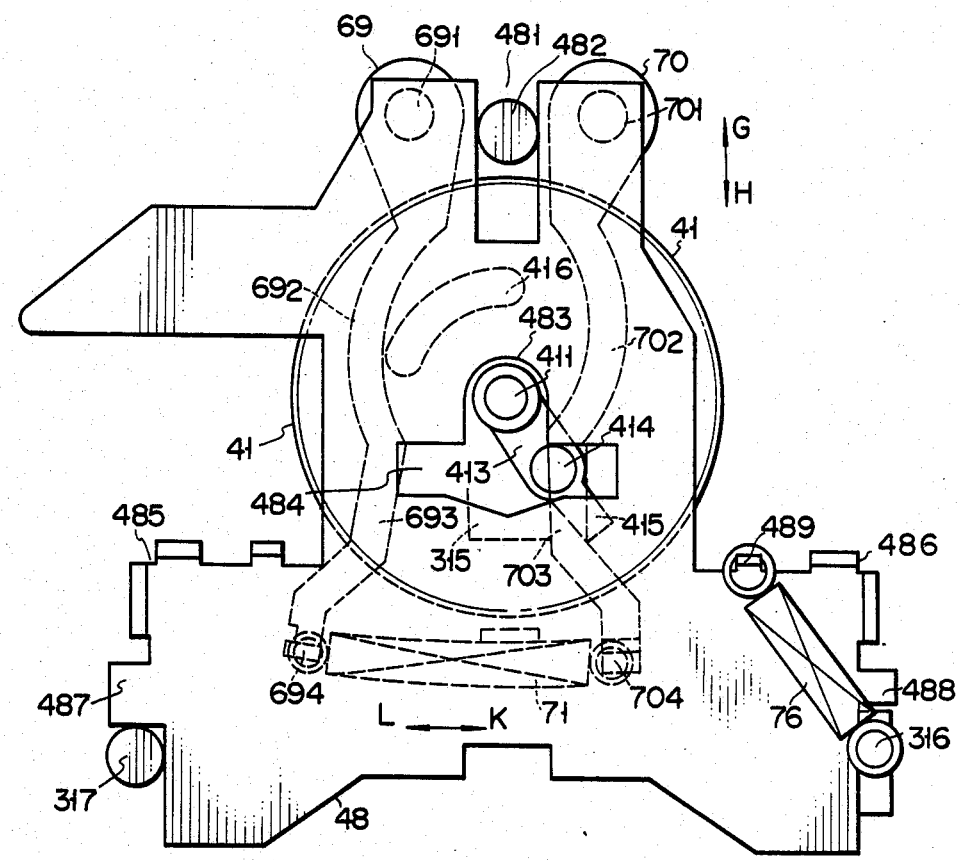
Figure 11:
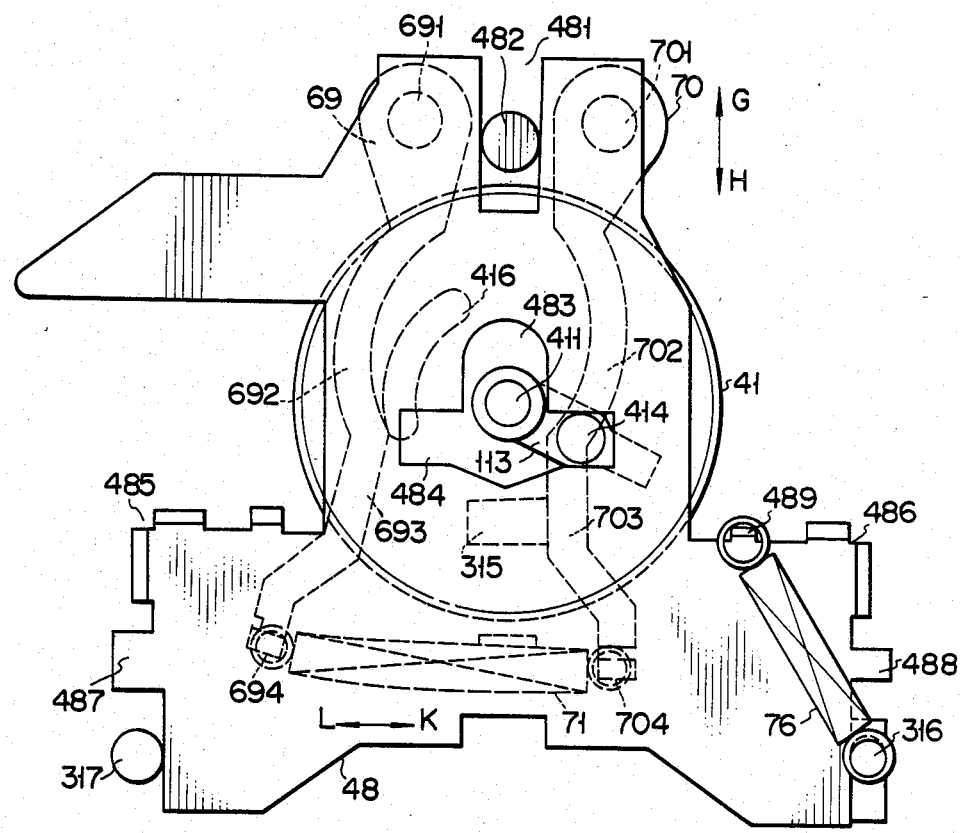
Figure 12:
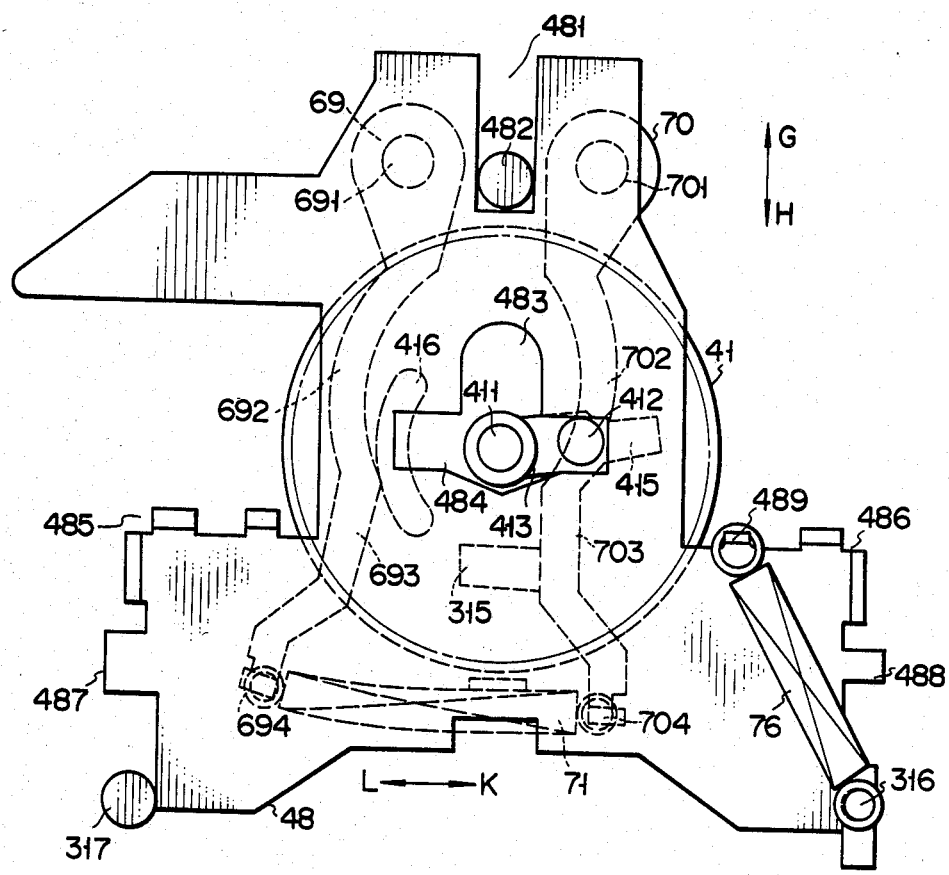

As the main gear cam 41 rotates counterclockwise as in FIG. 9, the one end portion of the engaging projection 416 abuts against the curved portion 692 of the left-hand return lever 69 of the return mechanism on the lower surface side of the main gear cam 41. As the main gear cam 41 further rotates counterclockwise, the return lever 69 is rocked clockwise around the rocking shaft 691 against the urging force of the return spring 71. Meanwhile, the right-hand return lever 70 is caught by the retaining projection 315 of the main chassis 31 and is thereby prevented from rocking clockwise. At the end of the rotation of the recording/playback head 55 and the erasing head 82, that is, at the start of the sliding of the head slider 48, as shown in FIG. 10, the engaging projection 416 of the main gear cam 41 is moved along the curved portion 692 of the return lever 69 to rock the return lever 69 clockwise as the main gear cam 41 rotates. When the one end portion of the engaging projection 416 is located at one end portion of the curved portion 692 of the return lever 69 by the rotation of the main gear cam 41, as shown in FIG. 11, the return lever 69 is stopped from rocking. Then, in the position where the sliding of the head slider 48 is ended, as shown in FIG. 12, the substantially central portion of the engaging projecting 416 of the main gear cam 41 is in contact with the one end portion of the curved portion 692 of the return lever 69. At this time, the return lever 69 is urged in the direction of arrow K by the return spring 71 retained at one end thereof.

Figure 13:
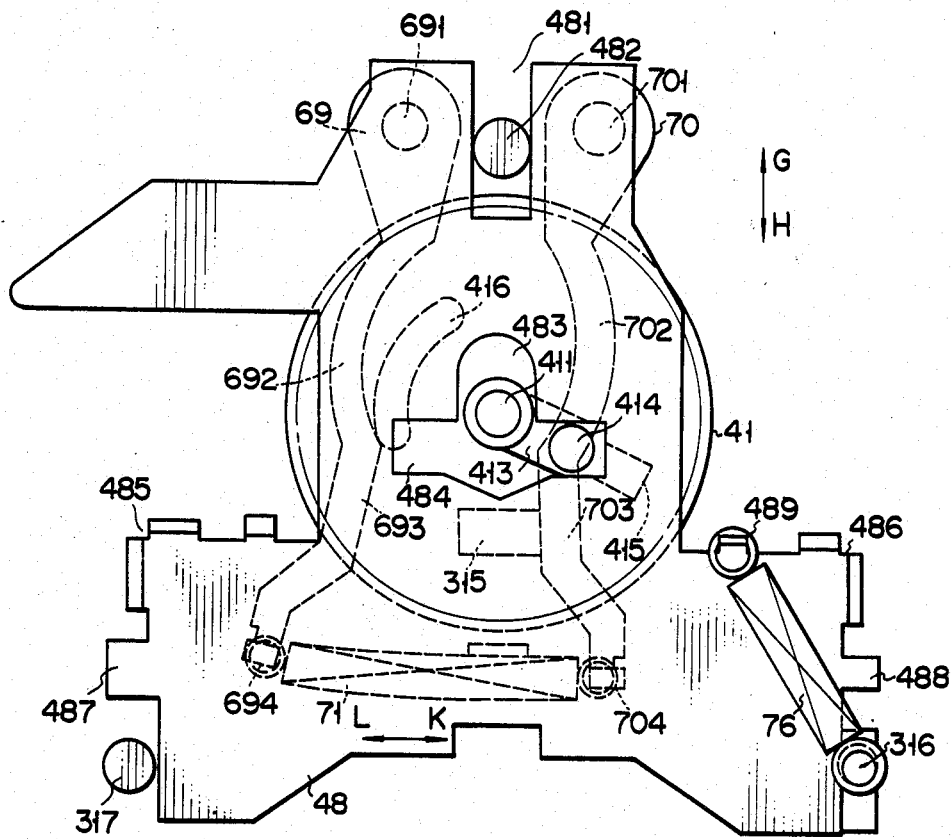
Figure 14:
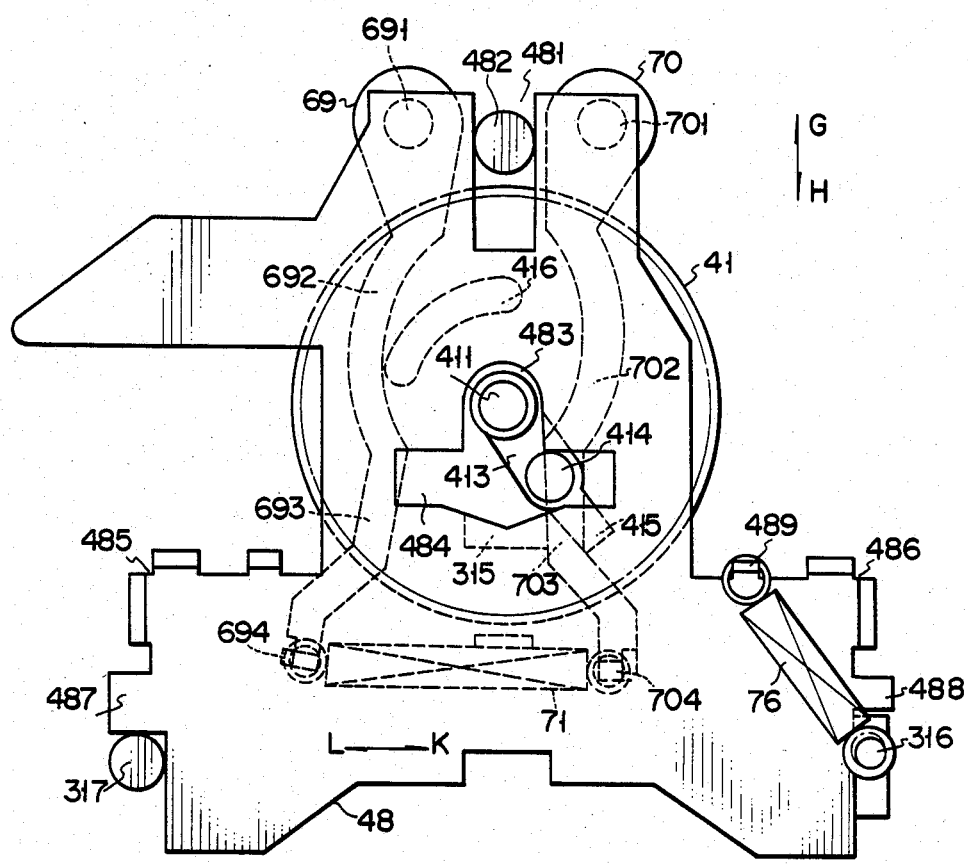

Let us suppose that, in the forward playback mode, a tape end is reached and detected by a tape end detector (not shown) or the operating member for the stop mode is operated, and that the assisting motor 42 is cut off from current supply. Then, the head slider 48 is retracted in the direction of arrow H by the urging force of the return spring 71, as shown in FIG. 13. As the head slider 48 retracts, the main gear cam 41 is rotated clockwise by the urging force of the return spring 71, thereby retracting the head slider 48 to the slide starting position, as shown in FIG. 14. Meanwhile, the left and right pinch levers 49 and 50 individually engaging the bent retaining portions 485 and 486 of the head slider 48 are rocked clockwise and counterclockwise, respectively, to be disengaged from the left and right capstans 53 and 54, respectively.

Figure 15:
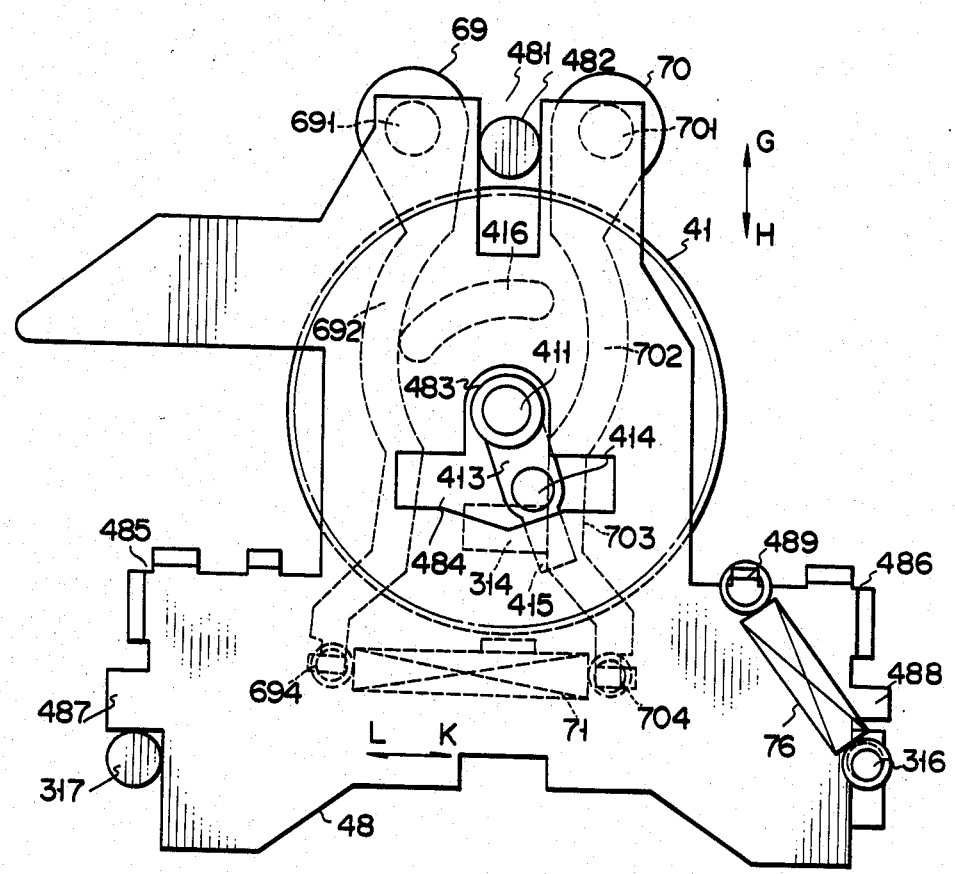
Figure 16:
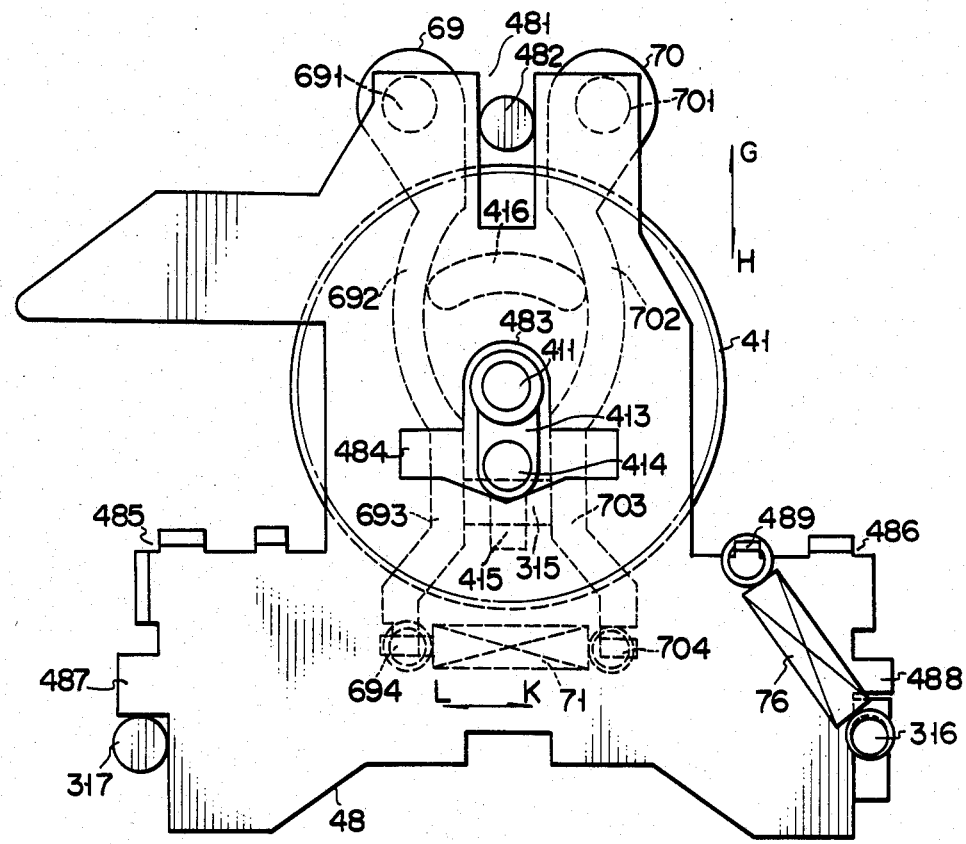

The main gear cam 41 located in the aforesaid position is thereafter returned to its stop position by the urging force of the return spring 71 of the return mechanism. Namely, the main gear cam 41 is rotated clockwise to be located in the stop position shown in FIG. 16, having its engaging projection 416 moved in contact with the curved portion 692 of the left-hand return lever 69 by the urging force of the return spring 71, as shown in FIG. 15. As the main gear cam 41 rotates clockwise, the playback slider 47, having so far been urged in the direction of arrow E by the projected end portion 415 of the projecting portion 413 of the main gear cam 41, is slid in the direction of arrow E to be returned to its stop position.

Figure 17:
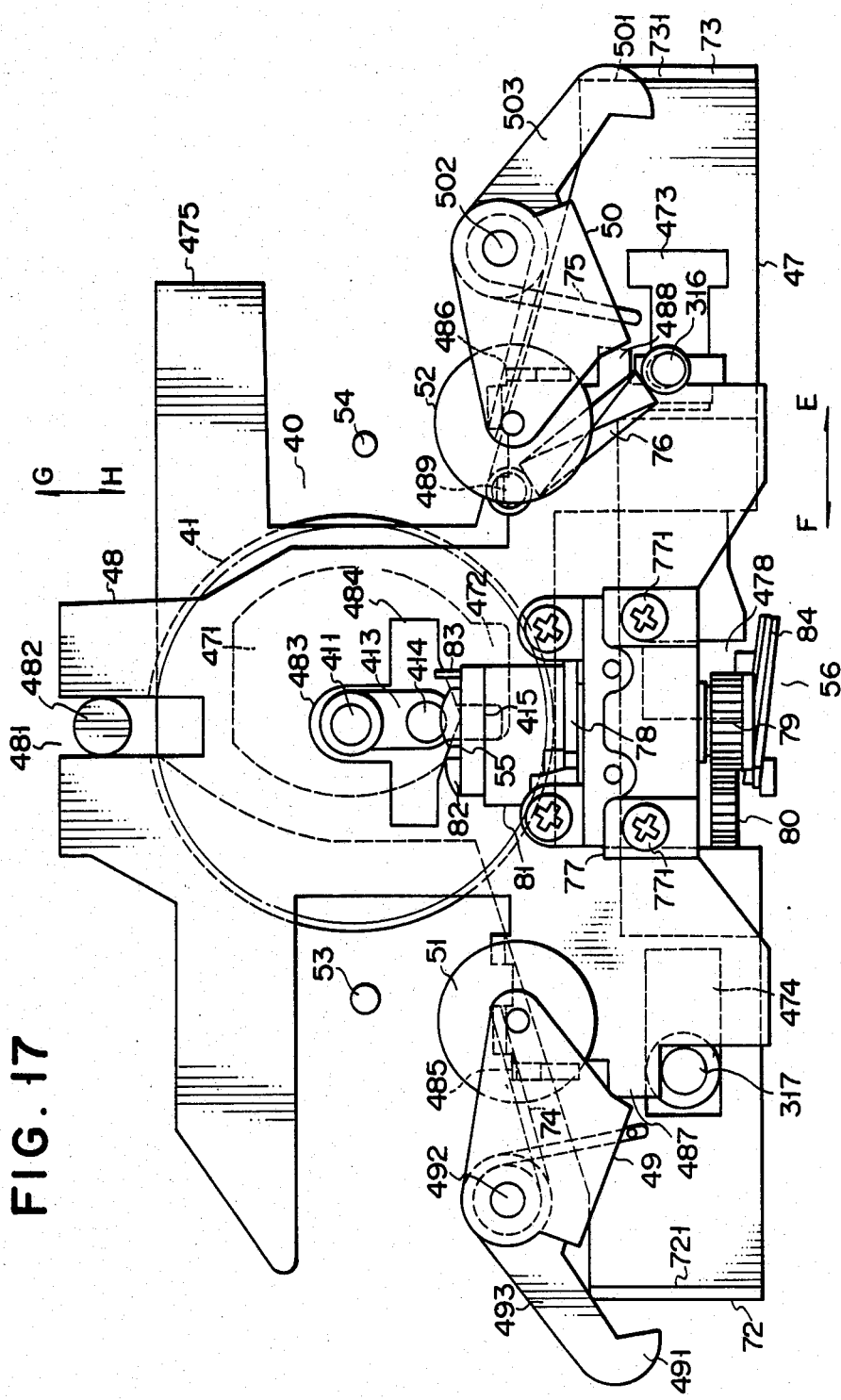
Figure 18:
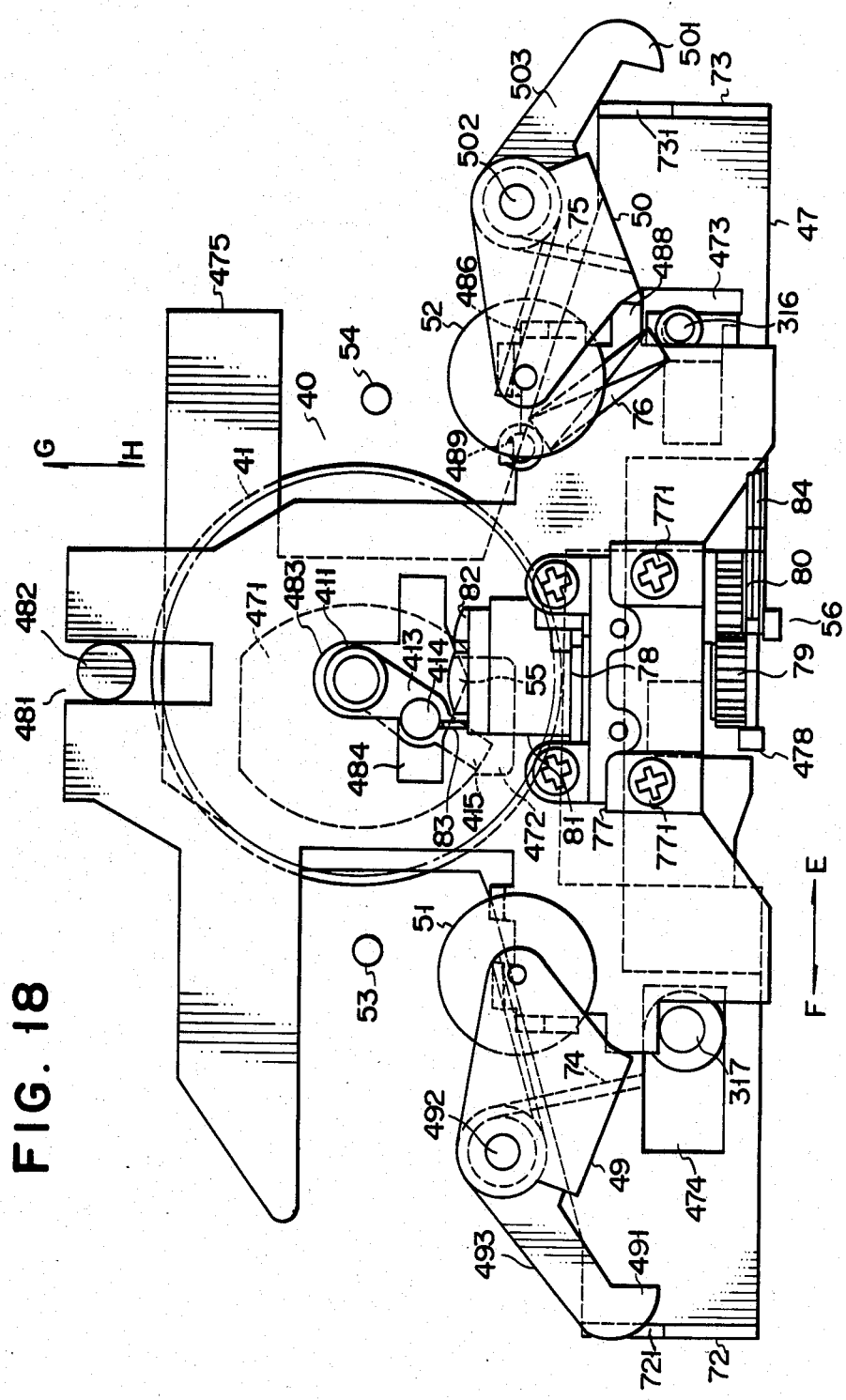
Figure 19:
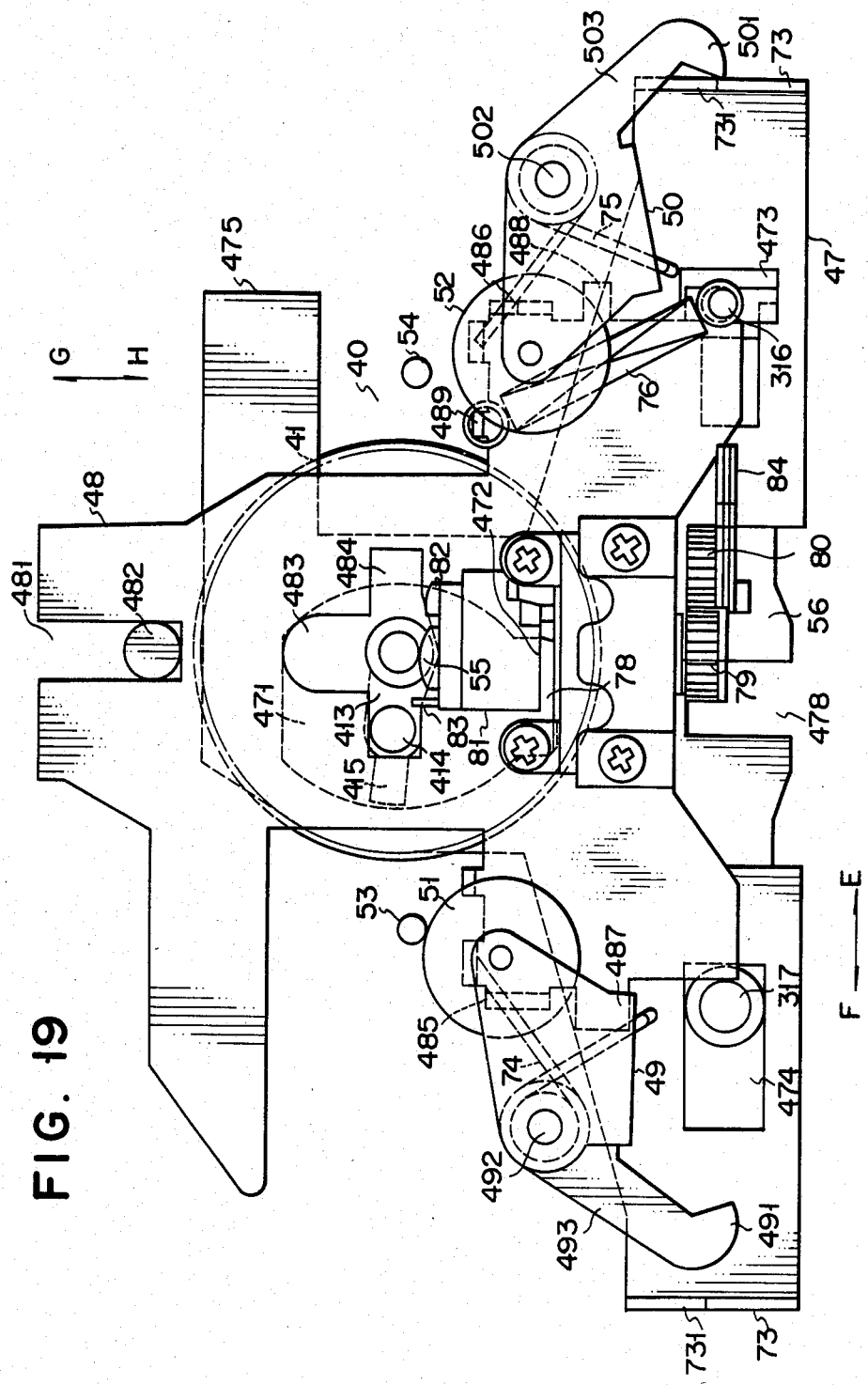

When the stop position is reached in this manner, a reversal signal is given to the assisting motor 42 to reverse the same if an auto-reverse mode has been set. As a result, the main gear cam 41 is reversed and rotated clockwise, and the forward/reverse selector 40 is actuated to establish a reverse playback mode. As the main gear cam 41 rotates clockwise, as shown in FIGS. 17 and 18, the projected end portion 415 of the projecting portion 413 thereof engages the left side portion of the gain portion 472 of the playback slider 47, thereby sliding the playback slider 47 in the direction of arrow F. As the playback slider 47 slides in this manner, the recording/playback head 55 is rotated in accordance with the tape feeding direction by the head rotating mechanism 56. At the same time, the protrusion 414 of the projecting portion 413 of the main gear cam 41 engages the left side portion of the rocking hole 484 of the head slider 48. As the main gear cam 41 further rotates, as shown in FIG. 19, the projected end portion 415 of the projecting portion 413 is brought into sliding contact with the curved edge of the through hole 471. Although this does not cause the playback slider 47 to be urged in the direction of arrow F, the head slider 48 is urged in the direction of arrow G by the protrusion 414 of the projecting portion 413 and is slid to the predetermined position thereof. Thereupon, the left and right pinch levers 49 and 50 engaging the bent retaining portions 485 and 486 through the medium of the torsion springs 74 and 75 are urged counterclockwise and clockwise, respectively. Since the playback slider 47 is located farthest in the direction of arrow F, the right pinch lever 50 is caught by the retaining portion 731 at the other end portion of the playback slider 47 and is thus prevented from rocking. On the other hand, the left pinch lever 49 is rocked counterclockwise without being caught by the retaining portion 721 at the one end portion of the playback slider 47. Thus, the left pinch roller 51 is brought into contact with the left capstan 53 in the aforementioned manner. Hereupon, the current supply to the assisting motor 42 is minimized in the same manner as mentioned above to provide the motor lock state, and reverse playback operation is performed.

As the main gear cam 41 rotates clockwise as illustrated, the other end portion of the engaging projection 416 abuts against the curved portion 702 of the right-hand return lever 70 of the return mechanism on the lower surface side of the main gear cam 41. Then, the return lever 70 is rocked counterclockwise around the rocking shaft 701 against the urging force of the return spring 71. Meanwhile, the left-hand return lever 69 is caught by the retaining projection 315 of the main chassis 31 and is thus prevented from rocking counterclockwise. As the main gear cam 41 rotates further, the right-hand return lever 70 is further rocked counterclockwise by the engaging projection 416. In the reverse playback mode where the sliding of the head slider 48 is ended, the substantially central portion of the engaging projection 416 of the main gear cam 41 engages the one end portion of the curved portion 702 of the return lever 70.

Figure 20:
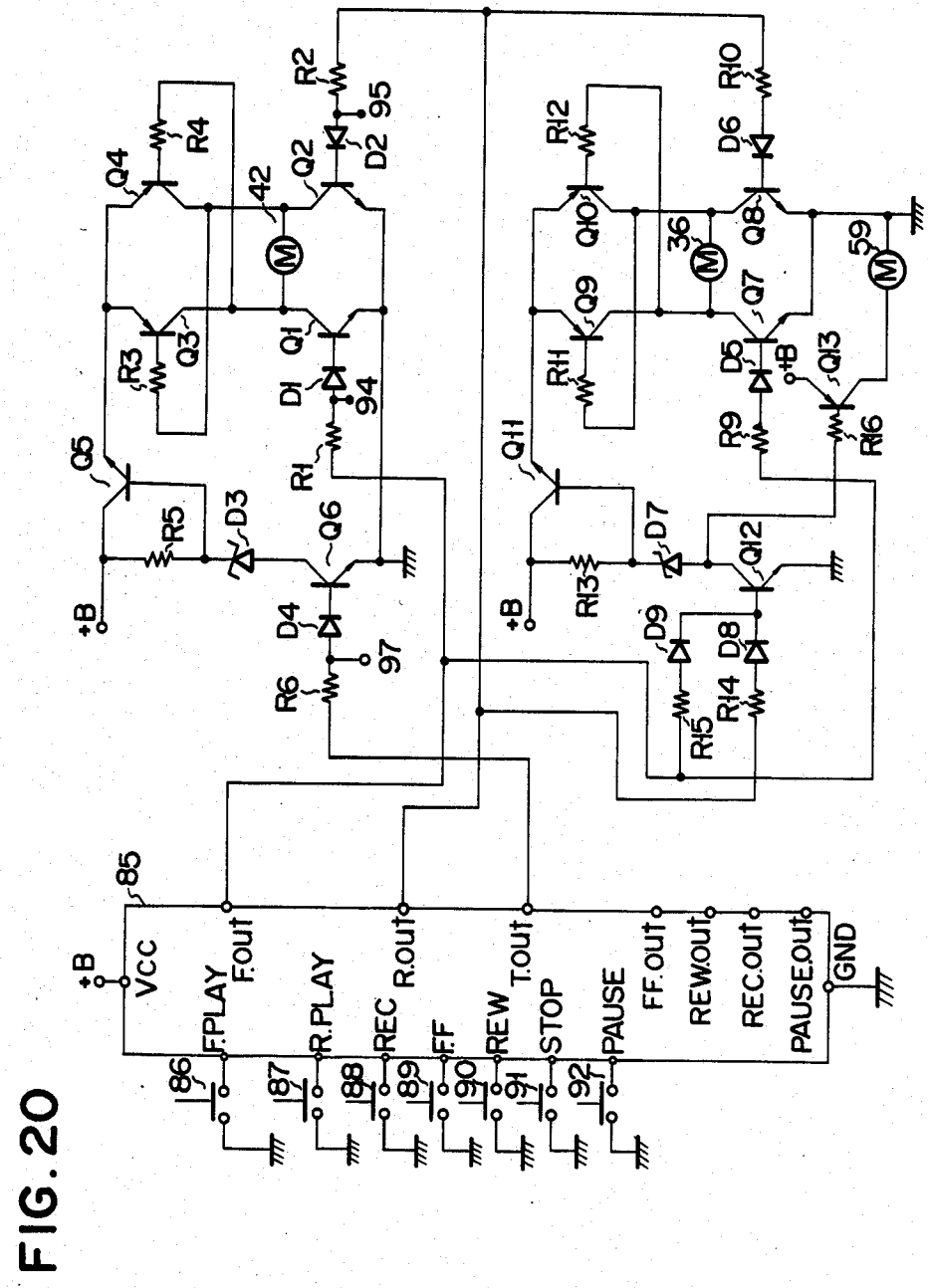
Figure 21:
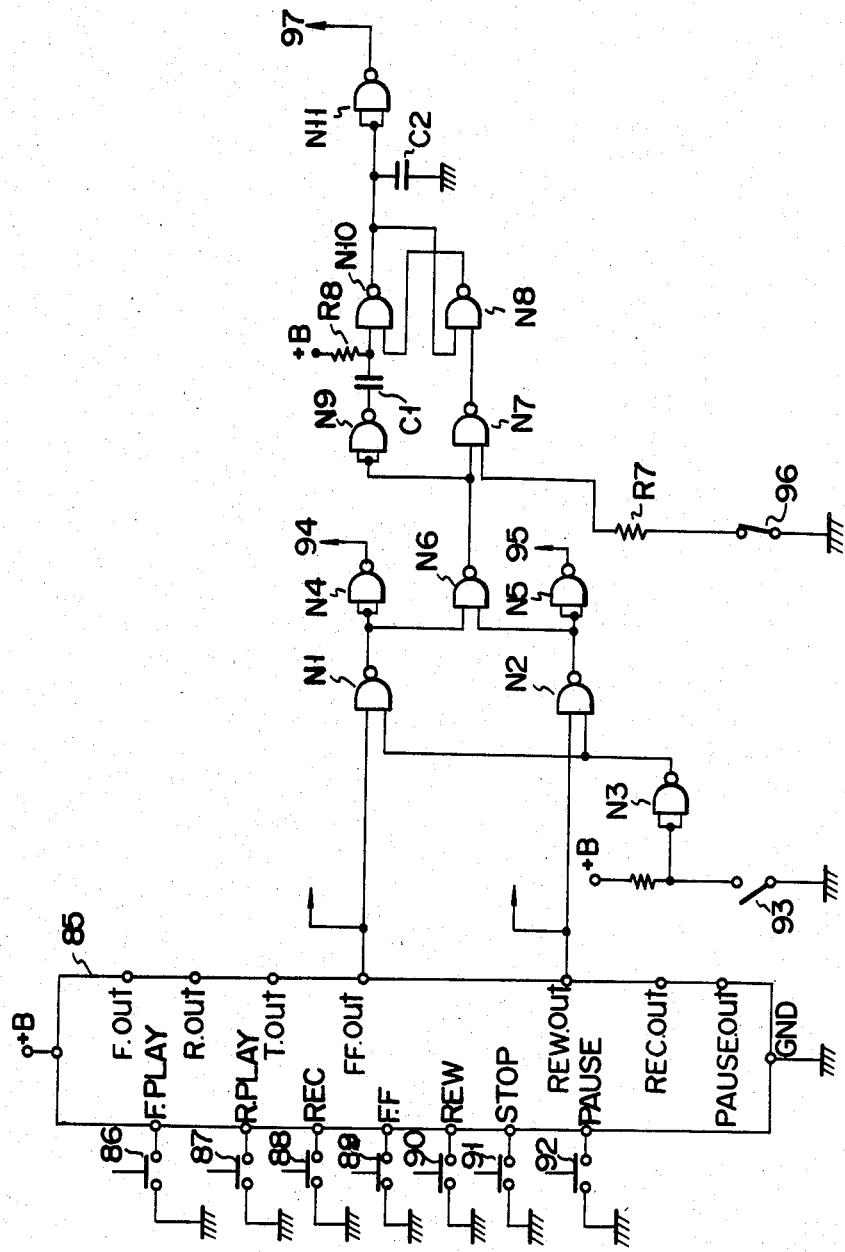

A circuit for controlling the tape recorder including the motor drive assisting mechanism will now be described. As shown in FIGS. 20 and 21, a logic control circuit 85 has its power supply terminal (V$_{CC}$) connected to an electric power source (+B) and its grounding terminal (GND) grounded. A forward playback input terminal (F-PLAY), reverse playback input terminal (R-PLAY), recording input terminal (REC), fast forward input terminal (FF), rewinding input terminal (REW), stop input terminal (STOP), and pause input terminal (PAUSE) of the logic control circuit 85 are connected, respectively, to one ends of switches 86, 87, 88, 89, 90, 91 and 92 the other ends of which are all grounded. When the switches 86 to 92 are operated, the input terminals F-PLAY, R-PLAY, REC, REW, FF, STOP and PAUSE of the logic control circuit 85 corresponding to the switches 86 to 92 are on the ground potential level or low level (hereinafter referred to as L-level). Consequently, signals from a forward playback output terminal (F-out), reverse playback output terminal (R-out), recording output terminal (REC-out), rewinding output terminal (REW-out), fast forward output terminal (FF-out), and pause output terminal (PAUSE-out) corresponding to the input terminals attain the high level (hereinafter referred to as H-level). The assisting motor 42, the reel motor 36, and the main motor 59 are controlled on the basis of these output signals for the start and stop of tape feed.

The assisting motor 42 is connected between the junctions of transistors Q1, Q2, Q3 and Q4 of bridge connection. Among these transistors Q1, Q2, Q3 and Q4, the lower-side transistors Q1 and Q2 have their bases connected to the forward playback output terminal (F-out) and the reverse playback output terminal (R-out), respectively, of the logic control circuit 85 through diodes D1 and D2 and resistors R1 and R2. The upper-side transistors Q3 and Q4 each have their base connected to the other's collector through resistors R3 and R4, and their emitters connected to the power source (+B) through a transistor Q5 which is so designed as to control current supply to the assisting motor 42. The base of the transistor Q5 is connected to the collector of a transistor Q6 through a zener diode D3 which is connected to the power source (+B) through a resistor R5. The base of the transistor Q6 is connected to a signal output terminal (T-out) of the logic control circuit 85 through a diode D4 and a resistor R6.

The fast forward output terminal (FF-out) and the rewinding output terminal (REW-out) of the logic control circuit 85 are connected to one input terminal each of NAND circuits N1 and N2, respectively. The other input terminals of the NAND circuits N1 and N2 are connected in common with the output terminal of a NAND circuit N3 which is connected to a selector switch 93 (mentioned later). The output terminals of the NAND circuits N1 and N2 are connected to the input terminals of NAND circuits N4 and N5, respectively, for supplying the assisting motor 42 with a forward or reverse rotation signal, and also to one and the other input terminals of a NAND circuit N6, respectively. The output terminals of the NAND circuits N4 and N5 are connected to connecting terminals 94 and 95, respectively, of the assisting motor driving circuit so that the assisting motor 42 is rotated in the forward or reverse direction in accordance with the operation of the switches 89–90. The output terminal of the NAND circuit N6 is connected to one input terminal of a NAND circuit N7, the other end of which is connected to a head position detecting switch 96 through a resistor R7. The output terminal of the NAND circuit N7 is connected to one input terminal of a NAND circuit N8. The output of a NAND circuit N9, whose input terminals are connected in common with the output terminal of the NAND circuit N6, is connected to one input terminal of a NAND circuit N10 through a capacitor C1 and a resistor R8 which is connected at one end to the power source (+B). The other input terminal of the NAND circuit N10 is cross-connected with the other input terminal of the NAND circuit N8, and the output terminal of the NAND circuit N10 is connected through a capacitor C2 to a NAND circuit N11 for extracting current control signals. The output terminal of the NAND circuit N11 is connected to a connecting terminal 97 of the assisting motor driving circuit.

Like the assisting motor 42, the reel motor 36 is connected between the junctions of transistors Q7, Q8, Q9 and Q10 of bridge connection. Among these transistors Q7, Q8, Q9 and Q10, the lower-side transistors Q7 and Q8 have their bases connected to the forward playback output terminal (F-out) and the reverse playback output terminal (R-out), respectively, of the logic control circuit 85 through diodes D5 and D6 and resistors R9 and R10. The upper-side transistors Q9 and Q10 each have their base connected to the other's collector through resistors R11 and R12, and their emitters connected to the power source (+B) through a transistor Q11 which is designed to control current supply to the reel motor 36. The base of the transistor Q11 is connected to the collector of a transistor Q12 through a zener diode D7 which is connected to the power source (+B) through a resistor R13. The base of the transistor Q12 is connected to the forward playback output terminal (F-out) and the reverse playback output terminal (R-out) of the logic control circuit 85 through a diode D8 and a resistor R14 and through a diode D9 and a resistor R15, respectively.

The main motor 59 is grounded at one end and connected at the other end to the collector of a transistor Q13. The transistor Q13 has its emitter connected to the power source (+B) and its base connected to the collector of the transistor Q12 through a resistor R16.

Figure 22:
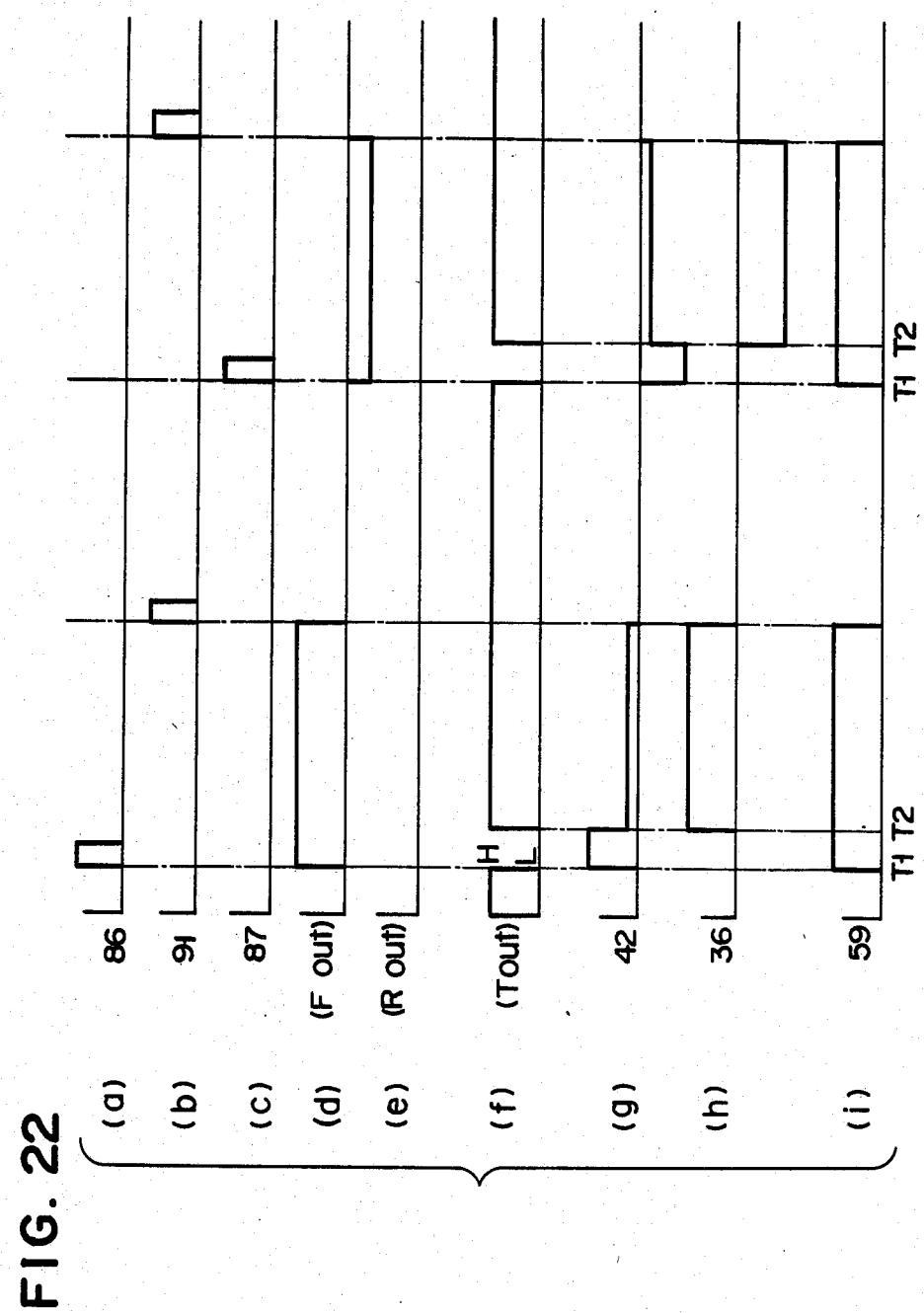

When a power switch (not shown) is operated for forward playback, the signal output terminal (T-out) of the logic control circuit 85 attains the H-level. If the switch 86 is operated at time T1, as shown in FIG. 22, the signal output terminal (T-out) of the logic control circuit 85 becomes low to turn off the transistor Q6, and the forward playback output terminal (F-out) becomes high to turn on the transistor Q1. As a result, the assisting motor 42 is supplied with enough current to drive the motor 42 in a specified direction for a given period of time (until time T2), and is rotated in the forward direction. Then, the main gear cam 41 is rotated in the aforementioned manner to actuate the forward/reverse selector 40 for the forward tape feed. In synchronism with the switching operation of the forward/reverse selector 40, the head rotating mechanism 56 is operated to bring the recording/playback head 55 into contact with the tape surface in accordance with the tape feeding direction, and the right pinch lever 50 is rocked to cause the right pinch roller 52 to hold the tape against the right capstan 54. At this time, the signal output terminal (T-out) of the logic control circuit 85 becomes high to turn on the transistor Q6. Accordingly, the assisting motor 42 is supplied with a predetermined minute current to be locked. In this state, the forward playback operation is performed.

The reel motor 36 is driven when the transistors Q7 and Q12 are turned on at time T2 when the assisting motor 42 is locked. Thereupon, the reel motor 36 is rotated at the speed and in the direction corresponding to the normal-speed forward tape feed. Thus, the gear 39 engages the gear 35 of the reel holder 33 in the aforementioned manner for the normal-speed forward tape feed.

The main motor 59 is driven when the transistor Q13 is turned on at time T1 when the switch 86 for forward playback is operated. As mentioned before, the rotation of the main motor 59 is transmitted to the left and right capstans 53 and 54 through the left and right flywheels 57 and 58, respectively.

If the switch 87 is operated (or if the tape end is detected by the tape end detector for auto-reverse operation) at time T1 for reverse playback with the power switch on, the signal output terminal (T-out) of the logic control circuit 85 becomes low to turn off the transistor Q6, and the reverse playback output terminal (R-out) becomes high to turn on the transistor Q2. As a result, the assisting motor 42 is supplied with enough current to drive the motor 42 in a specified direction for a given period of time (until time T2), and is rotated in the reverse direction. Then, the main gear cam 41 is rotated in the aforementioned manner to actuate the forward/reverse selector 40 for the reverse tape feed. In synchronism with the switching operation of the selector 40, the head rotating mechanism 56 is operated to bring the recording/playback head 55 into contact with the tape surface in accordance with the tape feeding direction, and the left pinch lever 49 is rocked to cause the left pinch roller 51 to hold the tape against the left capstan 53. At this time, the signal output terminal (T-out) of the logic control circuit 85 becomes high to turn on the transistor Q6, just as in the aforesaid operation for forward playback. Accordingly, the assisting motor 42 is supplied with the predetermined minute current to be locked. In this state, the reverse playback operation is performed.

The reel motor 36 is driven when the transistors Q12 and Q8 are turned on at time T2 when the assisting motor 42 is locked. Thereupon, the reel motor 36 is rotated at the speed and in the direction corresponding to the normal-speed reverse tape feed. Thus, the gear 39 engages the gear 34 of the reel holder 32 in the aforementioned manner for the normal-speed reverse tape feed.

As in the forward playback operation, the main motor 59 is driven when the transistor Q13 is turned on at time T1 when the switch 87 is operated.

If the switch 89 is operated for fast forward tape feed, the reel motor 36 is rotated at the speed and in the direction corresponding to the fast forward tape feed by a fast forward circuit (not shown) connected to the fast forward output terminal (FF-out) of the logic control circuit 85. Thus, the fast forward tape feed is stably performed.

If the switch 90 is operated for rewinding, the reel motor 36 is rotated at the speed and in the direction corresponding to the rewinding mode by a rewinding circuit (not shown) connected to the rewinding output terminal (REW-out) of the logic control circuit 85. Thus, the tape rewinding is performed stably.

If the switches 86 and 89 are operated together for fast forward playback (cue), the selector switch 93 is turned on to cause the output terminal of the NAND circuit N3 and the fast forward output terminal (FF-out) of the logic control circuit 85 to become high. Accordingly, the output terminal of the NAND circuit N4 becomes high to turn on the transistor Q1 of the assisting motor driving circuit and to turn off the transistor Q6 as mentioned before. As a result, the assisting motor 42 is supplied with enough current to drive the motor 42 in a specified direction, and is rotated in the forward direction. Then, the main gear cam 41 is rotated to actuate the forward/reverse selector 40 for the forward tape feed and to rotate the recording/playback head 55 in accordance with the tape feeding direction. Thereafter, the head slider 48 slides in the aforementioned manner to bring the recording/playback head 55 softly into contact with the tape surface, and the head position detecting switch 96 is turned off before the right pinch roller 52 abuts against the right capstan 54. Thereupon, the output terminal of the NAND circuit N11 is caused to become high by the NAND circuits N6, N7, N8, N9 and N10, and the transistor Q6 of the assisting motor driving circuit is turned on. Accordingly, the assisting motor 42 is supplied with a minute current to be locked. In this state, the fast forward playback (cue) operation is performed.

If the switches 87 and 90 are operated together for rewinding playback (review), the selector switch 93 is turned on to cause the output terminal of the NAND circuit N3 and the rewinding output terminal (REW-out) of the logic control circuit 85 to become high. Accordingly, the output terminal of the NAND circuit N5 becomes high to turn on the transistor Q2 of the assisting motor driving circuit and to turn off the transistor A6 as mentioned before. As a result, the assisting motor 42 is supplied with enough current to drive the motor 42 in a specified direction, and is rotated in the reverse direction. Then, the main gear cam 41 is rotated to actuate the forward/reverse selector 40 for the reverse tape feed and to rotate the recording/playback head 55 in accordance with the tape feeding direction. Thereafter, as in the case of the fast forward playback operation, the head slider 48 slides to bring the recording/playback head 55 softly into contact with the tape surface, and the head position detecting switch 96 is turned off before the left pinch roller 51 abuts against the left capstan 53. Thereupon, the output terminal of the NAND circuit N11 is caused to become high by the NAND circuits N6, N7, N8, N9 and N10, and the transistor Q6 of the assisting motor driving circuit is turned on. Accordingly, the assisting motor 42 is supplied with a minute current to be locked. In this state, the rewinding playback (review) operation is performed.

Figure 23:
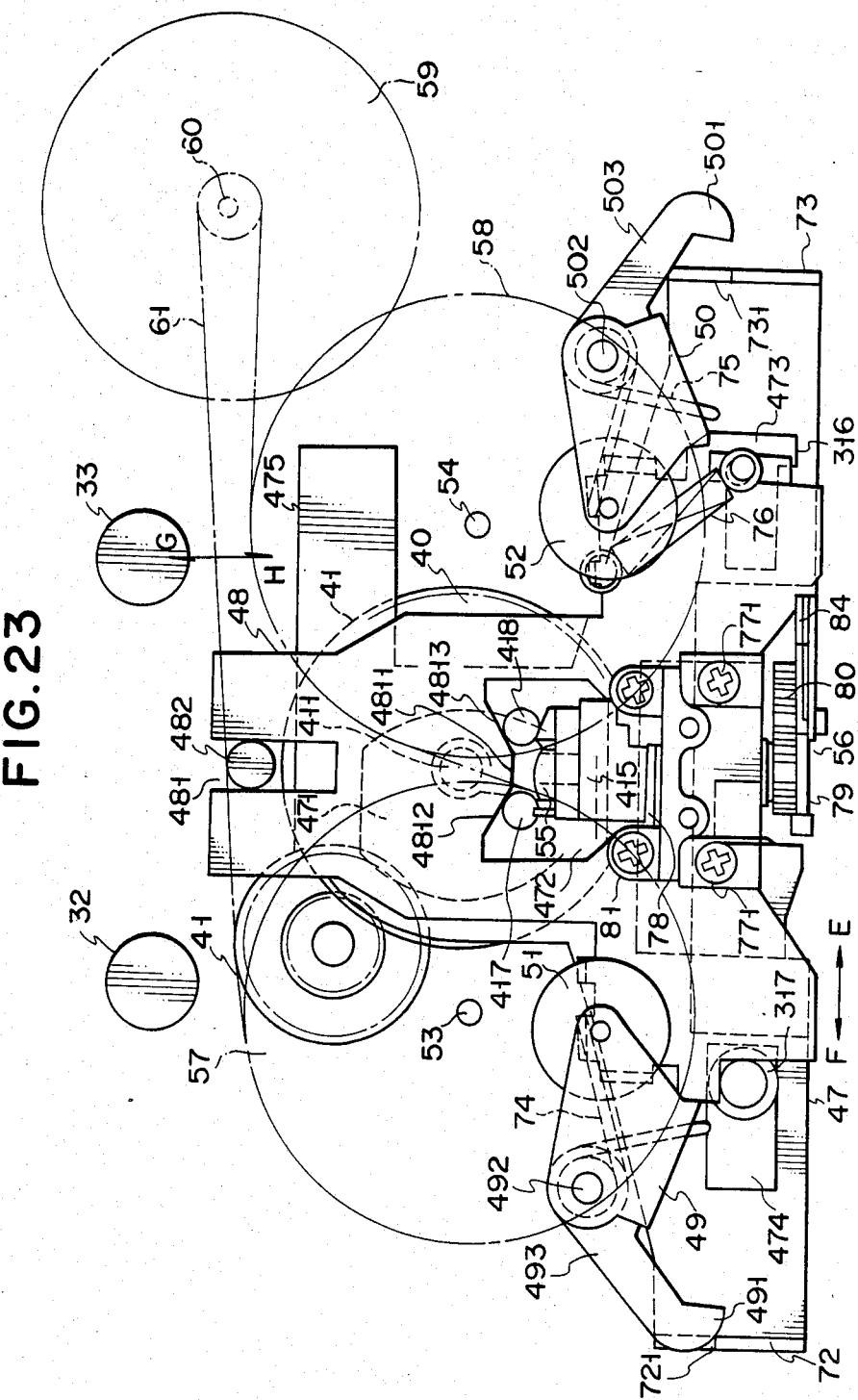
FIGS. 23 to 29 are diagrams for illustrating the construction and operation of a second embodiment of the invention.
Figure 24:
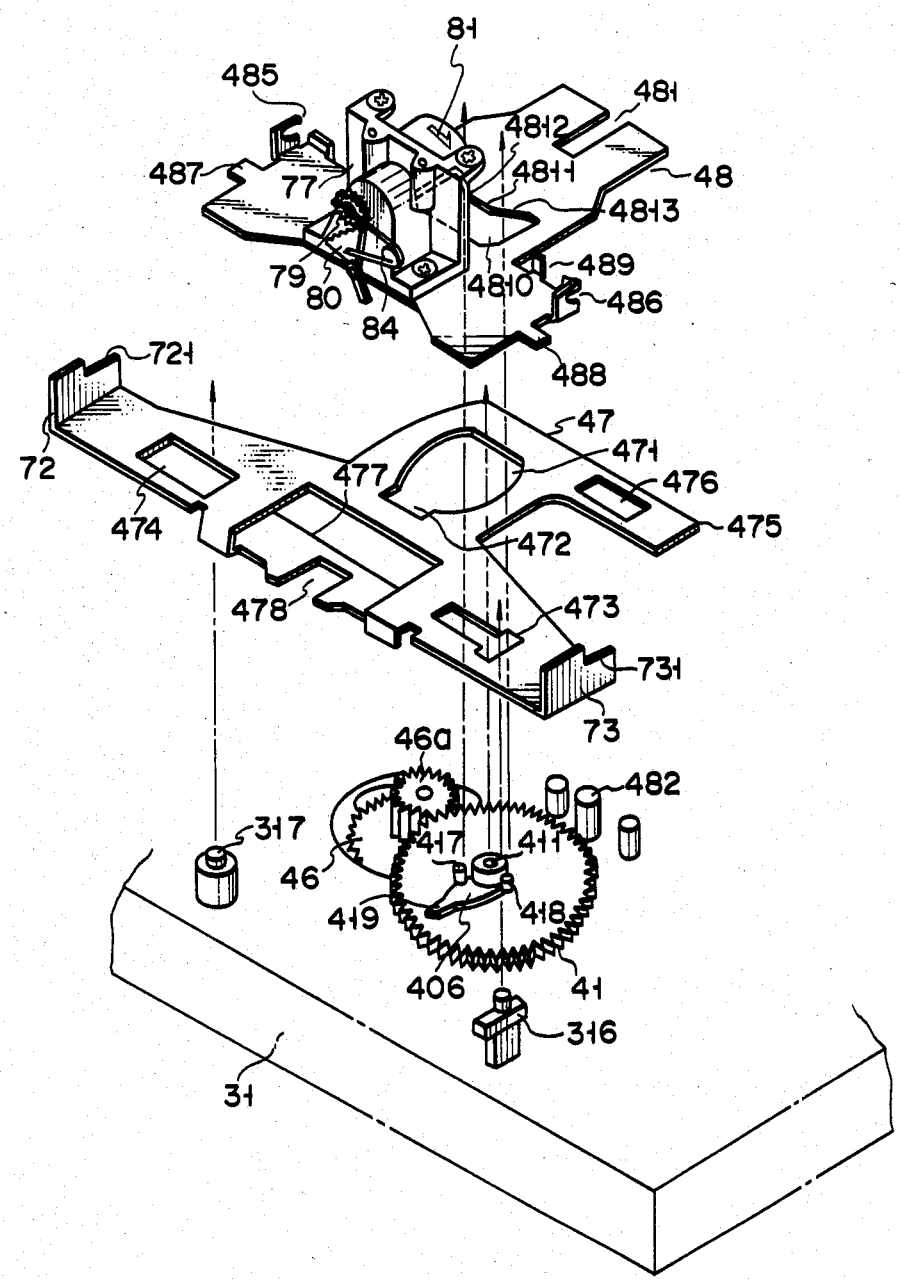

FIGS. 23 and 24 show another embodiment of this invention. In this second embodiment, a main gear cam 41 rotated in the same manner as the one used in the foregoing fundamental embodiment has a projecting portion 406 which projects downward, as illustrated, from a rotating shaft 411 on the upper surface side of the main gear cam 41. A pair of upward protrusions 417 and 418 are formed on the intermediate part of the projecting portion 406. The projecting portion 406 of the main gear cam 41 is inserted in a curved through hole 471 of a playback slider 47 so that a projected end portion 419 of the projecting portion 406 faces a gain portion 472 of the through hole 471.

Instead of the through hole 483 and the rocking hole 484, a substantially rectangular rocking hole 4810 is formed in a head slider 48 which, like the one used in the fundamental embodiment, is disposed on the upper surface side of the playback slider 47. A projecting portion 4811 is formed at the substantially central portion of the upper edge of the rocking hole 4810. Slant portions 4812 and 4813 are formed individually on both sides of the projecting portion 4811, corresponding to the protrusions 417 and 418, respectively, of the main gear cam 41.

Figure 25:
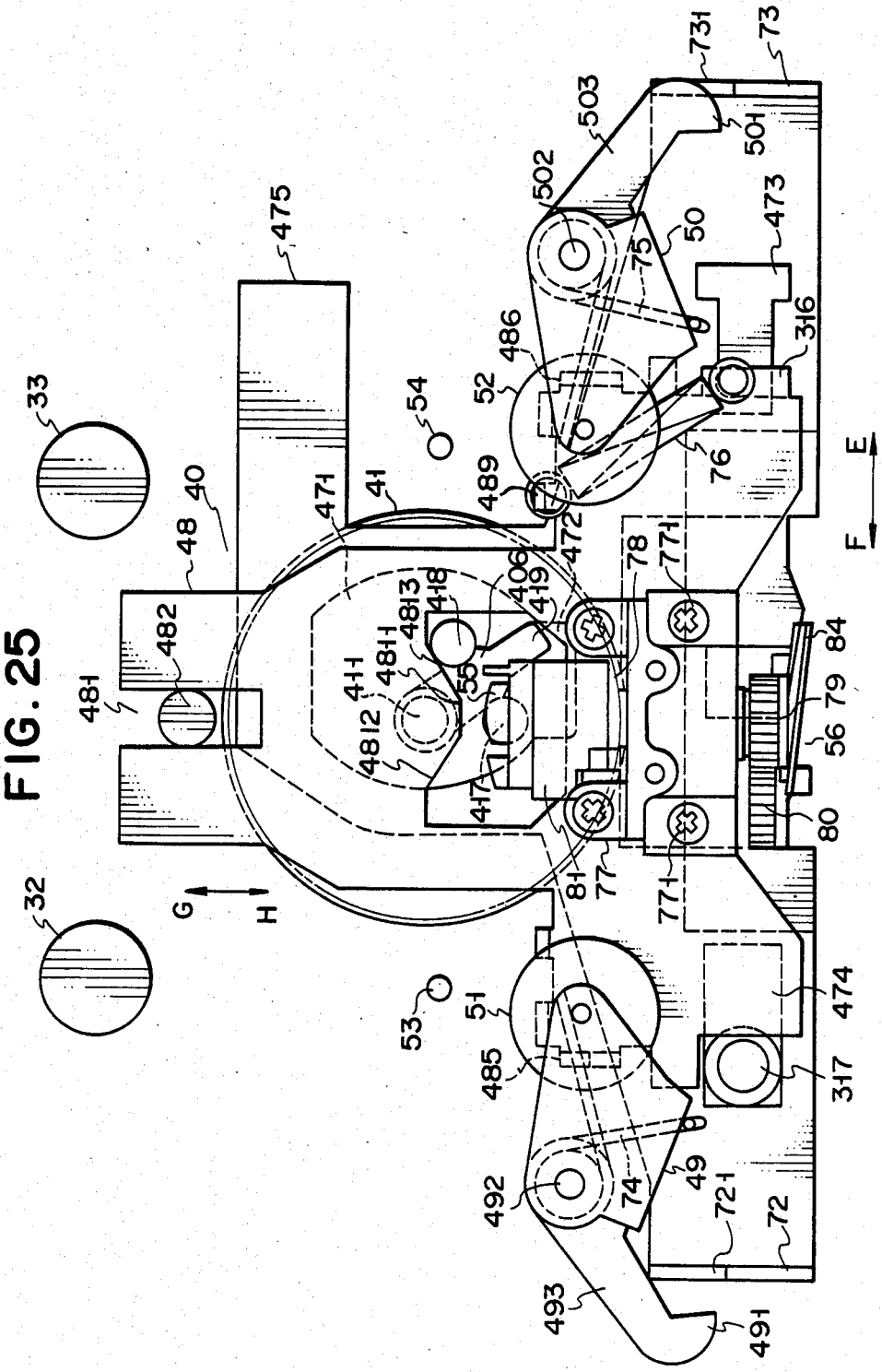
Figure 26:
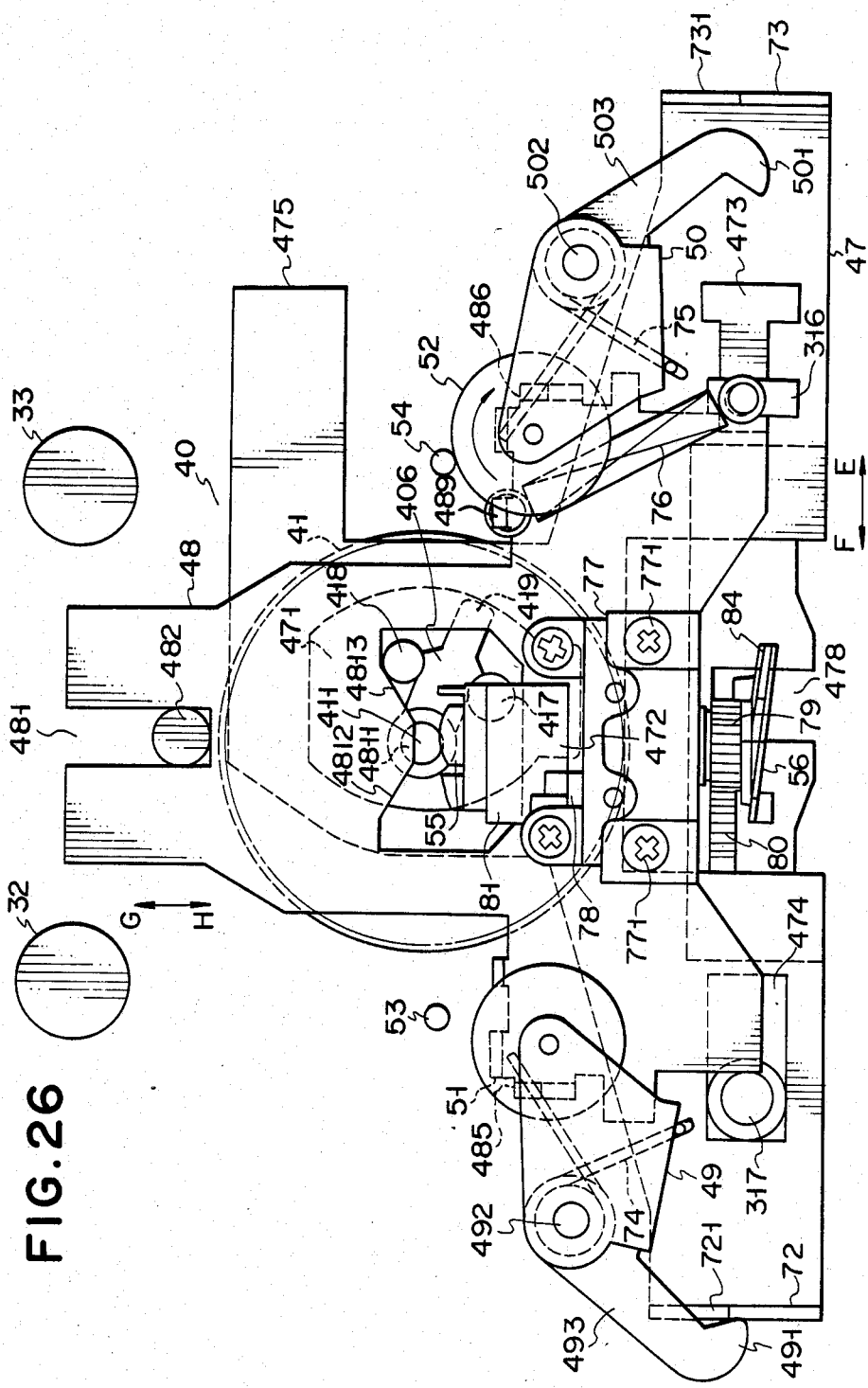

If an operating member (not shown) for normal-speed tape feed is operated for forward playback, the main gear cam 41 is rotated in the counterclockwise direction of FIG. 25, just as in the foregoing embodiment. Thereupon, at the initial stage of the rotation of the main gear cam 41, as shown in FIG. 25, the projected end portion 419 of the projecting portion 406 engages the right side portion of the gain portion 472 of the playback slider 47 to slide the slider 47 farthest in the direction of arrow E. As the playback slider 47 slides in this manner, a head rotating mechanism 56 resembling the one described in connection with the foregoing fundamental embodiment is actuated to rotate a recording/playback head 55 in accordance with the tape feeding direction. At the initial stage of the rotation of the main gear cam 41, moreover, the head slider 48 moves with the right-hand protrusion 418 of the main gear cam 41 in sliding contact with the right-hand slant portion 4813. Thus, the head slider 48 slides only a short distance in the direction of arrow G against the urging force of a spring 76, corresponding to the rotation angle of the main gear cam 41. Thereafter, the slide distance of the head slider 48 increases as the rotation angle of the main gear cam 41 increases. Thus, the head slider 48 is slid to a predetermined position against the urging force of the spring 76, as shown in FIG. 26. At this time, as described in connection with the fundamental embodiment, the recording/playback head 55 is brought into contact with the tape surface, and a right pinch lever 50 is rocked so that a right pinch roller 52 presses the tape against a right capstan 54. Thus, as in the fundamental embodiment, an assisting motor 42 is supplied with a minute current to be locked, and the forward playback operation is performed.

If an operating member (not shown) for tape feed stop is operated in the middle of the forward playback operation to cut off the assisting motor 42 from current supply, the head slider 48 is retracted in the direction of arrow H by the urging force of the spring 76, as shown in FIG. 23. As the head slider 48 retracts in this manner, the protrusion 418 of the main gear cam 41 is pressed so that the main gear cam 41 is rotated clockwise. Thus, the head slider 48 and the playback slider 47 are securely returned to their respective stop positions.

Figure 27:
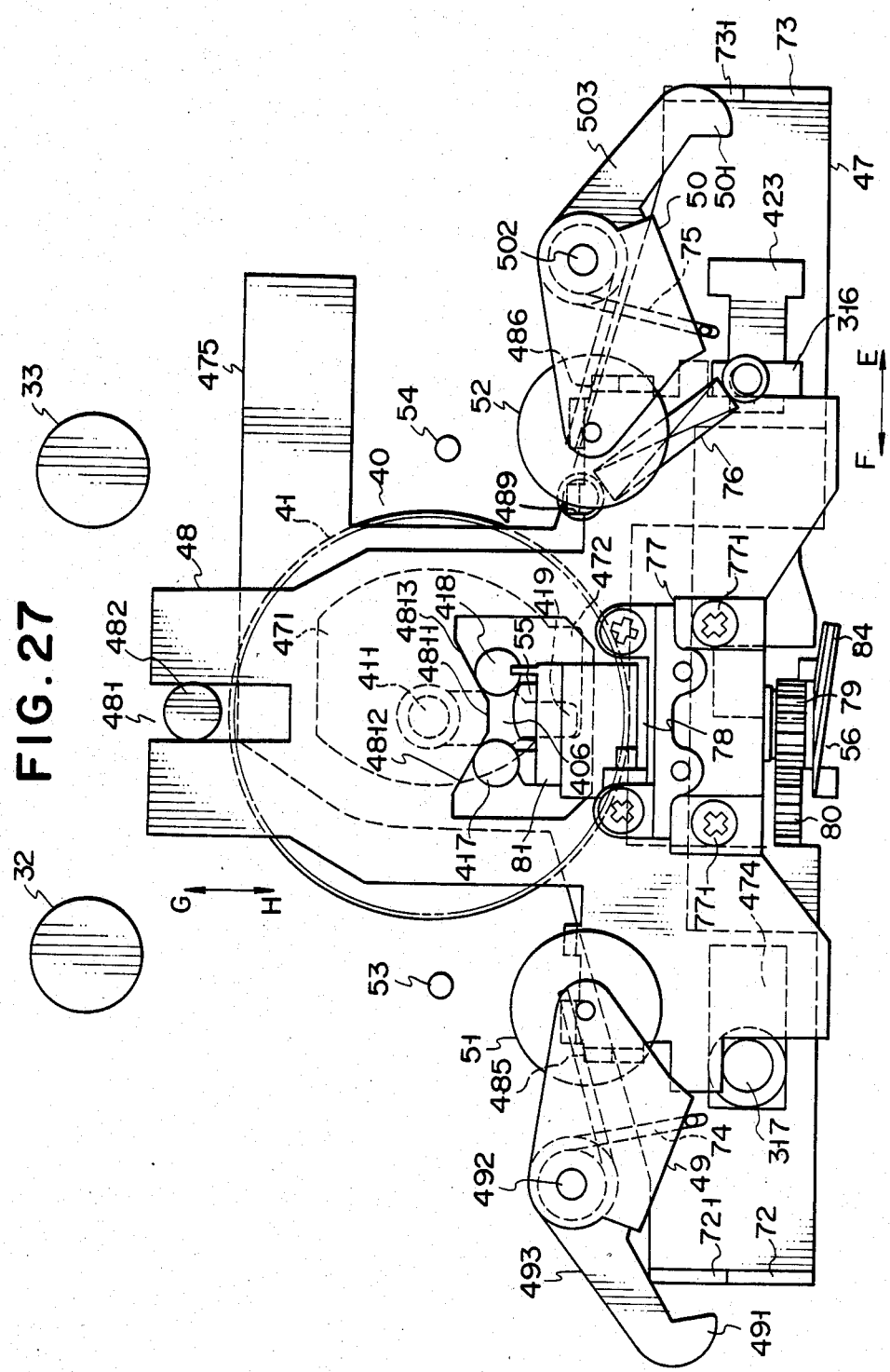
Figure 28:
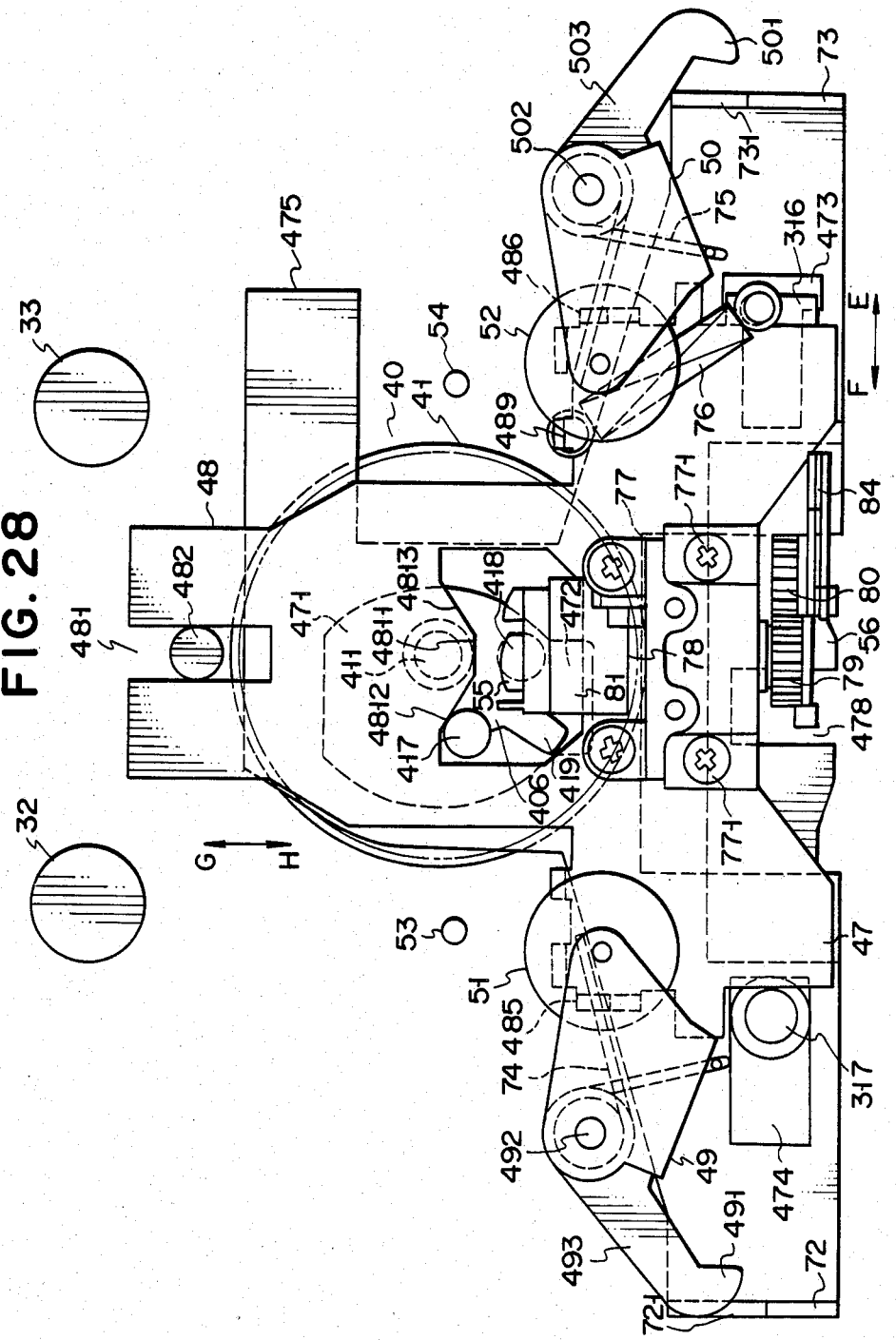
Figure 29:
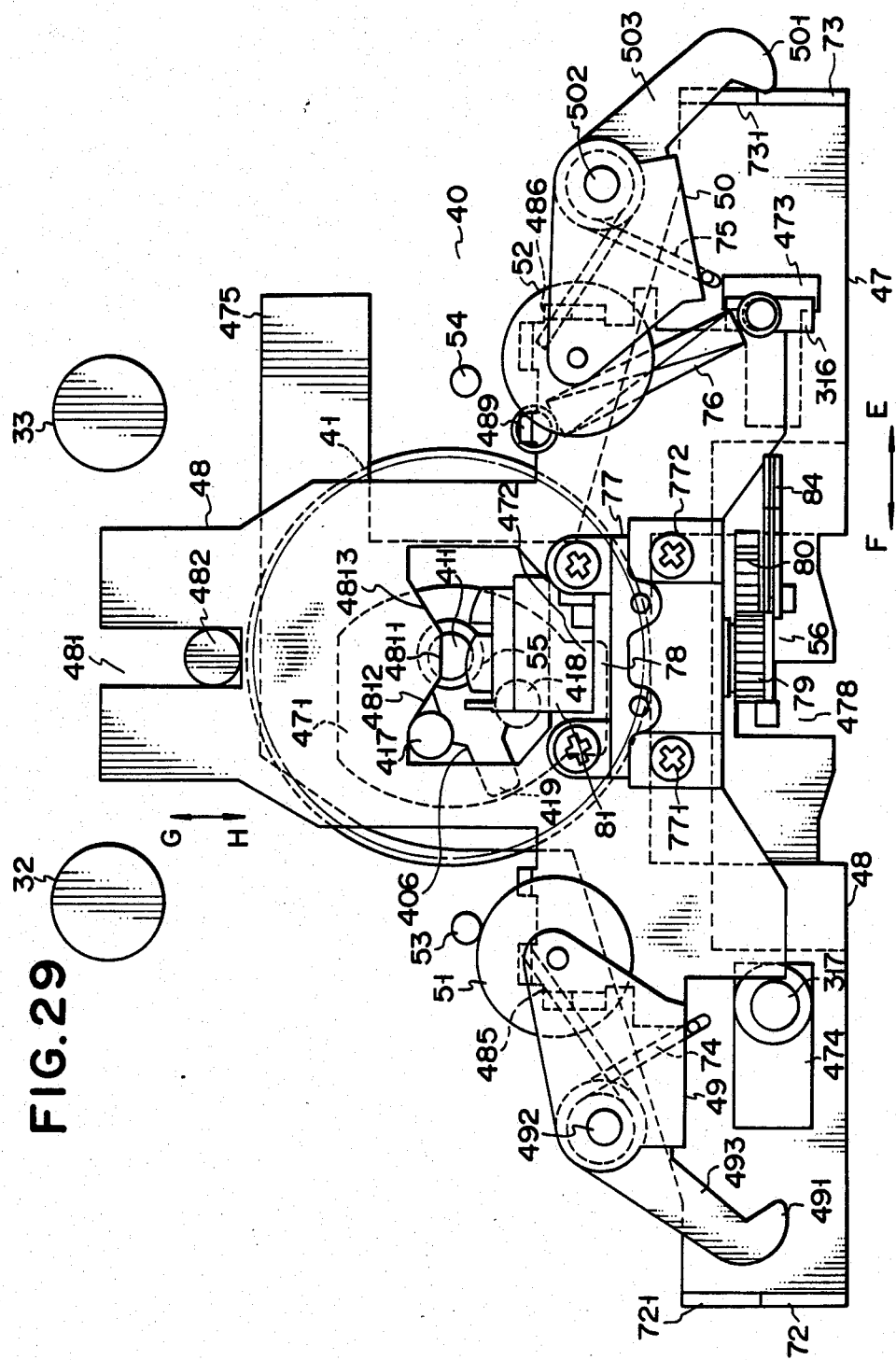

If an operating member (not shown) for normal-speed tape feed is operated for reverse playback, the main gear cam 41 is rotated clockwise, as in the fundamental embodiment. Thereupon, at the initial stage of the rotation of the main gear cam 41, as shown in FIGS. 27 and 28, the projected end portion 419 of the projecting portion 406 engages the left side portion of the gain portion 472 of the playback slider 47 to slide the slider 47 farthest in the direction of arrow F. As the playback slider 47 slides in this manner, the head rotating mechanism 56 is actuated to rotate the recording/playback head 55 in accordance with the tape feeding direction. At the initial stage of the rotation of the main gear cam 41, moreover, the head slider 48 moves with the left-hand protrusion 417 of the main gear cam 41 in sliding contact with the left-hand slant portion 4812. Thus, the head slider 48 is slid only a short distance in the direction of arrow G against the urging force of the spring 76, corresponding to the rotation angle of the main gear cam 41. Thereafter, the slide distance of the head slider 48 increases as the rotation angle of the main gear cam 41 increases. Thus, the head slider 48 is slid to a predetermined position against the urging force of the spring 76, as shown in FIG. 29. At this time, as described in connection with the fundamental embodiment, the recording/playback head 55 is brought into contact with the tape surface, and a left pinch lever 49 is rocked so that a left pinch roller 51 presses the tape against a left capstan 53. Thus, as in the fundamental embodiment, the assisting motor 42 is supplied with a minute current to be locked, and the reverse playback operation is performed.

It is to be understood from the above description of the forward and reverse playback operations that the fast forward and rewinding playback operations (cue and review) may be securely performed in the same manner as in the foregoing fundamental embodiment.

The head rotating mechanism used in the fundamental and second embodiment may be replaced with a fixed head.

Figure 30:
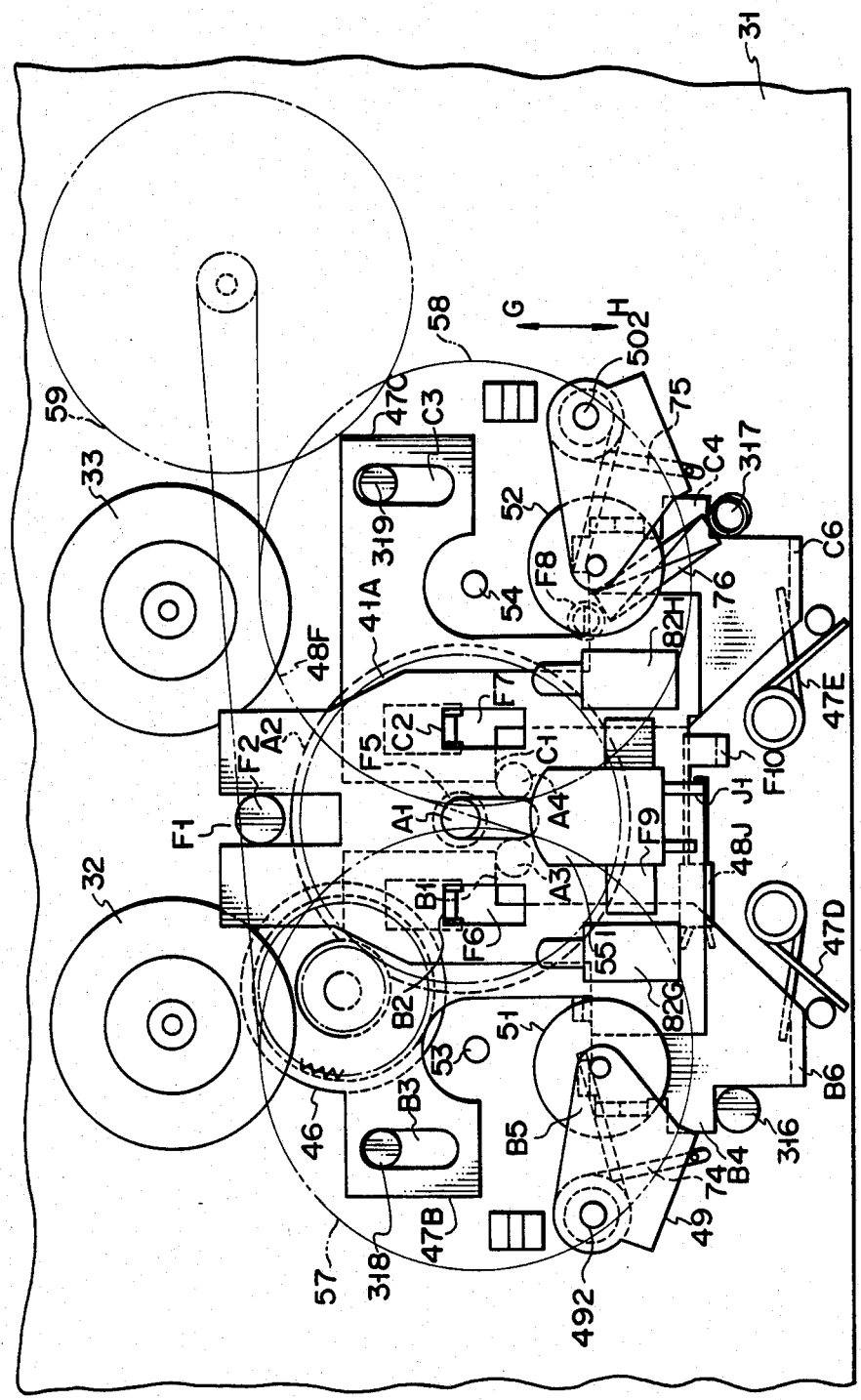
FIGS. 30 to 37 are diagrams for illustrating the construction and operation of a third embodiment of the invention.
Figure 31:
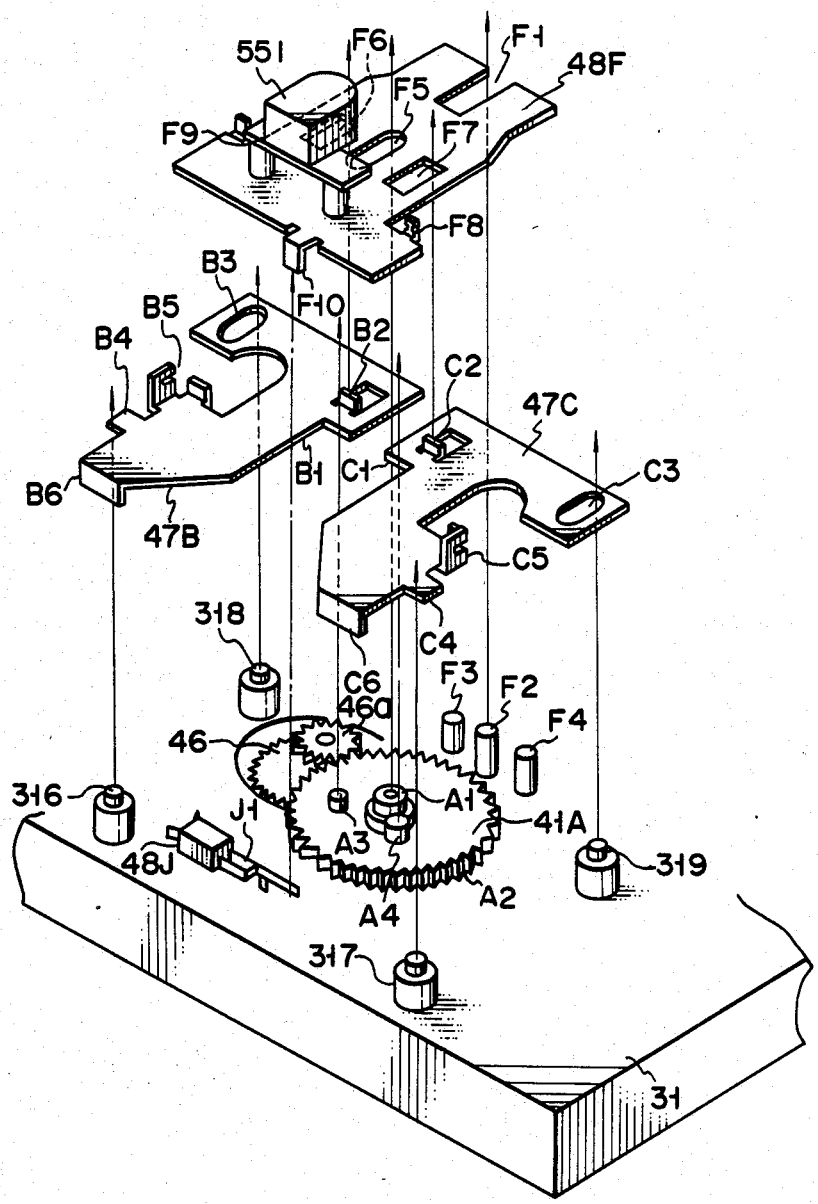
Figure 32:
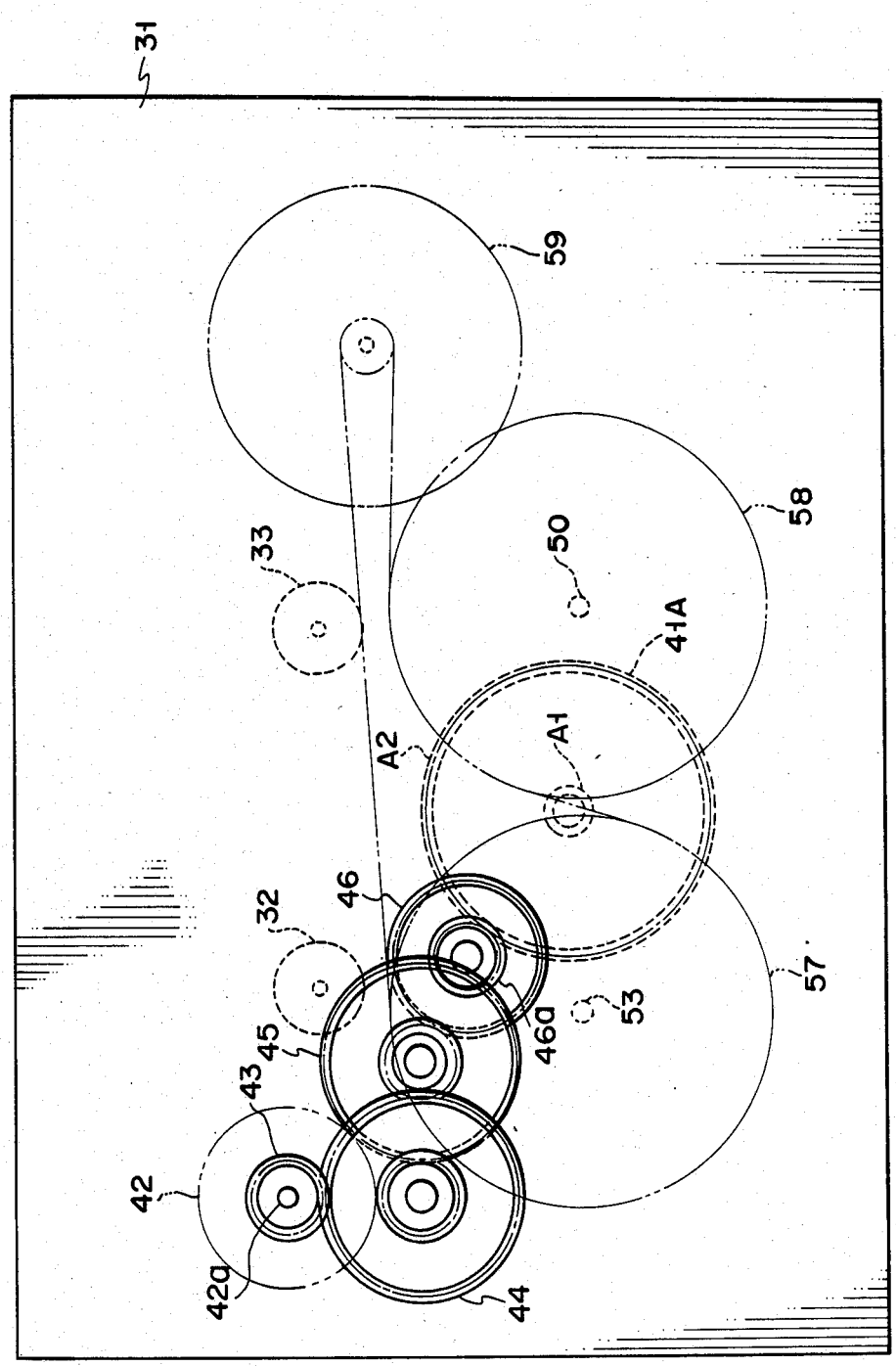

This invention may also be constructed in still another embodiment as follows. FIG. 30 is an obverseside plane view of a tape recorder according to the third embodiment showing a general construction of a forward/reverse selector similar to that of the fundamental embodiment. FIG. 31 is a disassembled perspective view showing components of the forward/reverse selector, and FIG. 32 is a plane view showing the reverse side of a main chassis 31. In FIG. 30, a pair of reel holders 32 and 33 constructed as described in connection with the fundamental embodiment are rotatably supported on the main chassis 31. As described in connection with the fundamental embodiment, the reel holders 32 and 33 are rotated by a reel motor (not shown) on the reverse side of the main chassis 31 through the medium of a gear (not shown) for forward and reverse tape feed. As described in connection with the fundamental embodiment, the rotating speed and direction of the reel motor are controlled by a reel motor driving circuit in accordance with the operation of an operating member (not shown) for normal-speed tape feed (recording and forward/reverse playback) or an operating member (not shown) for high-speed tape feed (fast forward and rewinding). When the operating member for normal- or high-speed tape feed or an operating member (not shown) for stop (including pause) is actuated, a rotation or stop mode of the reel motor 36 can be established by a logic control circuit similar to the one used in the fundamental embodiment.

The forward/reverse selector used in a motor drive assisting mechanism which provides substantially the same effect as the fundamental embodiment will now be described. A discoid driving part, e.g., a main gear cam 41A is rotatably mounted on a rotating shaft A1 which is set in the main chassis 31. A tooth portion A2 is formed on the periphery of the main gear cam 41A, and a pair of protrusions A3 and A4 are formed on the upper surface side of the main gear cam 41A.

As shown in FIG. 32, the main gear cam 41A is in mesh with reduction gears 44, 45 and 46 that are successively in mesh with a gear 43 rotatably mounted on a rotating shaft 42a of the assisting motor 42. Thus, the main gear cam 41A is rotated as the assisting motor 42 rotates.

The rotating direction or stop (motor lock) mode of the assisting motor 42 is controlled by the logic control circuit, an assisting motor control circuit, and an assisting motor driving circuit in accordance with the operation of the operating member for normal-speed tape feed or combined operation of the operating members for normal- and high-speed tape feed.

Substantially inverted-L-shaped left and right playback sliders 47B and 47C are arranged side by side on the upper surface side of the main gear cam 41A. Gain portions B1 and C1 are formed at one side portions of the left and right playback sliders 47B and 47C, respectively. The pair of protrusions A3 and A4 of the main gear cam 41A face the gain portions B1 and C1, respectively, so that the left or right playback slider 47B or 47C is urged in the direction of arrow G, depending on the rotating direction of the main gear cam 41A.

Retaining portions B2 and C2 are formed near the gain portions B1 and C1 on the left and right playback sliders 47B and 47C, respectively. The retaining portions B2 and C2 are inserted in a pair of sliding holes F6 and F7 formed in a head slider 48F mentioned later.

Through holes B3 and C3 are formed in the other end portions of the left and right playback sliders 47B and 47C, respectively. Shafts 318 and 319 set in the main chassis 31 are inserted in the through holes B3 and C3, respectively. Thus, the left and right playback sliders 47B and 47C are so supported as to be slidable in the directions of arrows G and H.

Retaining portions B4 and C4 are formed at one end portions of the left and right playback sliders 47B and 47C, respectively, facing retaining shafts 316 and 317, respectively, set in the main chassis 31. Thus, when the left and right playback sliders 47B and 47C are retracted to predetermined positions in the direction of arrow H, the retaining portions B4 and C4 of the playback sliders 47B and 47C are caught by the retaining shafts 316 and 317 to prevent the playback sliders 47B and 47C from retracting further.

Bent retaining portions B5 and C5 are formed near the retaining portions B4 and C4 on the left and right playback sliders 47B and 47C, respectively. Also, bent hook portions B6 and C6 are formed at the other ends of the playback sliders 47B and 47C, respectively. Torsion springs 47D and 47E engage the hook portions B6 and C6, respectively, so that the left and right playback sliders 47B and 47C are urged in the direction of arrow H.

Left and right pinch rollers 51 and 52 are arranged over the bent retaining portions B5 and C5 of the left and right playback sliders 47B and 47C, respectively. The left and right pinch rollers 51 and 52 are rotatably mounted on one end portions of left and right pinch levers 49 and 50, respectively, each having a substantially U-shaped profile. The other end portions of the left and right pinch levers 49 and 50 are rotatably mounted on rocking shafts 492 and 502, respectively, set in the main chassis 31. Torsion springs 74 and 75 are wound around rocking shafts D1 and E1 of the left and right pinch levers 49 and 50, respectively. One end portions of the torsion springs 74 and 75 engage the backside portions of the left and right pinch levers 49 and 50, respectively. The other end portions of the torsion springs 74 and 75 engage the bent retaining portions B5 and C5 of the left and right playback sliders 47B and 47C, respectively. Thus, when the left and right playback sliders 47B and 47C slide in the direction of arrow G, the left and right pinch levers 49 and 50 are rotated counterclockwise and clockwise, respectively, to be brought into contact with left and right capstans 53 and 54, respectively, which are constructed in the same manner as in the fundamental embodiment.

The substantially T-shaped head slider 48F is disposed over the left and right playback sliders 47B and 47C so as to be slidable in the directions of arrows G and H. A recess F1 is formed at the extreme end portion of the central end portion of the head slider 48F. A shaft F2 set in the main chassis 31 is passed through the recess F1. Those portions of the head slider 48F on both sides of the recess F1 lie on a pair of shafts F3 and F4 set in the main chassis 31. Thus, the head slider 48F is allowed to slide in the direction of arrow G until the bottom portion of the recess F1 abuts against the shaft F2.

A through hole F5 is formed substantially in the center of the head slider 48F. The rotating shaft A1 of the main gear cam 41A is inserted in the through hole F5. The pair of sliding holes F6 and F7 are formed individually on both sides of the through hole F5 so that the retaining portions B2 and C2 of the left and right playback sliders 47B and 47C are inserted in the sliding holes F6 and F7, respectively, as mentioned before. Thus, as one of the playback sliders 47B and 47C is slid in the direction of arrow G by the main gear cam 41A, the head slider 48F also slides in the direction of arrow G.

A bent portion F8 is formed on one end portion of the head slider 48F, and a spring 76 is stretched between the bent portion F8 and the shaft 317. Thus, the head slider 48F is urged in the direction of arrow H by the urging force of the spring 76.

A pair of erasing heads 82G and 82H are mounted on the lower side portion (in FIG. 30) of the upper surface of the head slider 48F with a fixed space between them. A head mount F9 is disposed halfway between the pair of erasing heads 82G and 82H, and a recording/playback head 55I (four-track line) is mounted on the head mount F9 for vertical motion.

A bent strip F10 is formed on the lower edge portion of the head slider 48F, engaging a detecting portion J1 of a position detecting member, e.g., a position detecting switch 48J, attached to the main chassis 31. The position detecting switch 48J, which corresponds to the head position detecting switch 96 of the fundamental embodiment, is turned on when the head slider 48F is located farthest in the direction of arrow H, that is, when the tape recorder is in the stop mode. The position detecting switch 48J is turned off when the head slider 48F slides in the direction of arrow G to bring the recording/playback head 55I softly into contact with a tape surface (not shown), that is, when the tape recorder is in the fast forward or rewinding playback mode.

Figure 33:
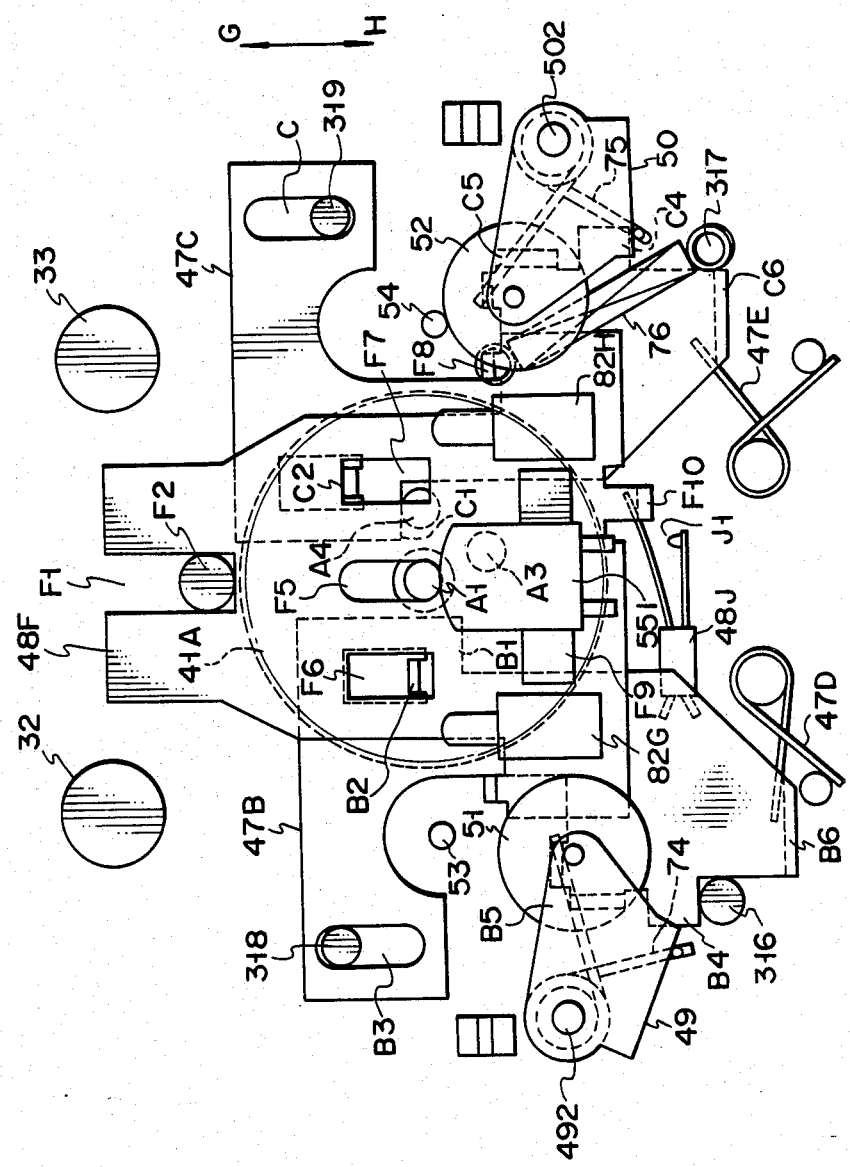

If the operating member for normal-speed tape feed is operated for forward playback, the main gear cam 41A is rotated counterclockwise, just as in the fundamental embodiment. Thereupon, as shown in FIG. 33, the right-hand protrusion A4 of the main gear cam 41A presses the gain portion C1 of the right playback slider 47C to slide the playback slider 47C in the direction of arrow G against the urging force of the torsion spring 47E. At the same time, the retaining portion C2 of the right playback slider 47C presses the edge of the sliding hole F7 of the head slider 48F to slide the head slider 48F in the direction of arrow G against the urging force of the spring 76. As a result, the recording/playback head 55I mounted on the head slider 48F is brought into contact with the tape surface in accordance with the tape feeding direction, and the right pinch lever 50 is rocked clockwise by the right playback slider 47C so that the right pinch roller 52 presses the tape against the right capstan 54. Thus, as in the fundamental embodiment, the assisting motor 42 is supplied with a minute current to be locked, and the forward playback operation is performed.

Figure 34:
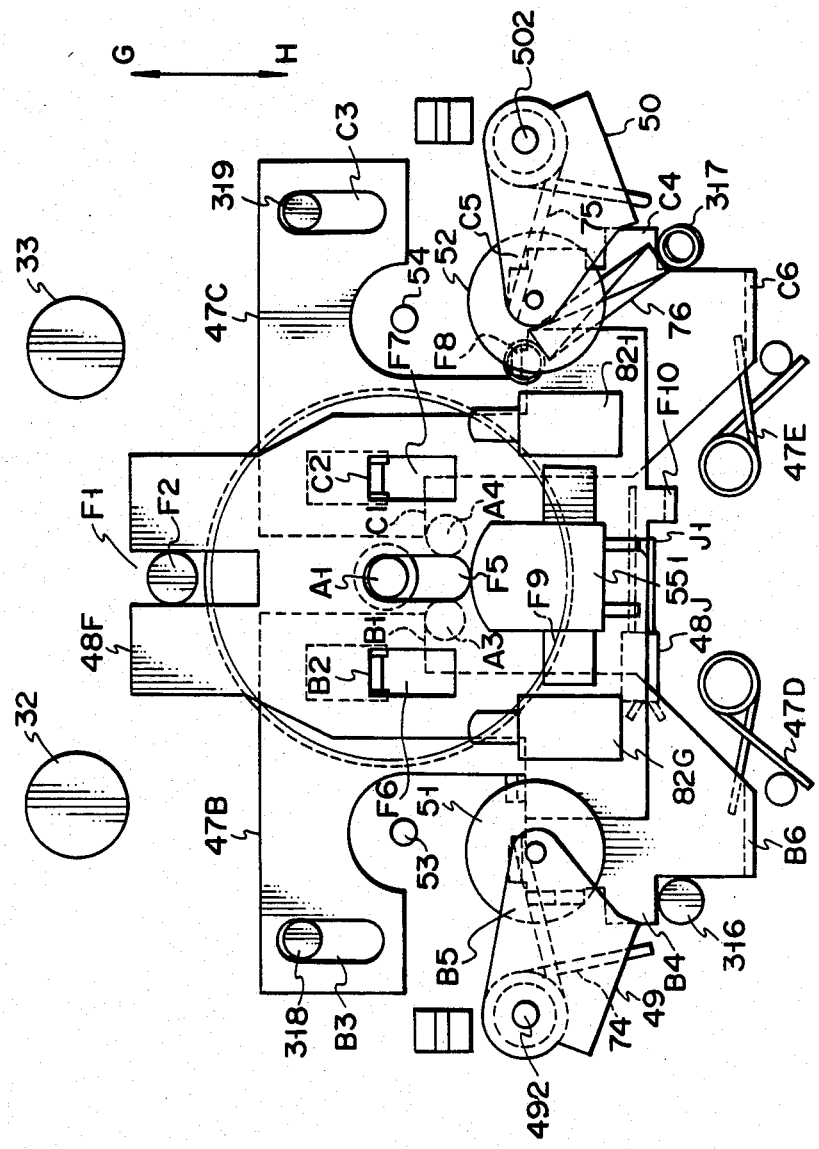

If the operating member for tape feed stop is operated in the middle of the forward playback operation to cut off current to the assisting motor 42, the head slider 48F and the right playback slider 47C are retracted in the direction of arrow H by the urging forces of the springs 76 and 74F, respectively, and are securely returned to their respective stop positions, as shown in FIG. 34. As the right playback slider 47C retracts in this manner, the main gear cam 41A is rotated clockwise to be securely returned to its stop position, as in the fundamental embodiment.

Figure 35:
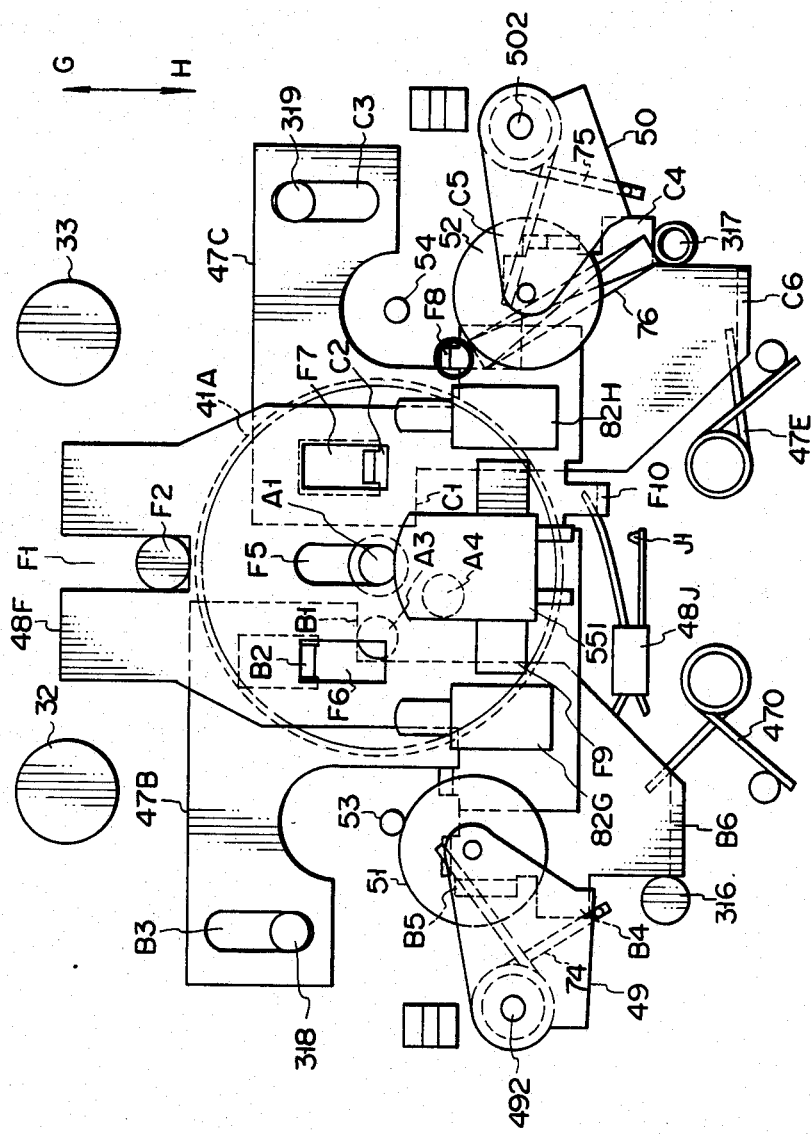

If the operating member for normal-speed tape feed is operated for reverse playback, the main gear cam 41A is rotated clockwise, just as in the fundamental embodiment. Thereupon, as shown in FIG. 35, the left-hand protrusion A3 of the main gear cam 41A presses the gain portion B1 of the left playback slider 47B to slide the playback slider 47B in the direction of arrow G against the urging force of the torsion spring 47D. At the same time, the retaining portion B2 of the left playback slider 47B presses the edge of the sliding hole F6 of the head slider 48F to slide the head slider 48F in the direction of arrow G against the urging force of the spring 76. As a result, the recording/playback head 55I mounted on the head slider 48F is brought into contact with the tape surface in accordance with the tape feeding direction, and the left pinch lever 49 is rocked counterclockwise by the left playback slider 47B so that the left pinch roller 51 presses the tape against the left capstan 53. Thus, as in the fundamental embodiment, the assisting motor 42 is supplied with a minute current to be locked, and the reverse playback operation is performed.

The reel motor and a main motor 59 are driven for the forward and reverse tape feed in the manner described in connection with the fundamental embodiment.

In the fast forward and rewinding tape feed, as described in connection with the fundamental embodiment, the reel motor is rotated at the speed and in the direction corresponding to the fast forward or rewinding mode. Thus, the fast forward or rewinding tape feed is stably performed.

Figure 36:
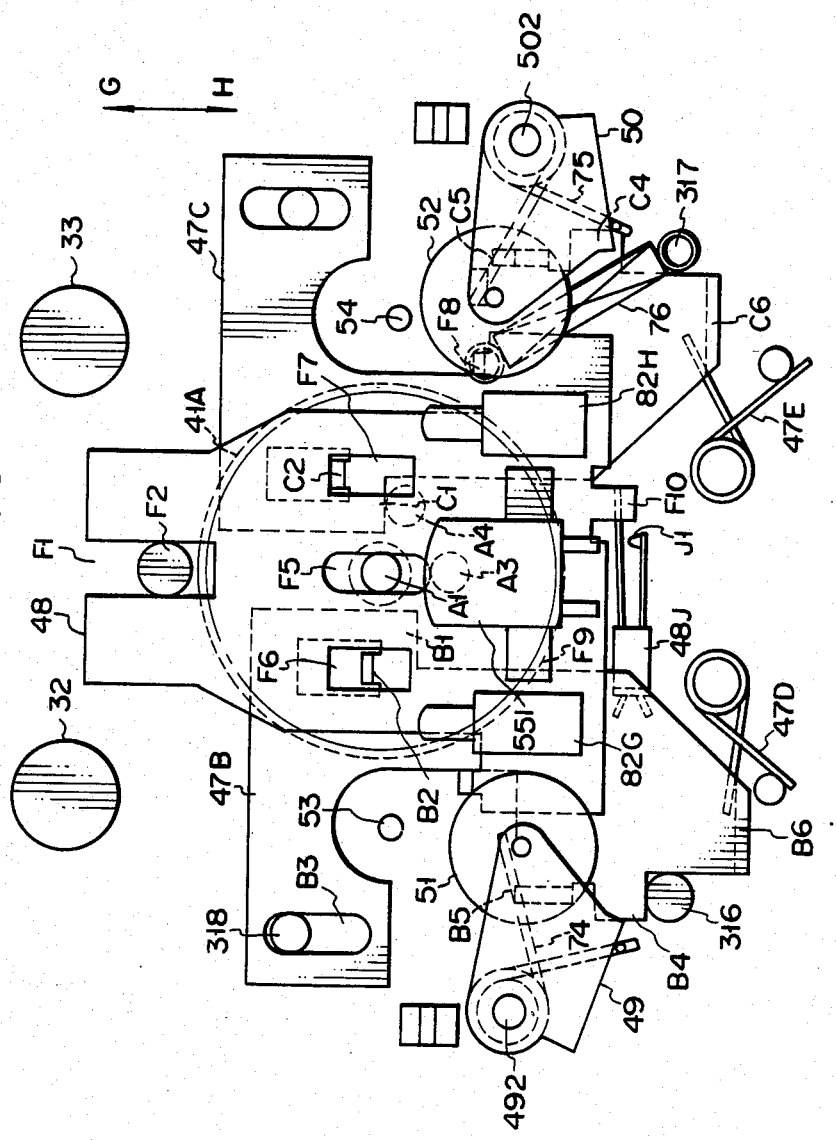
Figure 37:
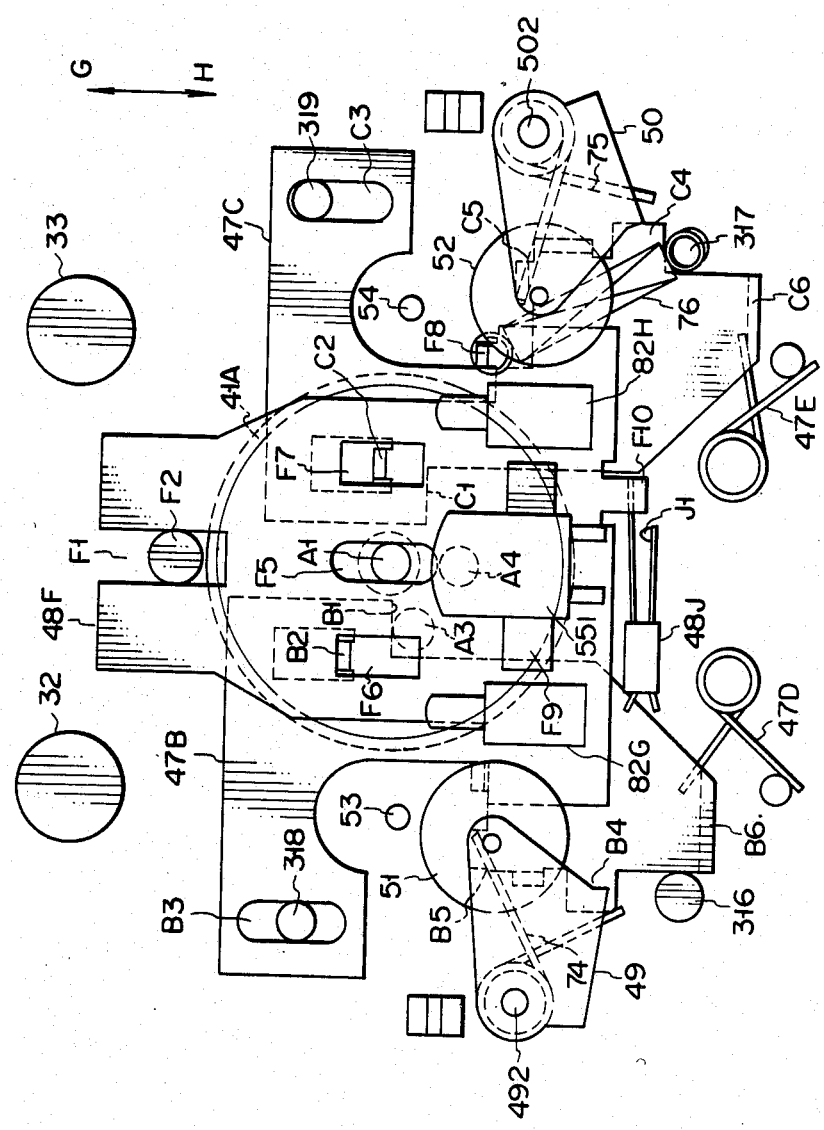

If the operating members for normal-speed tape feed (forward/reverse playback) and high-speed tape feed (fast forward and rewinding) are operated together for fast forward playback (cue) or rewinding playback (review), the main gear cam 41A is rotated in accordance with the operation mode, as in the fundamental embodiment. Thereupon, the left or right playback slider 47B or 47C and the head slider 48F slide in the direction of arrow G. When the recording/playback head 55I is brought softly into contact with the tape surface in accordance with the tape feeding direction, as shown in FIGS. 36 and 37, the position detecting switch 48J is turned off. At this time, the assisting motor driving circuit is controlled by the logic control circuit and the assisting motor control circuit so that the assisting motor 42 is supplied with a minute current to be locked. Accordingly, the main gear cam 41A is stopped at a predetermined position. In this state, the fast forward or rewinding playback (cue or review) operation is securely performed.

Figure 38:
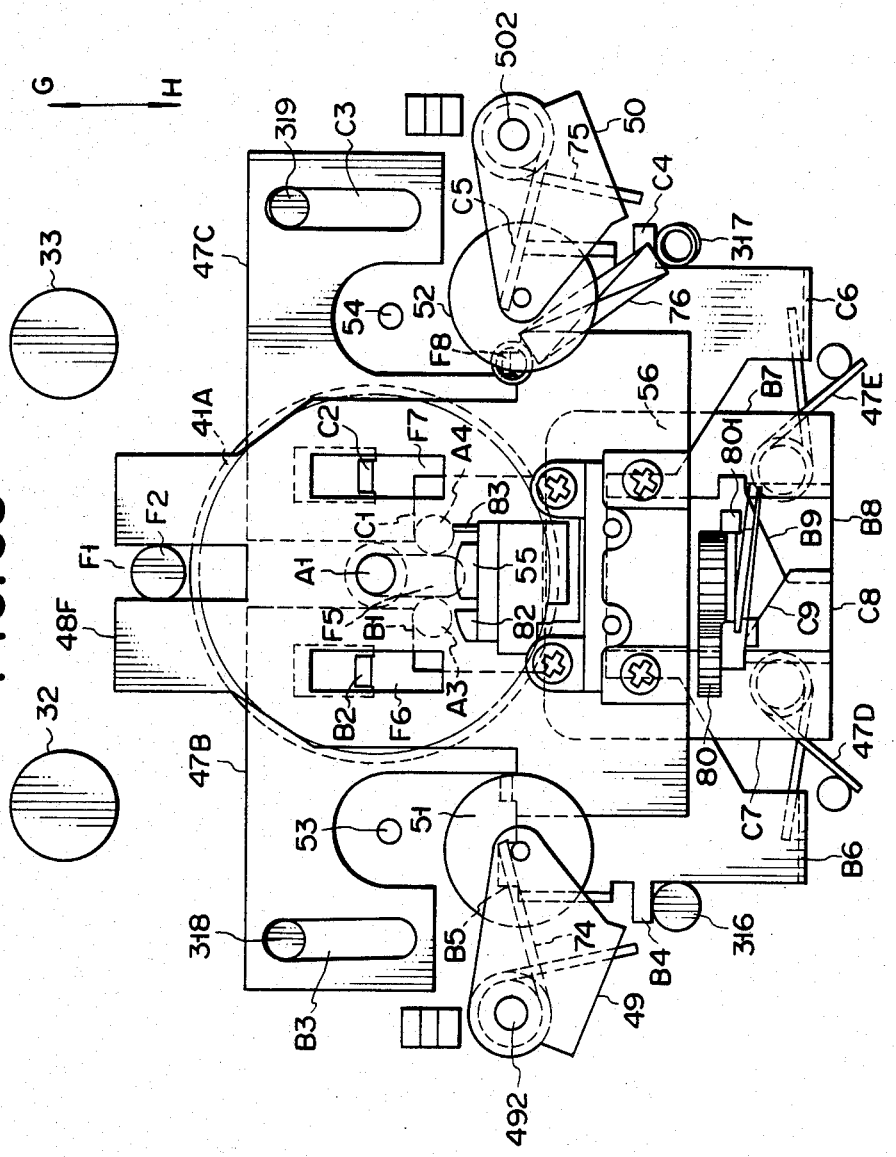
FIGS. 38 to 44 are diagrams for illustrating the construction and operation of a fourth embodiment of the invention.
Figure 39:
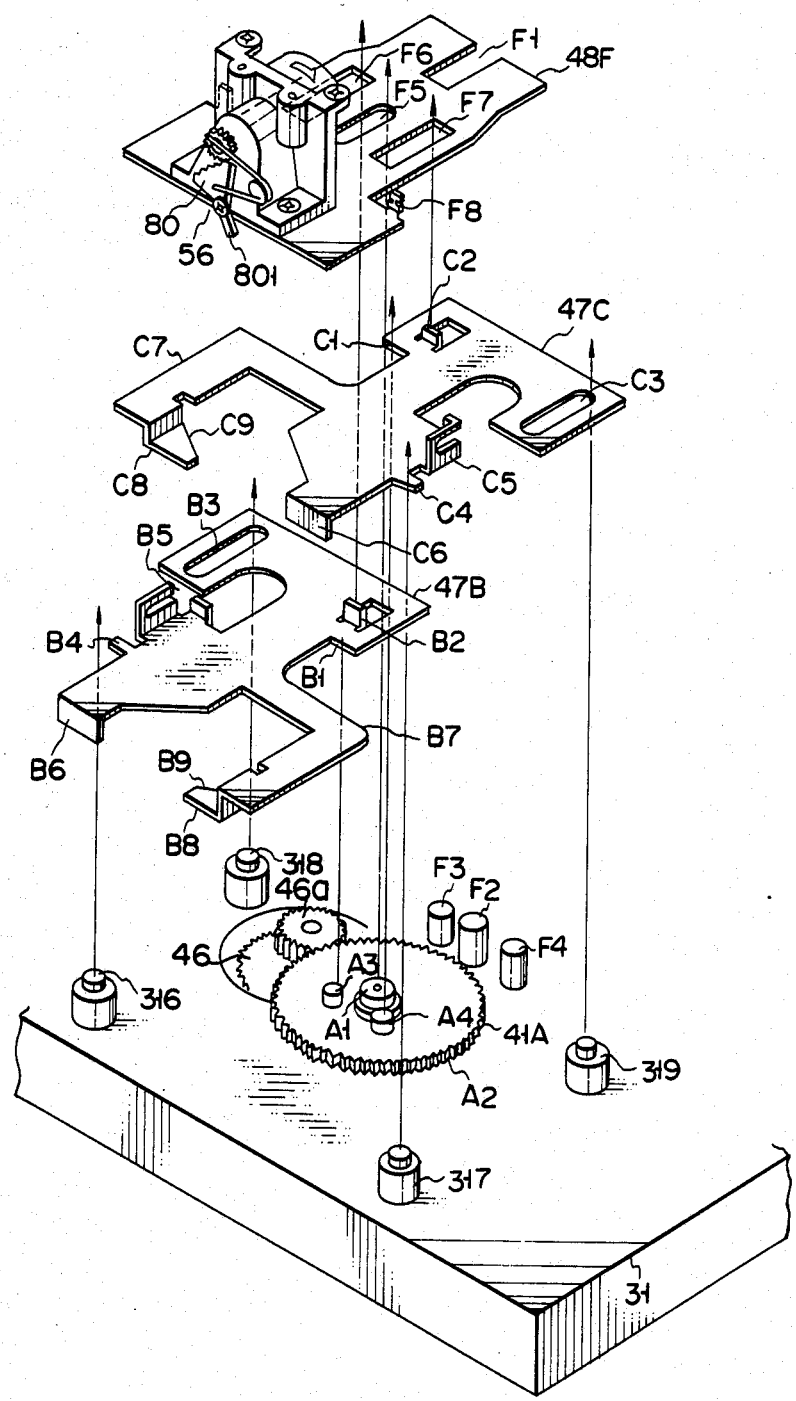
Figure 40:
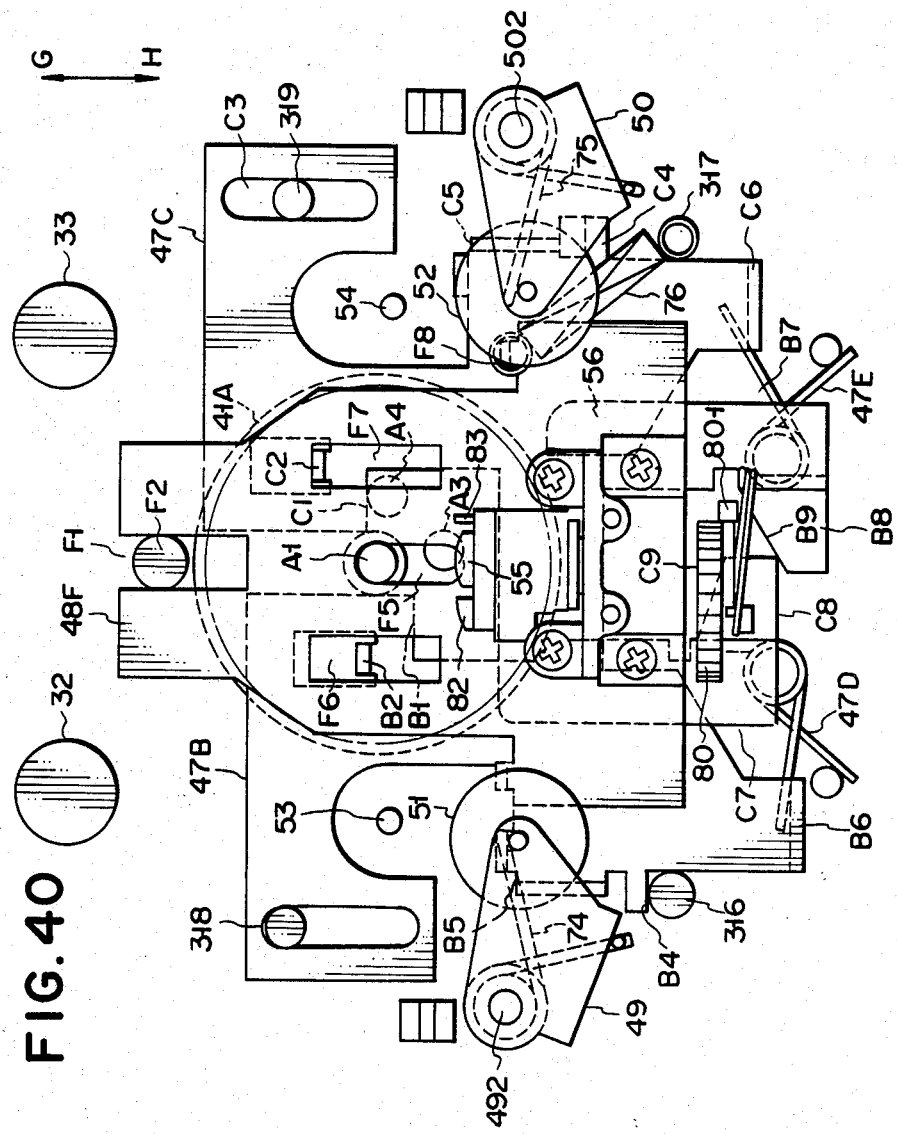

FIGS. 38 and 39 show a fourth embodiment using a rotating head (two-track). In this embodiment, substantially inverted-L-shaped extending portions B7 and C7 are formed on left and right playback sliders 47B and 47C similar to the ones used in the third embodiment. The extending portions B7 and C7 are located under the gain portions B1 and C1, respectively, so as to face each other. Bent portions B8 and C8 are formed at the extended end portions of the extending portions B7 and C7, respectively, so as to face each other. The extreme end portions of the bent portions B8 and C8 overlap each other. Slant portions B9 and C9 are formed on one side portions of the bent portions B8 and C8, respectively.

In place of the fixed head, a head rotating mechanism 56 similar to the one used in the fundamental embodiment is attached to a head slider 48F similar to the one used in the third embodiment. In the head rotating mechanism 56, a driven portion 801 of a sector gear 80 engages the slant portions B9 and C9 of the left and right playback sliders 47B and 47C. Accordingly, as the left or right playback slider 47B or 47C slides in the direction of arrow G, the driven portion 801 is pressed by the slant portion B9 or C9 so that the sector gear 80 is rocked. In doing this, a recording/playback head 55, an erasing head 82 or the like is adjusted to the tape feeding direction, as in the fundamental embodiment.

Spaces are defined between retaining portions B2 and C2 of the left and right playback sliders 47B and 47C and sliding holes F6 and F7 of the head slider 48F so that the head slider 48F slides in the direction of arrow G when the recording/playback head 55 or the like is adjusted to the tape feeding direction after the rotation of the head rotating mechanism 56 by the left or right playback slider 47B or 47C.

Figure 41:
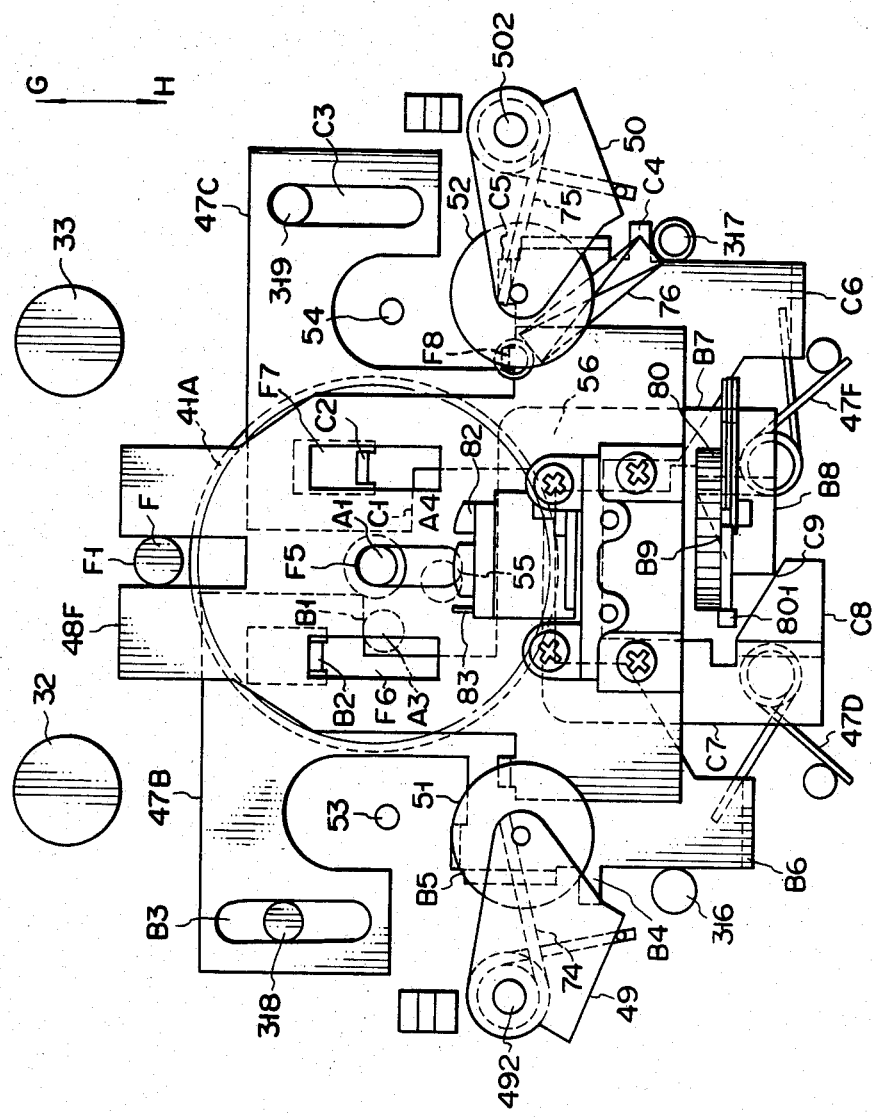
Figure 42:
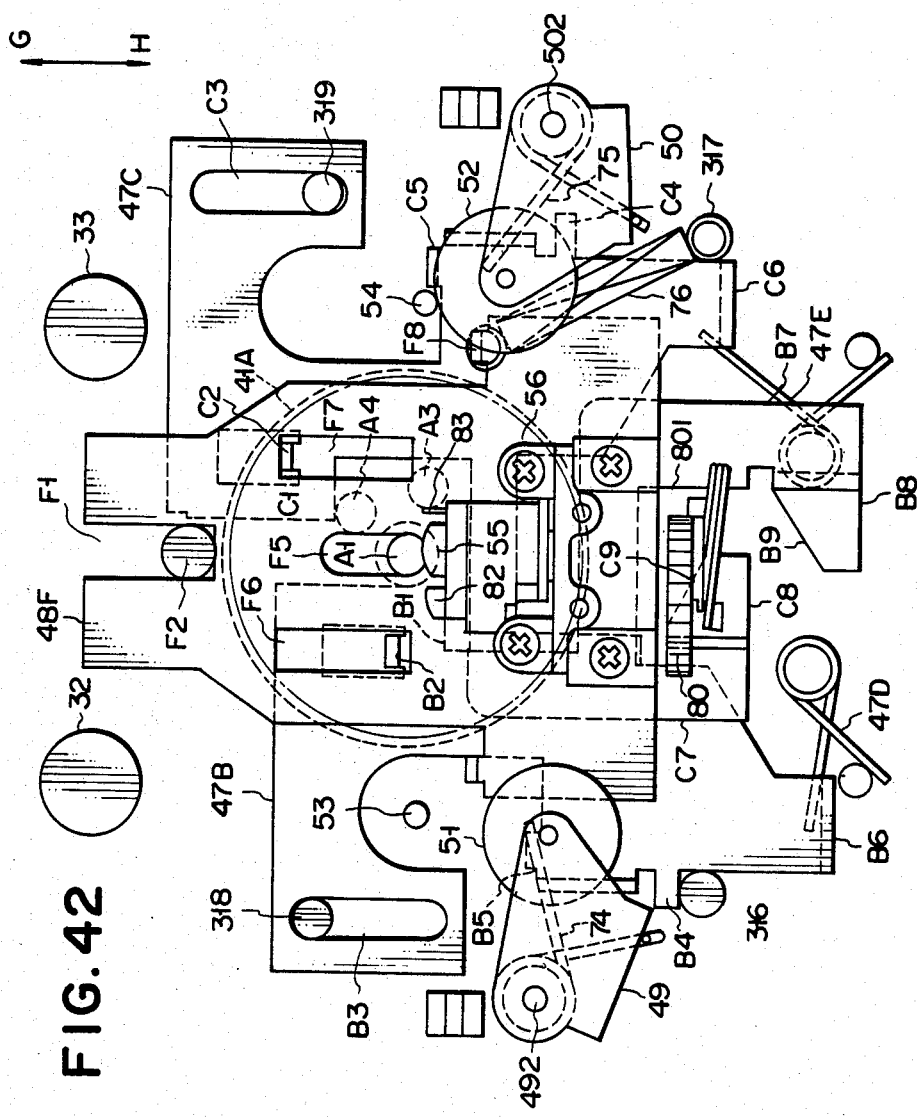
Figure 43:
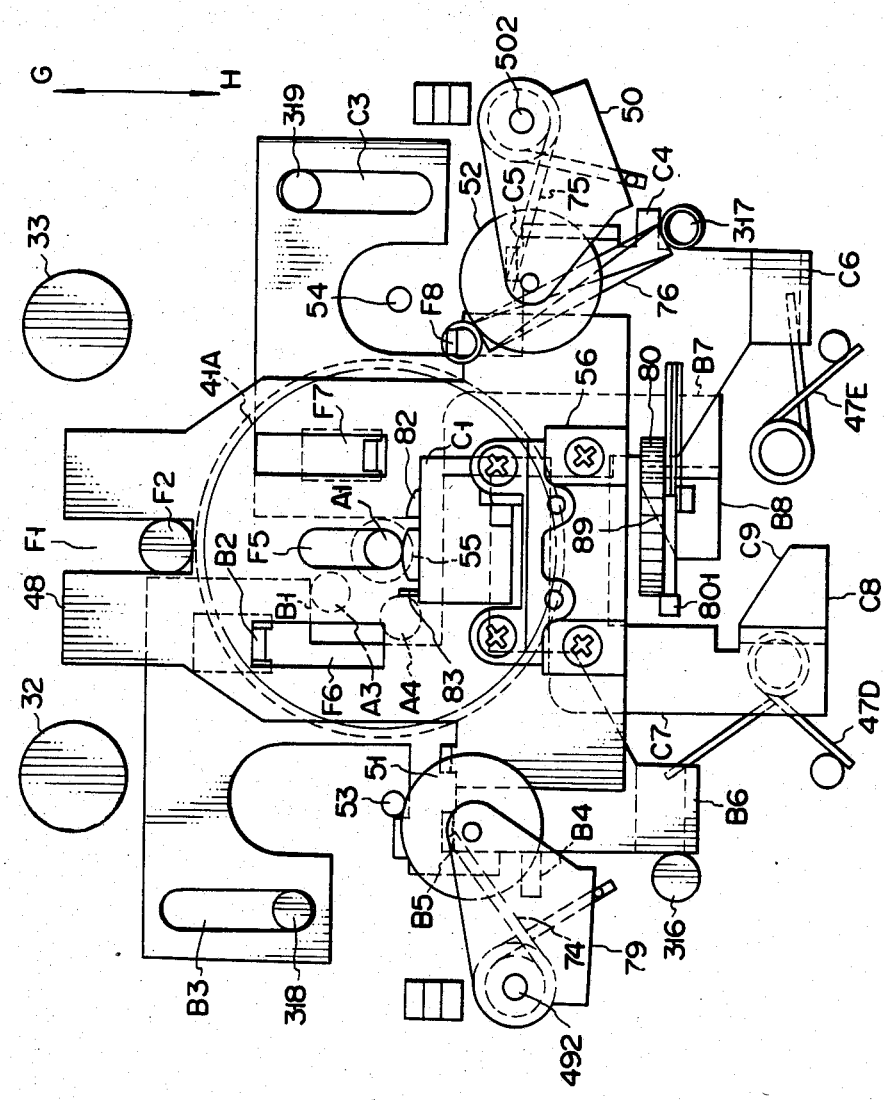

When the main gear cam 41A is rotated in the manner described in connection with the third embodiment, the left or right playback slider 47B or 47C is slid in the direction of arrow G, as shown in FIG. 41, depending on the rotating direction of the main gear cam 41A. At the initial stage of the sliding of the left or right playback slider 47B or 47C, the head rotating mechanism 56 is actuated by the slant portion B9 or C9 of the slider 47B or 47C. As a result, the recording/playback head 55, the erasing head 82, etc. are adjusted to the tape feeding direction, and the retaining portion B2 or C2 of the left or right playback slider 47B or 47C is caught by the edge of the sliding hole F6 or F7 of the head slider 48F. As the left or right playback slider 47B or 47C further slides in the direction of arrow G, the head slider 48F is slid in the direction of arrow G to bring the recording/playback head 55 and the erasing head 82 into contact with the tape surface, as shown in FIGS. 42 and 43. In this state, the forward or reverse playback operation is performed.

Figure 44:
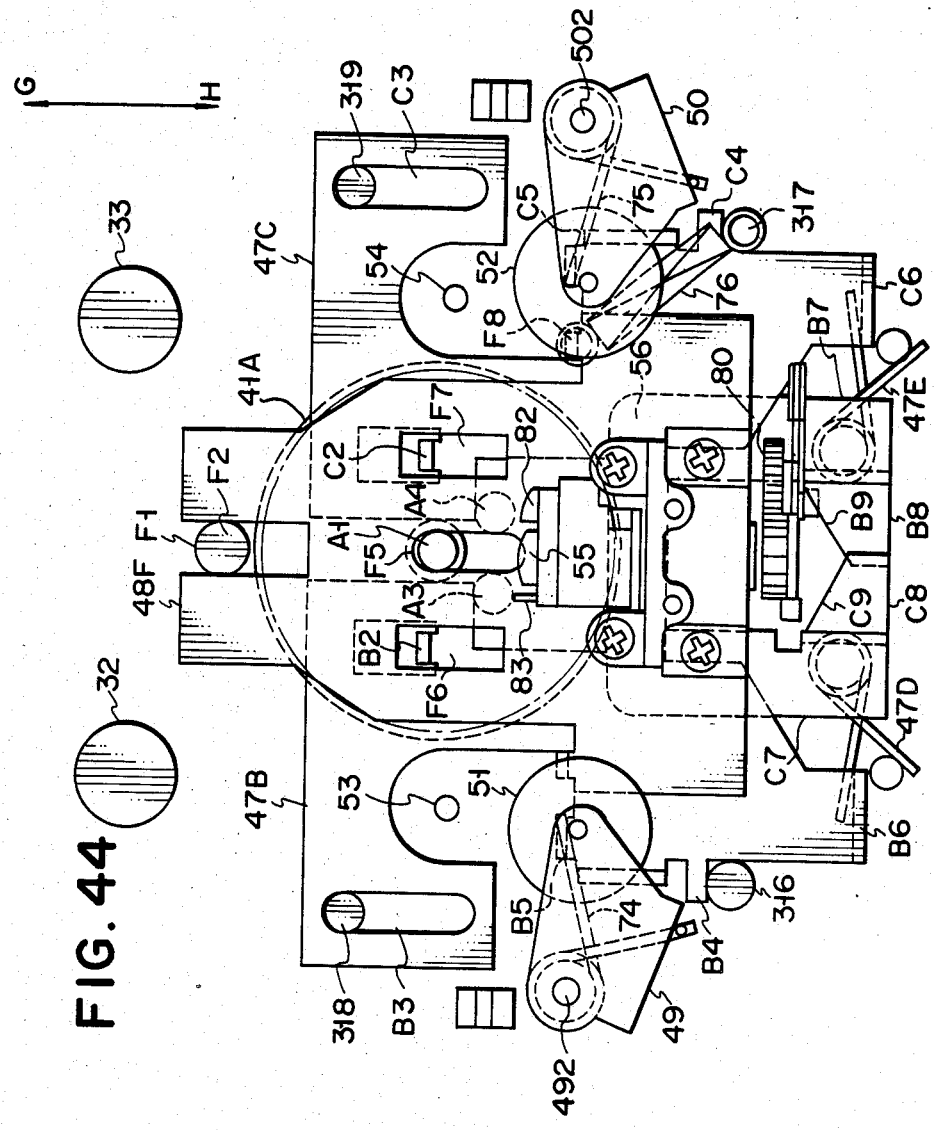

If the assisting motor 42 is cut off from current supply in the middle of the forward or reverse playback operation, the left and right playback slides 47B and 47C and the head slider 48F are securely returned to their respective stop positions by torsion springs 47D and 47E and a spring 76 in the manner described in connection with the third embodiment, as shown in FIGS. 42 to 44. As the left or right playback slider 47B or 47C retracts in this manner, the main gear cam 41A is securely returned to its stop position.

It is to be understood that, in the fourth embodiment, the fast forward and rewinding playback (cue and review) operations may be performed in the same manner as in the third embodiment by the use of a position detecting switch (not shown).

The head position detecting switch 96 of the fundamental embodiment, along with the position detecting switch 48J of the third embodiment, serves to detect the head position for the cue or review mode, thereby securing the predetermined tape position for the correct cue or review operation.

In practice, however, it is difficult to detect and adjust the head position, that is, to set a proper operating position of the head position detecting switch 96.

The manner in which the proper operating position of the head position detecting switch 96 can be set easily and securely according to this invention will now be explained.

Figure 45:
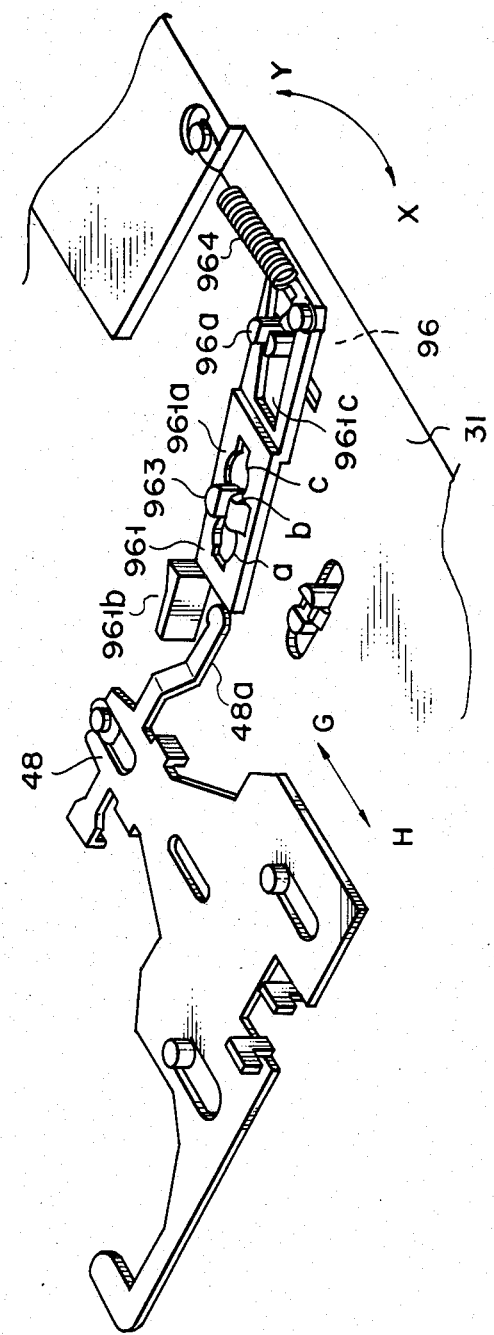
FIGS. 45 to 55 are diagrams illustrating specific examples or drive and control sections for a head position detecting switch used in the fundamental embodiment.

As shown in FIG. 45, an engaging portion 48a protrudes from the upper side portion of a head slider 48 similar to the one used in the fundamental embodiment. Thus, the head position detecting switch 96 can be turned on or off in accordance with the predetermined position of the head slider 48 by engaging or disengaging the engaging portion 48a with or from a switch actuating member 961 when the head slider 48 slides in the direction of arrow G or H.

A guide member 963 set in the main chassis 31 elastically engages a knotted slot 961a in the switch actuating member 961 having three retaining points, a, b and c in the middle portion thereof. Thus, the switch actuating member 963 can rock in the direction of X and Y around the engaging section. Normally, the switch actuating member 961 is urged in the direction of arrow Y by a spring 964 stretched between the extreme end portion thereof and the main chassis 31.

In the switch actuating member 961, an engaging portion 961b protruding from its proximal end portion is located on the path of travel of the engaging portion 48a of the head slider 48. Also, an operating shaft 96a of the head position detecting switch 96 on the backside of the main chassis 31 is engagedly fitted in a rectangular slot 961c formed at the extreme end portion of the switch actuating member 961.

Thus, in the arrangement described above, the operating position of the head position detecting switch 96 can be changed by suitably shifting the guide member 963 between the three retaining points a, b and c of the knotted slot 961 of the switch actuating member 961. Normally, after being located at the central retaining point b, the guide member 963 is moved between the retaining point b and one of the other retaining points a and c so that the proper operating position can be obtained for actual head position detection.

Figure 46:
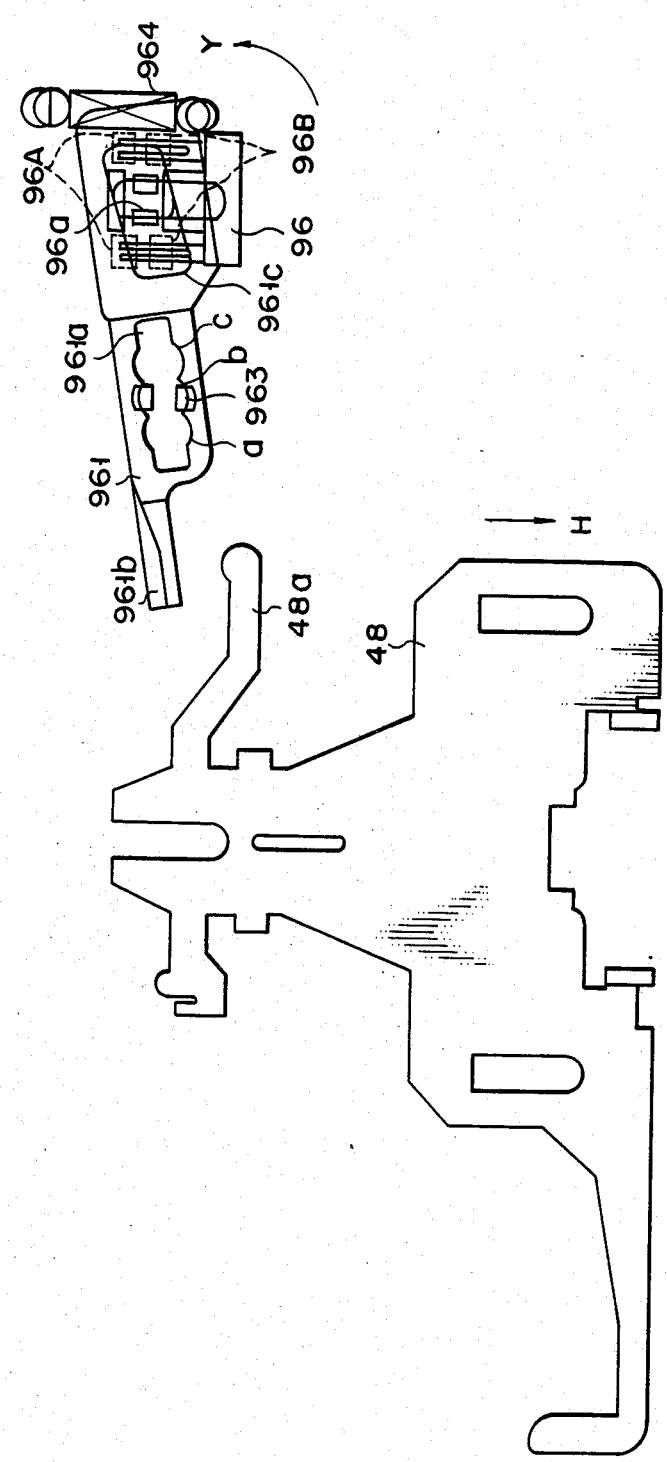
Figure 47:
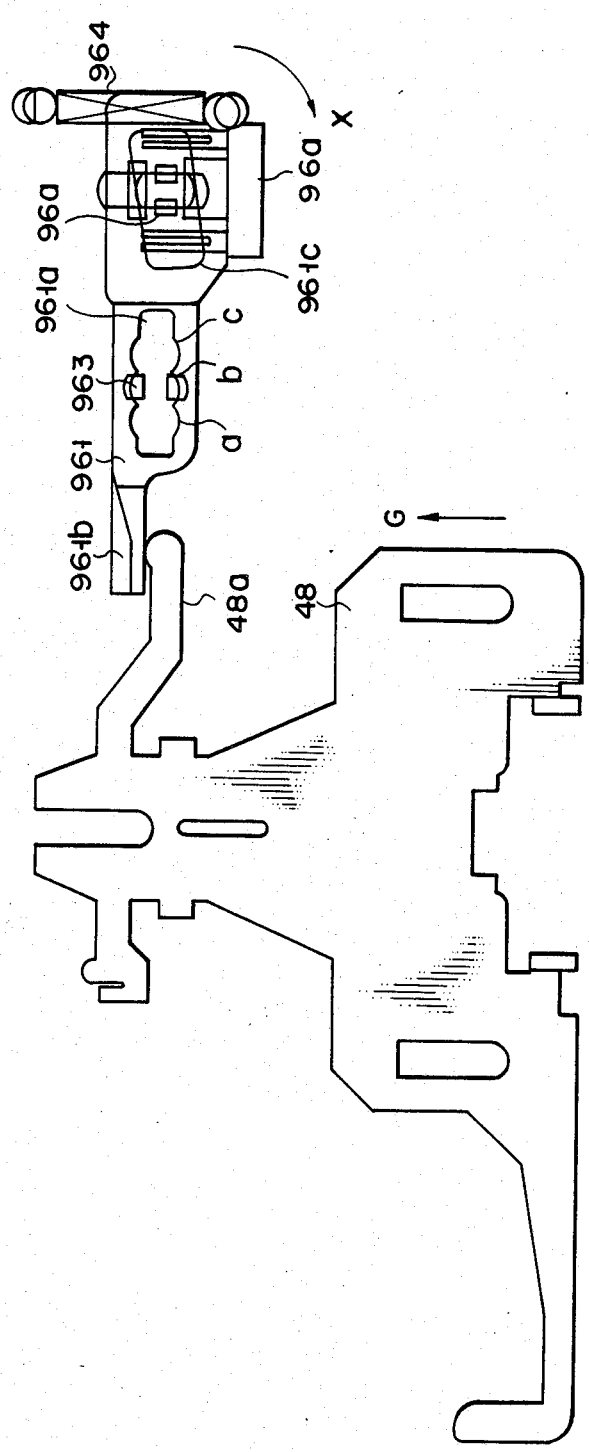
Figure 48:
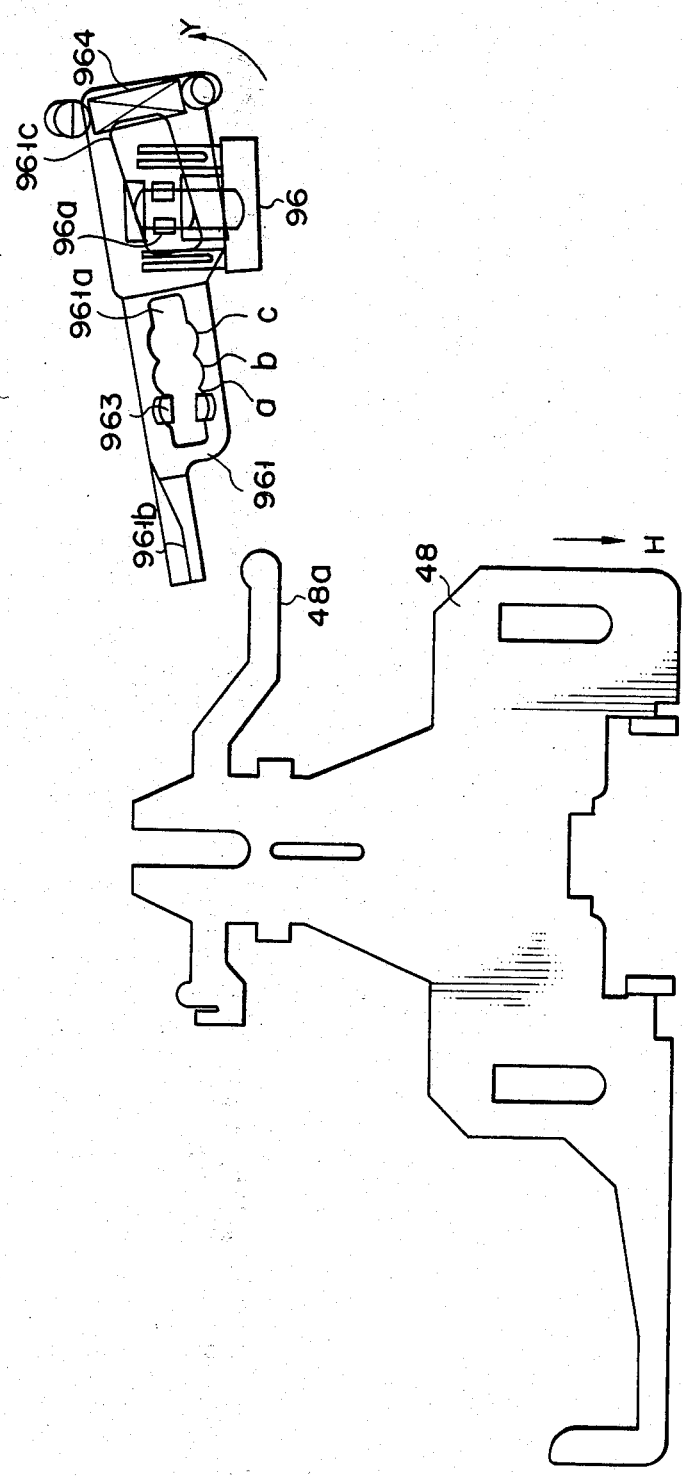
Figure 49:
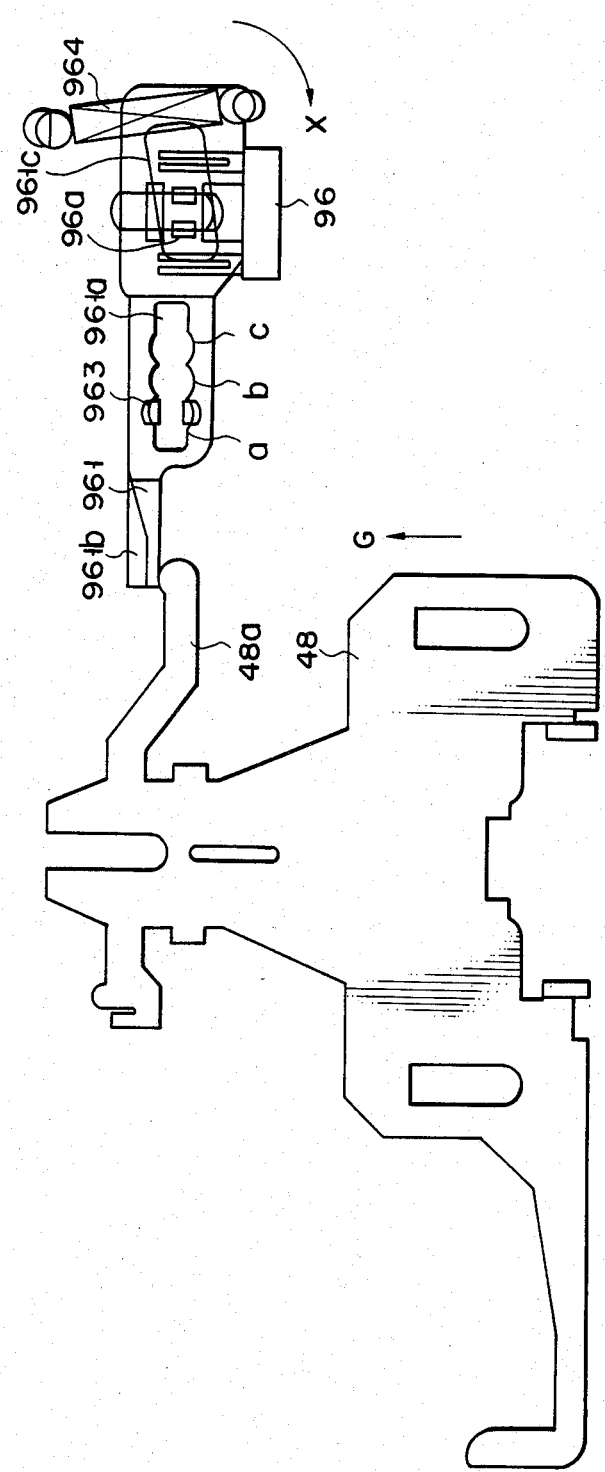
Figure 50:
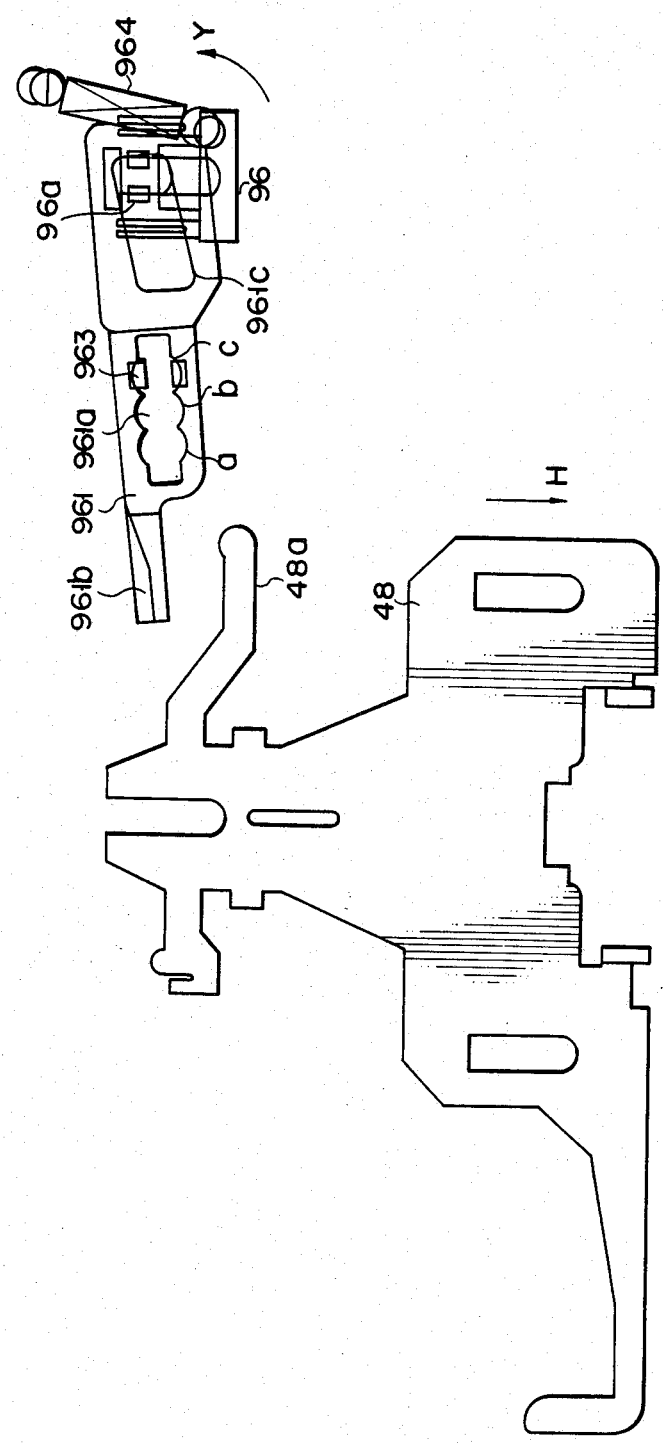
Figure 51:
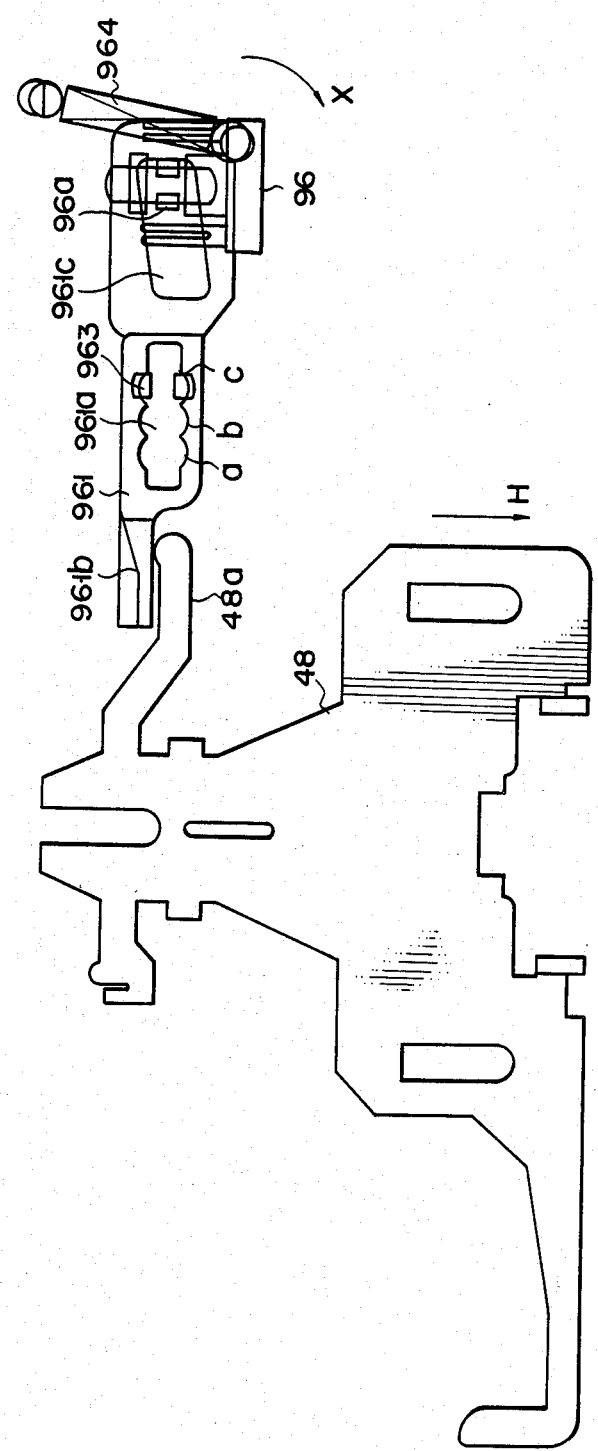

FIGS. 46 and 47 show, respectively, positions obtained before and after the switch is actuated when the elastic engaging section is adjusted to the central retaining point b. Likewise, FIG. 48 and 49 respectively show positions obtained before and after the switch is actuated when the engaging section is adjusted to the retaining point a, and FIGS. 50 and 51 show respectively show positions obtained before and after the switch is actuated when the engaging section is adjusted to the retaining point c.

When the switch is actuated, the switch actuated member 961 is rocked in the direction of arrow X against the urging force of the spring 964 as the head slider 48 moves upward as illustrated. Thus, the operating shaft 96a of the head position detecting switch 96 is pressed down so that its contacts are opened.

Before the switch is actuated, the switch actuating member 961 is rocked in the direction of arrow Y by the urging force of the spring 964 as the head slider 48 moves downward as illustrated. Thus, the operating shaft 96a of the head position detecting switch 96 springs up so that its contacts are closed.

In this manner, the operating position of the head position detecting switch 96 and the head position can be adjusted to proper positions by simply changing the retaining points for the switch actuating member 961.

As shown in FIG. 46, the head position detecting switch 96 has first and second contacts 96A and 96B which are closed and opened, respectively, when the switch is actuated. The operating timing of these first and second contacts 96A and 96B is so set that the second contacts 96B are opened a short time before the first contacts 96A are closed, and are closed a short time after the first contacts 96A are opened.

Even though the head position can be detected easily and securely in the aforementioned manner, it is awkward to start the cue or review operation immediately after the head position detecting switch 96 is actuated. This is so because there are time lags between the operations of the electric circuit system and the mechanical system that are necessary for the cue and review operations. In practice, the head position in the cue or review operation is somewhat set back from that in the normal-speed playback operation. If the cue or review operation is started immediately after the actuation of the head position detecting switch 96, it will be difficult to properly control the distance of retraction of the head position.

The manner in which the proper position can be securely obtained even though the distance of retraction of the head position is short in the cue or review operation will now be explained.

Figure 52:
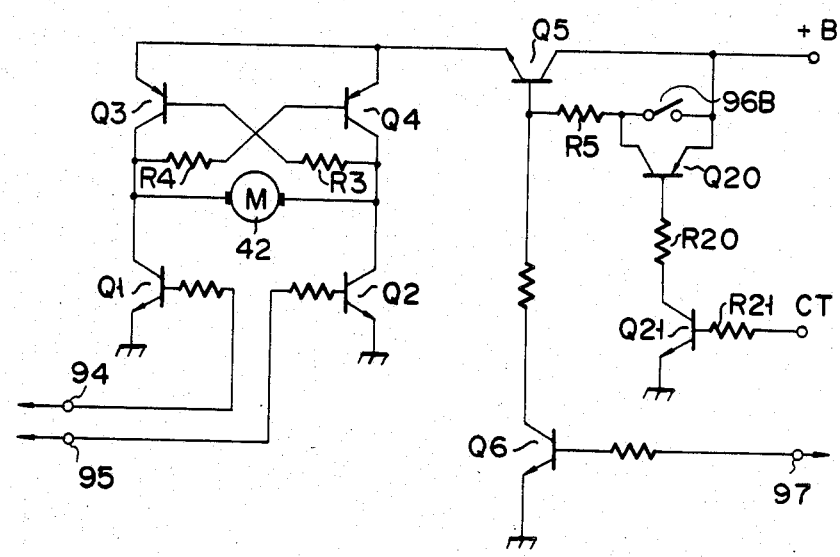

FIG. 52 shows the assisting motor driving circuit section shown in FIG. 20. In FIG. 52, the second contacts 96b of the head position detecting switch 96 are interposed between the resistor R5 and the power source (+B) of FIG. 20. The collector-emitter circuit of a transistor Q20 is correspondingly connected across the second contact 96B. The transistor Q20 has its base connected to the collector of a transistor Q21 through a resistor R20, its emitter grounded, and its base connected through a resistor R21 to a control terminal CT (mentioned later). Except for this, the circuit arrangement of FIG. 52 is substantially the same as the arrangement of the circuit section shown in FIG. 20.

In this arrangement, a sequence of operations going through the stop mode, the forward playback mode, and then the stop mode again is executed as follows.

Figure 53:
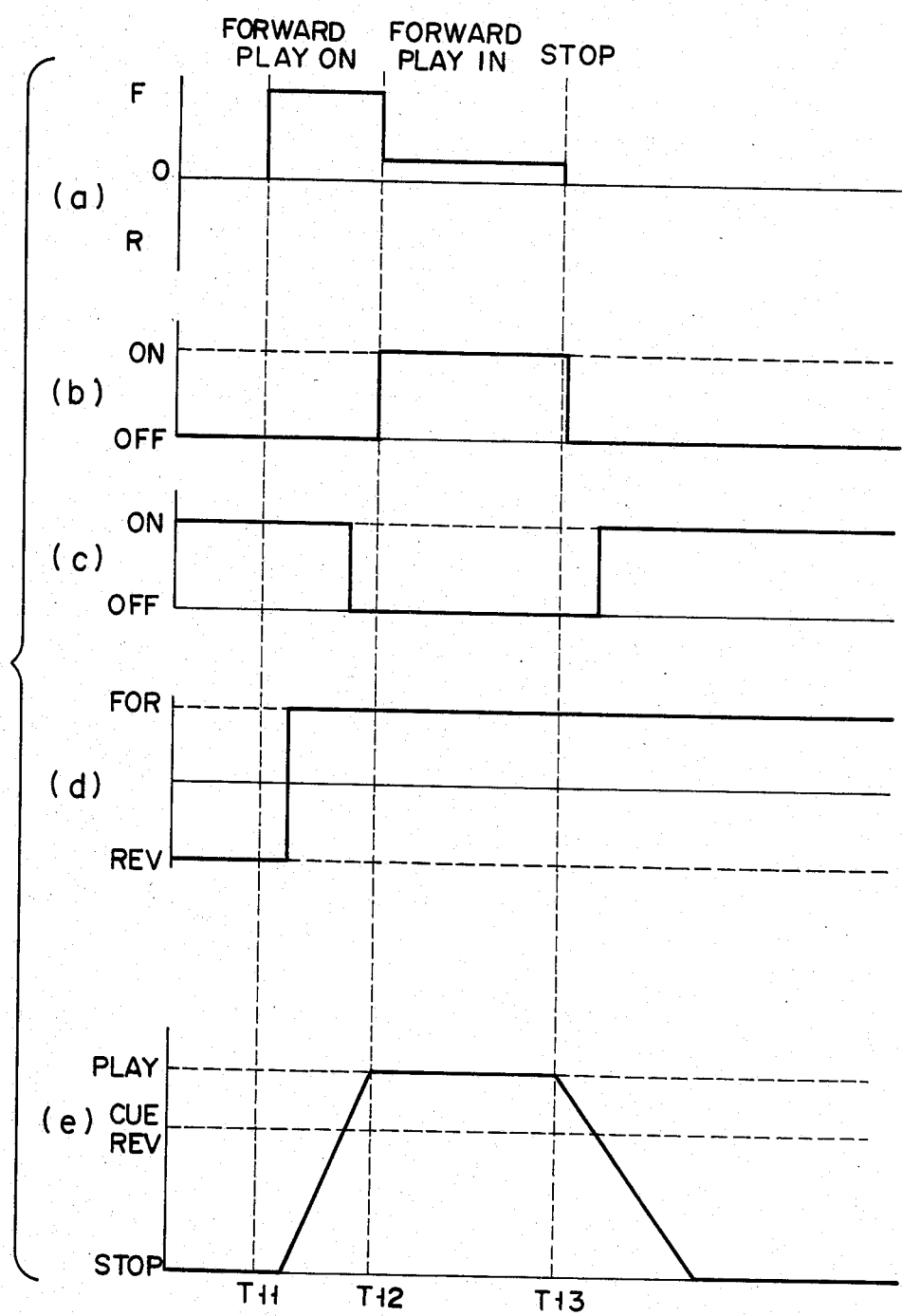

If the switch 86 is operated at time T11 shown in FIG. 53, the assisting motor 42 is supplied with a predetermined forward current, as shown in FIG. 53(a). Consequently, the head slider 48 is shifted to the playback (PLAY) position at time T12 in the manner mentioned before, as shown in FIG. 53(e).

At this moment, the second contacts 96B of the head position detecting switch 96 are closed, as shown in FIG. 53(e). As for the first contacts 96A, they are opened a little earlier, as shown in FIG. 53(c).

In this case, the assisting motor 42 is locked for the playback mode by the action of the first contacts 86a of the head position detecting switch 96.

If the switch 91 is then operated at time T13, the assisting motor 42 is immediately cut off from current supply to be stopped, so that the head slider 48 is returned to its stop position. As a result, the second contacts 96B of the head position detecting switch 96 are opened at the time shown in FIG. 53(b), and the first contacts 96A are closed with some time lag.

FIG. 53(d) shows a signal representing the direction of tape feed for the playback mode selected by a switch interlocked with the head rotating mechanism 56 used in the fundamental embodiment.

Figure 54:
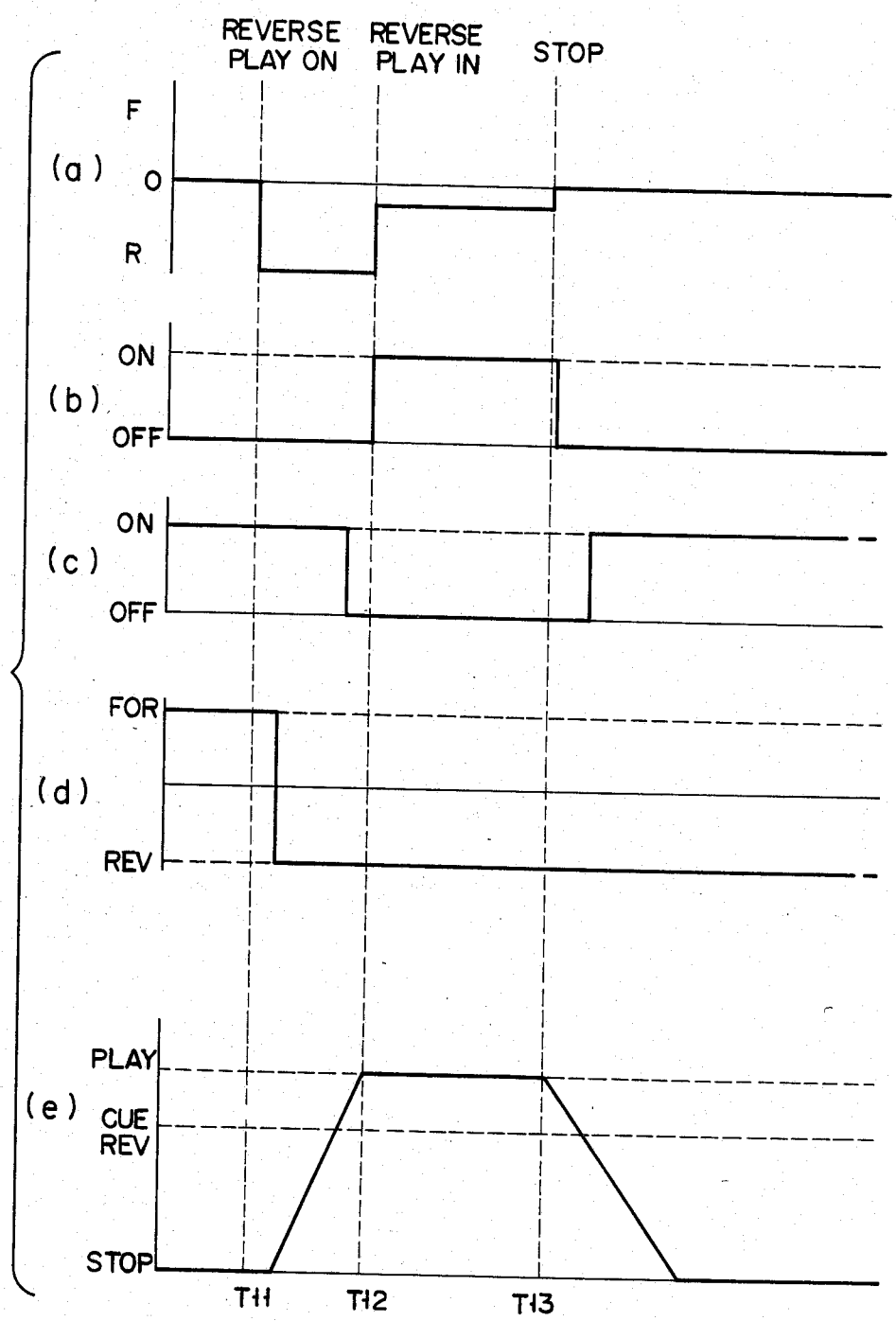

FIG. 54 shows another sequence of operations, similar to the sequence shown in FIG. 53, going through the stop mode, the reverse playback mode, and again the stop mode.

There will now be described another sequence for the cue operation as a representative of the two high-speed playback operations.

Figure 55:
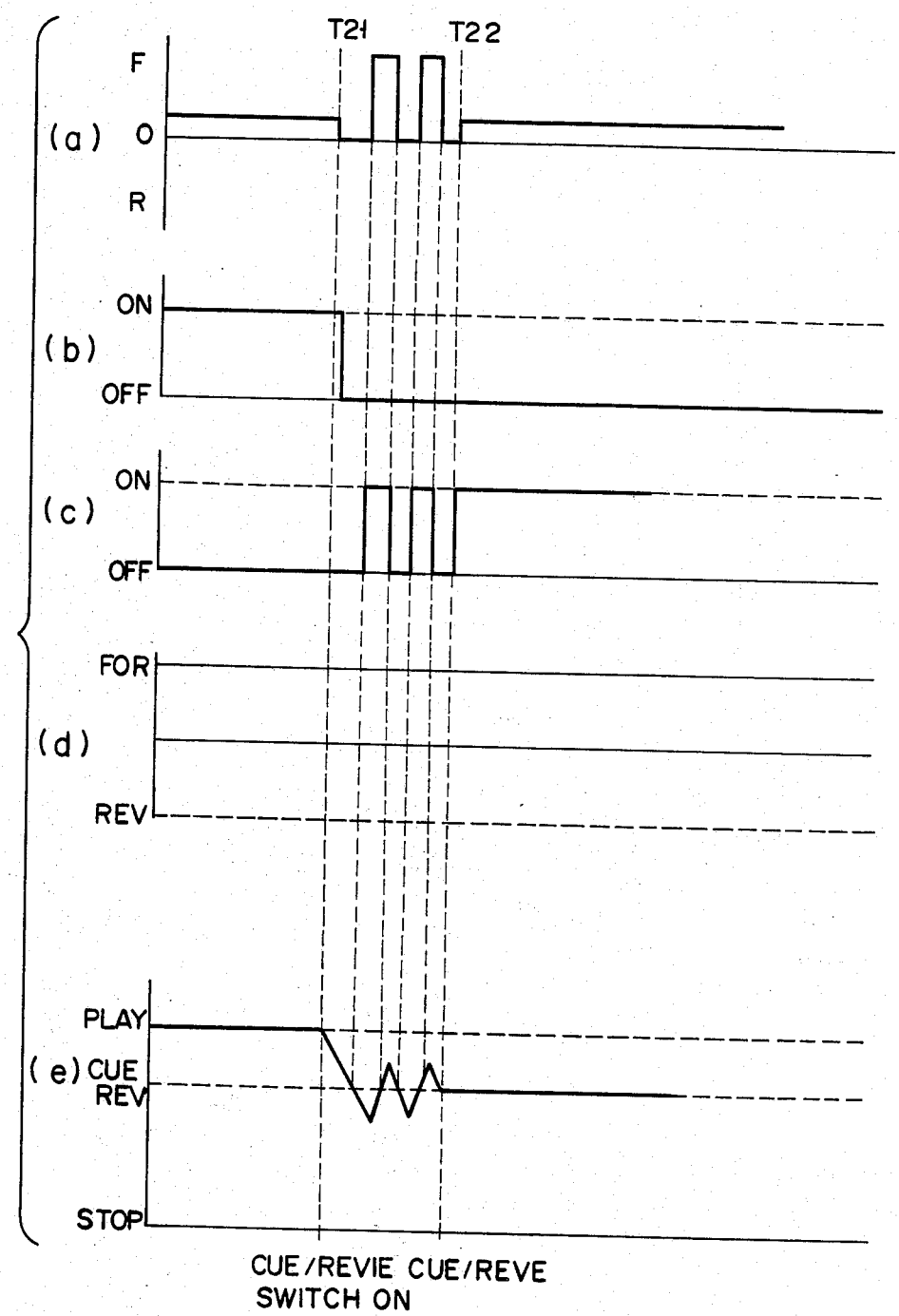

In this case, the assisting motor 42 has been previously locked in the forward playback mode, and the switch 89 for fast forward tape feed described in connection with the fundamental embodiment is operated at time T21, as shown in FIG. 55(a).

Then, the transistor Q6 of FIG. 52 is turned off in the same manner as in the fundamental embodiment shown in FIG. 20. When a control signal supplied from a control circuit (not shown, equivalent to the circuit 85 of FIG. 20) to the control terminal CT is inverted from H-level to L-level, the resistor R5 is opened, so that the transistor Q5 is also turned off. As a result, the assisting motor 42 is stopped once at this point of time.

Thereupon, the head slider 48 is moved once from the playback position toward the stop position, as shown in FIG. 55(e). In this process, the second contacts 96B of the head position detecting switch 96 are closed, as shown in FIG. 55(c), so that the transistor Q5 is turned on again.

As a result, the assisting motor 42 starts again to be supplied with the predetermined forward current, so that the head slider 48 is moved again toward the playback position.

Then, the second contacts 96B of the head position detecting switch 96 are opened, so that the transistor Q5 is turned off again to stop the assisting motor 42. Thus, the head slider 48 is moved toward the stop position again.

Consequently, the second contacts 96B of the head position detecting switch 96 are closed again to turn on the transistor Q5. Thus, the assisting motor 42 is started to move the head slider 48 toward the playback position again.

Thereupon, the second contacts 96A of the head position detecting switch 96 are opened again to turn off the transistor Q5. Thus, the assisting motor 42 is stopped, so that the head slider 48 is moved toward the stop position again.

As such movement of the head slider 48 is repeated a few times [two and a half times as in FIG. 22(c)], the position of the head slider 48 is converged to the proper position for the cue mode. If the control signal supplied to the control terminal CT is restored to H-level at time T22 for the attainment of the proper position, then the transistor Q5 is turned on. At the same time, the transistor Q6 is turned on by an H-level signal from the signal output terminal (T-out) of the logic control circuit 85 of the fundamental embodiment shown in FIG. 20, so that the assisting motor 42 is locked. Thus, the head slider 48 is located in position as shown in FIG. 55(e).

By moving the head slider 48 a predetermined number of times in this manner in the cue or review operation, the head position can be securely adjusted to the proper position and reduce distance of retraction.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

According to this invention, as described in detail herein, a tape recorder is provided which is so improved that a motor drive assisting mechanism used therein is as simple in construction as possible and can operate satisfactorily, and, more specifically, is improved in power consumption and in cost to be well-suited to a small-sized apparatus.

According to the invention, moreover, there is provided a tape recorder which is so improved that a motor drive assisting mechanism therein can satisfactorily perform auto-reverse, cue, and review operations.

According to the invention, furthermore, there is also provided a tape recorder in which that the head position can be securely detected and easily controlled by means of a motor drive assisting mechanism.

What is claimed is:

1. A tape recorder with a head position control to adjust the position of a magnetic head and a pinch roller relative to a tape, comprising:
   a plurality of operating members for controlling operations of said tape recorder;
   tape driving means for driving said tape in a predetermined mode of operation in response to a selective operation of said operating members;
   a shift control mechanism including: (1) means for shifting said magnetic head and said pinch roller between an operating position adapted for tape running and a rest position, and (2) cam means coupled to said shifting means for transmitting a shifting force to said shifting means;
   motor means, coupled with said cam means, for transmitting rotary driving force to said cam means;
   motor driving means for supplying a driving signal of a first predetermined level to said motor means in response to said selective operation of said operating members;
   head position detecting switch means coupled to said shift control mechanism, for detecting whether said magnetic head is located at an adjustable predetermined spacial position and producing an output signal indicative thereof;
   motor control circuit means, coupled to said indicative signal of said head position detecting switch means, for supplying a locking signal of a second predetermined level, which is a lower level than said driving signal of said first predetermined level to said motor upon receiving said indicative signal of said head position detecting switch, thereby substantially locking said shift control mechanism in the current position; and
   spring means coupled to said shift control mechanism for bringing said shift control mechanism back to said rest position when said locking signal is released,
   wherein said locking signal is a drive signal to said motor means which counteracts the spring force of said spring means.

2. The tape recorder according to claim 1, wherein said head position detecting switch means includes a first contact which is turned from "on" to "off" and a second contact which is turned from "off" to "on" when the switch means performs its detecting function, said on-to-off operation of said first contact occurring earlier in time than said off-to-on operating timing of said second contact, and said on-to-off operating timing of said second contact occurring earlier in time than said off-to-on operating timing of said first contact.

3. A tape recorder with a head position control to adjust the postion of a magnetic head relative to a tape, comprising:
   a magnetic head;
   a plurality of operating members for controlling operations of said tape recorder;

tape driving means for driving said tape in a predetermined mode of operation in response to a selective operation of said operating members;

a shift control mechanism including: (1) means for shifting said magnetic head between an operating position adapted for tape running and a rest position, and (2) cam means coupled to said shifting means for transmitting a shifting force to said shifting means;

motor means, coupled with said cam means, for transmitting rotary driving force to said cam means;

motor driving means for supplying a driving signal of a predetermined level to said motor means in response to said selective operation of the operating members;

head position detecting switch means coupled to said shift control mechanism, for detecting whether said magnetic head is located at an adjustable predetermined spacial position and including a first contact which is turned from "on" to "off" and a second contact which is turned from "off" to "on" when said switch means performs said detecting function, said on-to-off operation of said first contact occurring earlier in time than said off-to-on operating timing of said second contact, and said on-to-off operating timing of said second contact occurring earlier in time than said off-to-on operating timing of said first contact to thereby product an output signal indicative of said detecting function;

motor control circuit means, coupled to said outputs from said first and second contacts of said head position detecting switch means, supplying a locking signal to said motor upon receiving said indicative signal of the head position detecting switch, thereby substantially locking said shift control mechanism in the current position and wherein said magnetic head is enabled to repeatedly move forward and backward relative to said tape a predetermined number of times within a region where said magnetic head slightly contacts said tape, and said motor locking signal is supplied to said motor means when said magnetic head is finally brought to a position slightly behind said position adapted for tape running; and spring means coupled to said shift control mechanism for bringing said shift control mechanism back to said rest position when said locking signal is released.

* * * * *